US010331136B2

(12) United States Patent
Perrone

(10) Patent No.: US 10,331,136 B2
(45) Date of Patent: *Jun. 25, 2019

(54) GENERAL PURPOSE ROBOTICS OPERATING SYSTEM WITH UNMANNED AND AUTONOMOUS VEHICLE EXTENSIONS

(71) Applicant: Perrone Robotics, Inc., Charlottesville, VA (US)

(72) Inventor: Paul J. Perrone, Crozet, VA (US)

(73) Assignee: PERRONE ROBOTICS, INC., Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,883

(22) Filed: Dec. 5, 2017

(65) Prior Publication Data

US 2018/0095467 A1    Apr. 5, 2018

Related U.S. Application Data

(63) Continuation-in-part of application No. 14/949,752, filed on Nov. 23, 2015, now Pat. No. 9,833,901, (Continued)

(51) Int. Cl.
*G05D 1/00* (2006.01)
*B25J 9/16* (2006.01)

(52) U.S. Cl.
CPC .......... *G05D 1/0088* (2013.01); *B25J 9/1661* (2013.01); *G05B 2219/40393* (2013.01); *G05D 2201/0213* (2013.01); *Y10S 901/06* (2013.01)

(58) Field of Classification Search
CPC .... G05D 1/0088; B25J 9/1661; Y10S 901/06; G05B 2219/40393
(Continued)

(56) References Cited

U.S. PATENT DOCUMENTS 4,586,151 A    4/1986  Buote
4,689,755 A    8/1987  Buote
(Continued)

FOREIGN PATENT DOCUMENTS

WO    WO 2005/109299 A1    11/2005
WO    WO-2005109299 A1 *  11/2005   ............ B25J 9/1661
(Continued)

OTHER PUBLICATIONS

Montemerlo, M. et al., "Perspectives on standardization in mobile robot programming: the carnegie mellon navigation (carmen) toolkit", Proceedings of the 2003 IEEE/RSJ International Conference on Intelligent Robots and Systems, pp. 2436, Oct. 2003.
(Continued)

*Primary Examiner* — Jamie Figueroa
(74) *Attorney, Agent, or Firm* — Sterne, Kessler, Goldstein & Fox P.L.L.C.

(57) ABSTRACT

The present disclosure provides a general purpose operating system (GPROS) that shows particular usefulness in the robotics and automation fields. The operating system provides individual services and the combination and interconnections of such services using built-in service extensions, built-in completely configurable generic services, and ways to plug in additional service extensions to yield a comprehensive and cohesive framework for developing, configuring, assembling, constructing, deploying, and managing robotics and/or automation applications. The disclosure includes GPROS extensions and features directed to use as an autonomous vehicle operating system. The vehicle controlled by appropriate versions of the GPROS can include unmanned ground vehicle (UGV) applications such as a driverless or self-driving car. The vehicle can likewise or instead include an unmanned aerial vehicle (UAV) such as a helicopter or drone. In cases, the vehicle can include an
(Continued)

unmanned underwater vehicle (UUV), such as a submarine or other submersible.

20 Claims, 55 Drawing Sheets

Related U.S. Application Data which is a continuation-in-part of application No. 11/361,974, filed on Feb. 27, 2006, now Pat. No. 9,195,233.

(58) Field of Classification Search
USPC .......................................... 700/245, 246, 264
See application file for complete search history.

(56) References Cited

U.S. PATENT DOCUMENTS

| | | | |
|---|---|---|---|
| 4,730,258 A | 3/1988 | Takeda et al. | |
| 4,803,613 A | 2/1989 | Kametani et al. | |
| 4,974,191 A | 11/1990 | Amirghodsi et al. | |
| 5,655,148 A * | 8/1997 | Richman | G06F 9/4411 710/11 |
| 5,696,970 A * | 12/1997 | Sandage | G06F 9/44521 710/13 |
| 5,748,980 A * | 5/1998 | Lipe | G06F 9/4411 710/104 |
| 5,825,981 A | 10/1998 | Matsuda | |
| 5,999,989 A * | 12/1999 | Patel | G06F 9/4413 710/1 |
| 6,226,692 B1 | 5/2001 | Miloushev et al. | |
| 6,442,451 B1 | 8/2002 | Lapham | |
| 6,671,582 B1 | 12/2003 | Hanley | |
| 6,675,070 B2 | 1/2004 | Lapham | |
| 6,804,580 B1 | 10/2004 | Stoddard et al. | |
| 6,889,118 B2 * | 5/2005 | Murray, IV | B25J 9/161 318/568.11 |
| 6,922,611 B2 | 7/2005 | Lapham | |
| 6,931,546 B1 * | 8/2005 | Kouznetsov | G06F 9/468 717/174 |
| 6,938,111 B2 | 8/2005 | Herberth | |
| 7,024,666 B1 | 4/2006 | Brown | |
| 7,031,798 B2 | 4/2006 | Brown et al. | |
| 7,065,638 B1 | 6/2006 | Chlytchkov | |
| 7,137,107 B1 | 11/2006 | Brown | |
| 7,139,843 B1 | 11/2006 | Brown et al. | |
| 7,529,599 B1 | 5/2009 | Bhatt et al. | |
| 7,801,644 B2 * | 9/2010 | Bruemmer | G06N 3/008 318/568.17 |
| 7,974,738 B2 * | 7/2011 | Bruemmer | G05D 1/0088 318/568.12 |
| 8,972,053 B2 * | 3/2015 | Bruemmer | G06K 9/00791 700/245 |
| 9,195,233 B2 | 11/2015 | Perrone | |
| 9,269,087 B2 * | 2/2016 | Salvaggio | G06Q 10/04 |
| 9,384,327 B2 * | 7/2016 | Snyder | G06F 19/324 |
| 9,833,901 B2 | 12/2017 | Perrone | |
| 2001/0037412 A1 | 11/2001 | Miloushev et al. | |
| 2003/0090018 A1 | 5/2003 | Bulgrin | |
| 2003/0171846 A1 * | 9/2003 | Murray, IV | B25J 9/161 700/245 |
| 2008/0009968 A1 * | 1/2008 | Bruemmer | G06N 3/008 700/245 |
| 2009/0082879 A1 * | 3/2009 | Dooley | B25J 9/1658 700/3 |
| 2011/0224828 A1 * | 9/2011 | Breznak | B25J 9/08 700/264 |
| 2011/0270783 A1 * | 11/2011 | O'Neil | G06Q 50/06 705/412 |
| 2015/0066815 A1 * | 3/2015 | Salvaggio | G06Q 10/04 706/11 |

FOREIGN PATENT DOCUMENTS

| | | | | |
|---|---|---|---|---|
| WO | WO 2007/041390 A2 | 4/2007 | | |
| WO | WO-2007041390 A2 * | 4/2007 | ........... | B62D 57/028 |

OTHER PUBLICATIONS

Munich, M. et al., "ERSP: A software platform and architecture for the service robotics industry", Intelligent Robots and Systems, 2005, pp. 3225-3232.
Utz, H. et al., "Micro-middleware for mobile robot applications", IEEE Transactions on Robotics and Automation, IEEE Inc. NY., XP011079552, abstract, pp. 494-495, Figure 1, Aug. 2002.
Communication Pursuant to Article 94(3) EPC for European Patent Application No. 07 751 652.4; dated May 5, 2011.
Extended European Search Report for European Patent Application No. 07 751 652.4; dated Mar. 9, 2010.
Second communication Pursuant to Article 94(3) EPC for European Patent Application No. 07 751 652.4; dated Nov. 24, 2011.
Evolution Robotics: ERSP Architecture; found at www.evolution.com/products/ersp/architecture.masn; last accessed Mar. 22, 2012.
Interfaces (C# Programming Guide); found at msdn.microsoft.com/en-us/library/ms173156.aspx; last accessed Mar. 24, 2012.
Seyfarth et al., Open System Architecture for Controls within Automation Systems (OSACA), 2005, The Industrial Information Technology Handbook, pp. 1-11.
Bruyninckx, Herman, OROCOS: design and implementation of a robot control software framework, Apr. 2002, http:www.orocos.org, pp. 1-9.
Duran-Limon, Hector Alejandro, A Resource Management Framework for Reflective Multimedia Middleware, Oct. 2001, Computing Department Lancaster University, UK, pp. 1-233.
Sanjeepan, Vivekananthan, A Service-Oriented, Scalable, Secure Framework for Grid-Enabling Legacy Scientific Applications, 2005, University of Florida, pp. 1-96.
Herman Bruyninckx, Open Robot Control Software: The OROCOS project, May 2001, IEEE, 0-7803-6475-9/01, pp. 2523-2528.
Herman Bruyninckx et al., The Real Time Motion Control Core of the Orocos project, Sep. 2003, IEEE, 0-7803-7736-2/03, pp. 2766-2771.
Baudoin Le Charlier et al., Experimental evaluation of a generic abstract interpretation algorithm for PROLOG, Jan. 1994, ACM Transactions on Programming Languages and Systems, vol. 16, No. 1, pp. 35-101.
S. Kagami et al., Design of real time large scale robot software platform and its implementation in the remote brained robot project, 1996, proc. IROS 96, IEEE, 0-7803-3213-X/96, pp. 1394-1399.
OROCOS.org, What is Orocos project, the Orocos real-time toolkit, no date, Internet, 8 pages.

* cited by examiner

GENERAL PURPOSE ROBOTICS OPERATING SYSTEM WITH UNMANNED AND AUTONOMOUS VEHICLE EXTENSIONS

CROSS REFERENCE TO RELATED APPLICATIONS

This application is a continuation-in-part of U.S. patent application Ser. No. 14/949,752, entitled "General Purpose Robotics Operating System with Unmanned and Autonomous Vehicle Extensions," filed Nov. 23, 2015, which is a continuation-in-part of U.S. patent application Ser. No. 11/361,974, entitled "General Purpose Robotics Operating System," filed Feb. 27, 2006, all of which are herein incorporated by reference in their entities.

TECHNICAL FIELD

This disclosure generally relates to operating systems for computers, devices comprising computers, and/or other devices operation under programmed control. In aspects, some embodiments relate to a general purpose software platform and toolkit that can be used in various settings, such as in robotics and automation, to rapidly and affordably create solutions and functional products of all kinds, shapes, and sizes. Furthermore, some embodiments include extensions of a general purpose software platform to vehicles including unmanned ground vehicles and autonomous vehicles (e.g. automated vehicles, driverless cars, or self-driving cars), as described herein.

BACKGROUND

Although there have been numerous specific solutions for various specific needs in the automation and robotics fields, there still exists a need for a broad solution to programming and implementing software and hardware in these fields. Furthermore, in order for there to be proliferation of robotics and automation across the broader market landscape, time and cost to deploy and integrate end-user robotics and automation solutions must be dramatically lowered. Two primary points of integration within an end-user robotics and automation solution exist. One primary integration point is between a vertical end-user robotics or automation application and an underlying robotics or automation platform. The other primary integration point is between a robotics or automation software platform and underlying plug-and-play mobility, sensor, and actuator hardware. The monolithic robotics and automation architectures to date blur the boundaries of these two integration points and accentuate the need for a general purpose robotics and/or automation software platform bridging the gap and complexities between robotics and automation application software and hardware.

BRIEF SUMMARY

This disclosure addresses these and other needs in the art by providing a general purpose robotics and automation operating system. An embodiment enables designers of robotics and automation solutions to integrate those solutions into a working product by providing a standardized, full service platform upon which the various and widely divergent robotics and automation applications may sit. Furthermore, whereas the platforms described in the parent application relate to a general purpose robotics operating system (GPROS), and the present application describes the application of a GPROS to unmanned ground vehicles (UGVs), a class of which is autonomous ground vehicles. Further, whereas the parent application includes the use of a GPROS in a DARPA Grand Challenge autonomous vehicle, this application includes additional applications to unmanned ground vehicles and autonomous vehicles and features used in such applications, as well as additional features in GPROS platforms, in general.

In general, some embodiments provide generic and general purposes software services for use by any robotics or automation application. An embodiment provides generic software services that may be commonly used by any software application, extends these services with services that may be commonly used by any robotics and automation application, and combines these services to provide a general purpose software platform for use in any robotics and automation application. This method provides a way to more rapidly develop, configure, assemble, deploy, and extend robotics and automation applications compared to conventional technologies.

In aspects, an embodiment defines a method that provides and enables complete configurability of application services in a manner which allows the pluggability of any underlying source of configuration data (e.g., configuration data in XML files, databases, on remote servers, etc). An embodiment in aspects also defines a method by which configuration data may be loaded, transparent to the application, from one or more configuration data sources in both a static fashion (i.e., at application startup) or dynamically (i.e., as the application is running). An embodiment combines these generic application configuration services with a robotics and/or automation platform to provide this ability to robotics and automation applications.

In aspects, an embodiment also defines an approach for automatic assembly and construction of applications based on configuration data. An embodiment, in implementations, additionally defines an approach for automatic deployment of applications in a distributed fashion and provides a means for managing the lifecycle (e.g., start, stop, and shutdown) of applications either within a process or via a distributed fashion based on configuration data. By providing a completely configurable means for such services, an embodiment provides a methodology which lends itself to automating the process of application configuration, assembly, construction. deployment, and management. An embodiment combines these generic or universal application services with a robotics and automation platform to provide this ability to robotics and automation applications in a manner which is needed but not addressed by currently available or conventional technologies.

Such an approach also reduces development time for robotics and automation application developers. By using some embodiments, developers can focus on writing any custom robotics or automation business logic and leave the rest of the implementation process to the operating system of an embodiment as a robotics and automation engine and toolkit for rapid application development. Because some embodiments provide a completely configurable robotics and automation engine, some embodiments lend themselves to automating the process of robotics and automation configuration, assembly, construction. deployment, and development by use of associated tools.

In aspects, in addition to a core set of common services built into the GPROS, an embodiment also provides a method for complete pluggability of third party, proprietary, open source, open standard, custom, or other types of extensions (i.e., "plug and play" ability). That is, means for plugging in any underlying configuration data source medium (e.g., XML files, database data). any application object to be loaded, any underlying distributed communications medium (e.g., Web services, CORBA), any external peripheral source (e.g., a display, a printer), any external communications interface type (e.g., serial port, USB port), any application thread control mechanism (e.g., synchronous thread, asynchronous thread), any type of data or message format (e.g., NMEA format, proprietary message format), any type of logging mechanism (e.g., log to database, third-party logger), any type of system timer, any type of test package, any type of sensor (e.g., GPS sensor), any type of actuator (e.g., a DC motor), any type of motor or PWM control approach, any type of mechanical or gear configuration (e.g., DC motor gears, differential gears), any type of mobility platform configuration (e.g., wheeled mobility, legged mobility), any type of reference or GPS sensor, any type of range sensor, any type or LADAR or RADAR sensor, any type of camera, any type of feedback control approach (e.g., quadrature encoding), any type of analog or digital I/O approach, any type of application conduct or behavioral logic, any type or robot planning logic, any type of rules engine approach (e.g., a third-party rule engine), any type of neural network approach (e.g., a third-party neural network), any type of obstacle classification, any type of obstacle detection approach, any type of obstacle resolution approach, any type of sensor fusion approach, etc. The GPROS hence provides a completely extensible platform enabling plug-and-play of extensions from third party, proprietary, open source, open standard, custom, or other sources. As stated, the GPROS also provides a set of built-in generic and specific services approaches for all of the above.

In aspects, the features and technology provided by some embodiments thus allow for greater ease of communication, both static and dynamic, between components within the same robotics application, between robot and other robotic agents equipped with the same open platform (operating system upon which the software exists), as well as between human and robotic agents. Of the many features of some embodiments, one advantageous feature is the particular approach to complete configurability, componetization, and encapsulation of those services that are commonly useful to any type of robotics and automation application using the combination of a variety of proprietary services, allowing a robotics and automation application to be defined, assembled, deployed, and managed in a completely configurable and pluggable fashion. It is also dynamically reconfigurable and lends itself to use of tools for automating a robotics and automation application development and deployment process itself. Configuration data can be read or sent over a variety of network connections, and the code itself can be read or sent over a network, such that the initial code requires no additional customization. If multiple robots on a network include an embodiment, new configuration and code (and hence, behavior) can all be dynamically, and optionally simultaneously, loaded into any robot on the network. Moreover, such a GPROS lends itself to use of tools for the automated configuration, assembly, and deployment of robotics applications and hence dramatically reducing the time it takes to develop and deploy robotics applications.

The GPROS provides services common to any robotics and automation application. A set of robotics and automation specific services that may be commonly leveraged by any robotics and automation application are provided by GPROS. A set of general software application services that may be commonly leveraged by software application are also provided by GPROS. These general software application services are extended and used by the robotics and automation application specific services in a combined fashion within GPROS.

A vertical robotics and automation application framework (VRAF) extension of GPROS provides services common to a specific vertical robotics and automation application domain. A set of robotics and automation services specific to a particular vertical application domain, such as unmanned ground vehicles (UGVs), unmanned aerial vehicles (UAVs), or unmanned underwater vehicles (UUVs), that may be commonly leveraged by any robotics and automation application in a vertical application domain are provided by a VRAF. The GPROS services are extended and used by VRAF services in a combined fashion.

The GPROS is not limited to software or firmware that runs onboard a robot. It may encapsulate common robotics software services that also runs inside of a centralized robot system planning tool, or inside of a robot monitoring and control device which can be local or remote to the robot or other controlled platform.

Thus, an embodiment makes use of open standards to facilitate the creation of a general purpose software platform for use in both robotic- and non-robot-specific applications. An embodiment can provide applications that can be created for broad use in robotics without low-level customization for any particular proprietary robot. This technology allows for greater ease of communication, both static and dynamic, between human and robotic agents, as well as between robot and other robotic agents equipped with the same open platform (operating system upon which the software exists). As noted above, some development of hardware transparency for robotics control exists and has been included in earlier or conventional technology. However, among other things, one unique set of features of an embodiment is in its particular approach to complete configurability using the combination of a variety of proprietary services, allowing a robot application to be defined in a completely configurable fashion. In yet another example of the advantages provided by an embodiment is its dynamic reconfigurability (in aspects, in an embodiment, this dynamic reconfiguration capability is described and labeled as "envoy"). Configuration data can be read or sent over a variety of network connections, and the code itself can be read or sent over a network, such that the initial code requires no additional customization. Some embodiments advantageously isolate the robotic software from the robotic hardware, such that the abstraction of the robot can be performed without full knowledge of the actual robot (or bot) configuration. If multiple bots on a network include an embodiment, new configuration and code (and hence, behavior) can all be dynamically, and optionally simultaneously, loaded into any bot on the network.

In aspects, an embodiment provides a method and apparatus for a GPROS. Thus, it provides a general purpose operating system, which has, in embodiments, applicability to robotics. This platform makes use of open standards to facilitate the creation of non-robot-specific and robot-specific applications such that the applications can be created for broad use, such as in robotics, without low-level customization for any particular proprietary robot.

As mentioned, the technology provided by an embodiment allows for greater ease of communication, both static and dynamic, between human and robotic agents. as well as between robot and other robotic agents equipped with the same open platform, and/or other entities or nodes. Units comprising the GPROS of an embodiment can be equipped with a combination of neural network rules engine technologies that allows one or more equipped robots in a simultaneous or individual mode to adapt rapidly to new environments and tasks and to communicate such learned information to other units running the GPROS. Opensource and standard or proprietary technologies, such as, but not limited to Java, C+, C++, C#, NET, and Ruby, can be the basis through which the robot-specific mechanics, sensors, and actuators are generalized so that inter-GPROS communication can occur regardless of the robot-specific technology underneath. Java and other programming languages have APIs enabling use of the eXtensible Markup Language (XML) as a data representation format and has built-in support for standard distributed communication technologies such as TCP/IP, HTTR CORBA, SOAP, and Web services. Given the flexibility of the GPROS platform, robots can be produced in different profile standards. depending on the needs of the end-user. As such, a GPROS-equipped unit could be essentially any size (as small as a beetle or as large as an elephant).

According to aspects of an embodiment, such technologies are integrated and used to create a generic platform for low cost mobile autonomous robotic applications, as well as other applications. Such an open generic platform in effect standardizes and commoditizes the operational infrastructure for mobile autonomous robots and thus lowers the cost points for hardware vendors to supply underlying mechanics, sensors, and actuators to be driven by such a platform. It also dramatically lowers the cost points for specific vertical robotic applications to be deployed atop such a platform. The cost savings, for example, include lower the costs associated with control of proprietary robotic applications with proprietary software by using the generic features associated with an embodiment.

GPROS technology makes use of neural networks and rules engine technology to advance the current potential for autonomous mobile robotic applications, including in terms of localization and mapping. Rather than traditional algorithm-based techniques, which are limited and far removed from natural human thinking, rules engine technology can use proximity and location data, sensor data, navigation rules defined offline by humans, and newly defined navigation rules defined online by humans to determine what movement planning actions should be undertaken. Furthermore, rules learned or conditions acquired by other robots may also be broadcast to cooperating robots in the vicinity to enhance the movement and navigational plan for the robot.

As mentioned, the GPROS is not limited to software or firmware that runs onboard a robot. It is to be understood that, although the detailed description focuses on various embodiments, as some embodiments relate to robots, some embodiments are not so limited. Rather, it includes all applications of the general purpose platform provided by an embodiment. For example, it may encapsulate common robotics software services that also runs inside of a centralized robot system planning tool or inside of a robot monitoring and control device.

In view of the features noted above, in a first aspect, an embodiment provides computer software. The software of an embodiment is a general purpose operating system that can be implemented in computers and networks of computers used in any field, but which finds particular usefulness in the robotics and automation fields. The software, also referred to herein as GPROS, provides an operating system or platform comprising services common for all applications designed to run in a computer-driven environment or other platforms operating under programmed control. In embodiments, it provides a platform comprising services common for all applications in a robotics or automation environment, and provides for integration of any and all services extensions for robotics and automation. The software allows programmers to develop software solutions for particular needs, in any language, and implement those solutions into a functional product through integration of the solution with the software of an embodiment. Integration is enabled by the present software, providing ease of use and highly effective and efficient adaptability for all solutions engineered for all needs. The present software, unlike robotics software solutions currently provided or conventional in the art, is not monolithic and designed to address a single need or solve a single problem by providing an ability to integrate a single service or service extension. Rather, it is capable of accommodating any and all service extensions to create a fully integrated and adaptable software solution to relatively simple to complex needs. Its ability to provide a plethora of services and to accommodate numerous different service extensions, modules, etc. makes it a powerful tool, which has immediate and apparent applicability to the robotics and automation fields. For example, it provides a robust platform for implementation of software solutions, and for effecting software-hardware implementations, in the automation field, such as a sensor package. As another example, an embodiment was used to rapidly develop a robotic Unmanned Ground Vehicle (UGV) application, which was tested at the October 2005 DARPA Grand Challenge (an historic event offering a prize to the team that could build an autonomous vehicle to race over 125 miles through the Mojave desert avoiding obstacles along the way). The DARPA Grand Challenge was established to address drawbacks in the prior art and to push the envelope of technology for autonomous robotic vehicles since no such feat had ever before been achievable and had previously been considered impossible prior to October 2005. An embodiment in such a project demonstrated its utility and novelty for rapidly and affordably building highly complex robotics applications and in addressing drawbacks of the prior or conventional art.

In aspects, the software of an embodiment is again completely configurable, and can be adapted both statically and dynamically. This feature provides numerous advantages, particularly in autonomous robotics applications and in applications where numerous individual and independent units are integrated into an overall functional group, such as might be desirable or necessary when implementing a robot solution for military purposes (e.g., a fleet of airborne drones for reconnaissance, a ground-based search and destroy unit). Furthermore, unlike software currently available, the software of an embodiment enables automatic assembly and development of robotics and automation applications, and provides the ability to automatically manage the life cycle of one or more applications in a robotics or automation environment. The ability to plug in a wide variety of third-party services (e.g., loggers, rule engines. communication mechanisms) provides an advantage not available from current or conventional technologies in the robotics and automation fields.

Due to its power and adaptability, the software of an embodiment can be a useful tool for programmers. Indeed, one key feature of the present software is its usefulness to programmers in developing software and/or software-hardware combination solutions to problems, particularly problems in the robotics and automation fields. By providing a standardized platform for communications between software applications and the hardware those applications are designed to control, the present software provides a convenient, stable, adaptable, and reliable basis for programmers in all fields with all types of backgrounds, needs, and skill levels to develop solutions.

The software of an embodiment provides a combination of services that are common to any or all general applications, and to any or all robotics or automation applications. It can provide these independently of each other or as a combination. Of course, the GPROS, as a stand-alone platform, may be combined with applications that are specific for other fields (other than robotics and automation) to provide powerful solutions in those fields. Exemplary services that can be included in the software of an embodiment are discussed below. The software of an embodiment may include some or all of those services, as well as other services that are not mentioned. As a general matter, the software of an embodiment is launched to read data from one or more configuration data sources stored in any sort of underlying configuration storage medium. The configuration services are used in conjunction with an object registration service to automatically create, configure, assemble, deploy, launch, and manage any application objects defined in the configuration. For the integrated robotics and automation application of such general services, generic robotics and automation objects inherent to an embodiment are loaded and provide a general purpose platform for robotics and automation applications. Either built-in, generically configurable, or add-on extensions for encapsulating sensor, actuator, and behavioral conduct are loaded, assembled, linked-in, and managed by the robotics and automation platform. During online or active operations, data is read from sensors synchronously or asynchronously, behavioral conduct is executed, and actuators are able to be commanded or controlled to actuate. Various configurations and extensions to the sensor, actuator, and conduct services are either built-in or pluggable to enable integration of a cohesive and comprehensive robotics and automation application. All such services may be incorporated either locally within a process or in a distributed and remote fashion using any sort of pluggable underlying communications medium. In such a way, a robotics and automation application hosted atop of such a platform is automatically configured, assembled, deployed, and managed.

In another aspect, an embodiment provides methods of using the computer software. In general, the methods comprise running the software on a computer or other programmed device to achieve a desired goal. For example, the methods can comprise running the software to autonomously control a robot. The methods also can comprise running the software to automate a repetitive action or to control a piece of hardware, such as a sensor. Of course, the methods can comprise running the software on multiple computers or micro-controllers that are linked in a network. In such a situation, some of the software can be resident on one computer or micro-controller while other of the software is resident on one or more different computers or micro-controllers. Thus, methods of an embodiment can be or include methods of controlling two or more pieces of hardware, such as two or more robots. Due to the power of the software of an embodiment, the methods can comprise autonomously controlling two or more pieces of hardware, where two or more of the pieces of hardware are performing different functions at any one time. For example, the methods can permit multiple robots to function as a unit, in which one robot performs one task while, at the same time, another robot performs another task (e.g., one robot performs surveillance of a road in front of a building while another robot performs surveillance of the interior of the building).

In embodiments, the methods can also comprise installing, storing, or accessing some or all of the software onto or from a storage medium or piece of hardware. For example, the methods can comprise loading the software, completely or partially, into the RAM of a computer, or installing the software, either completely or partially, onto a permanent storage device of a computer, such as on a hard drive of the computer. In addition, the methods can comprise other steps that are commonly executed by users or computers when running software, such as moving information from storage media to memory, creating and deleting temporary files, and the like.

Various optional additional method steps are discussed below in the context of the figures and otherwise. According to aspects of an embodiment, one. some, or all of the functions described below can be performed as part of the method of an embodiment, to provide the various actions described for each. It is well within the skill level of those of skill in the art to select among the various functions to achieve an end-product and a method that achieves a particular goal.

The methods for using an embodiment include use of the GPROS to configure and build a robotics application that senses data from the environment, formulates some plan of behavior analysis and action, and actuates some actuators in response. An embodiment may be used inside of a robotics platform, inside of a platform to locally or remotely control a robot, or inside of a more centralized system that controls one or more robots either locally or remotely. An embodiment may also be used in automation applications where local or distributed sensing is all that is needed or perhaps sensing coupled with some behavioral conduct to, for example, display the fused result of multiple sensor sources. Robotics and automation applications that also require actuation with or without use of sensors and with or without use of behavioral conduct can also be methods of using an embodiment. An embodiment may also be used for not only building a robotics or automation application but in building simulations of a robotics or automation applications. An embodiment may also be used to build a vertical robotics and automation framework atop of an embodiment which provides additional common services specific to a vertical application domain enabling the combination of such services to be used in an end user robotics and automation application. An embodiment may also be used to provide extensions for general purpose or specific robotics and automation applications which provides additional robotics and automation services enabling the combination of such services to be used in an end user robotics and automation application. An embodiment may also be used to provide extensions for general purpose or specific applications which provides services enabling the combination of such services to be used in an application.

In embodiments, the methods can include a method of programming. In these embodiments, the software of an embodiment can be run alone or in conjunction with additional software applications, services extensions, modules, etc. (i.e., plug-ins), which may be created separately by a programmer. The additional plug-ins can be any software in any language, and may specify a single function or action, or may specify multiple functions or actions. For example, it may be software for running one or more optical sensors automatically. Alternatively, for example, it may be software for running one or more optical sensors automatically and for running one or more steering motors automatically.

Where the methods comprise running one or more plug-ins, the methods can be used to determine if the plug-in software functions as desired. Thus, the methods may be or include methods of debugging a software application.

In further aspects, an embodiment provides a system. In aspects, as used herein, a system is a combination of the computer software and use of the software to achieve a particular goal. Thus, according to an embodiment, a system can be a general purpose operating system for automation and/or robotics, and a method of using it to autonomously control a device, such as a robot. In aspects, a system can further include a computer or other hardware platform in conjunction with the computer software.

In general, an embodiment provides a general purpose operating system, which can be a GPROS. The system typically comprises: a set of application services that provides access to configuration data using generic abstractions, such that the access is independent of any underlying hardware platform (i.e., software according to an embodiment); and implementation of the software to achieve a desired goal. In the context of the system of an embodiment, the hardware platform mentioned can be a computer or other hardware platform that allows for any combination of communication or operational conduct for any communication or operational task. The goal can be any goal envisioned by a user. In exemplary embodiments, the goal can be an automated action of a robot or other piece of hardware in the automation environment.

Within the framework provided above for the software and system, many different embodiments can be envisioned. Numerous such embodiments are described in the following paragraphs. However, it is to be understood that many more embodiments are encompassed by the present software and systems, and the following examples are not intended as an exhaustive listing of all possible embodiments. Various non-limiting embodiments, which can be implemented in conjunction with the software and system of an embodiment alone or in combination with one or more other embodiments, can include: a service that utilizes the generic abstraction to allow configuration data to be stored across different sources (also referred to herein as a config service); a service that includes the generic abstraction to create objects in a dedicated, shared, or pooled fashion (also referred to herein as a registry service); a service that utilizes the generic abstraction to link one or several peripherals to one or several interfaces (also referred to herein as a comm service); a service that includes a generic abstraction to create, manage, and terminate synchronous, asynchronous, and real time application threads (also referred to herein as an ap service); a service that utilizes a generic abstraction to allow client code to communicate with a remote server via a client-side envoy (also referred to herein as an envoy service); and a service that utilizes a generic abstraction to allow for interacting with and managing peripherals external to any hardware system (also referred to herein as a peripheral service).

Additional non-limiting embodiments can include: a GPROS comprising a set of robotic application services that provides access to configuration data by using a generic abstraction, wherein the access is independent of any underlying robotics platform, and wherein the robotics platform allows for any combination of communication or operational conduct for any communication or operational task; a service that utilizes a generic abstraction for sensors (also referred to herein as sensors service); a service that provides base abstractions for range-type sensing (also referred to herein as range service); a service that provides base abstractions for laser radar (LADAR) (also referred to herein as ladar service); a service that provides base abstractions for dealing with LADAR-type range sensing using the SICK LMS product (also referred to herein as ladar sick service); a service that provides base abstractions for radar-type range sensing (also referred to herein as radar service); a service that provides base abstractions for dealing with radar-type range sensing using the vorad vbox radar product (also referred to herein as radar vorad service); a service that provides base abstractions for camera-type sensing (also referred to herein as camera service); a service that provides base abstractions for dealing with camera-type sensing using the MobilEye camera product (also referred to herein as camera mobileye service), and a service that provides base abstractions for dealing with camera-type sensing using the Point Grey camera products (also referred to herein as camera ptgrey service). Other non-limiting embodiments include: a service that provides base abstractions for sensing reference points including position and orientation (also referred to herein as reference service); a service that provides base abstractions for dealing with geographic reference positioning and orientation (also referred to herein as reference geo service); a service that provides abstractions that deal with parsing and interpreting GPS-type information in the NMEA format (also referred to herein as reference nmea service); a service that utilizes a generic abstraction for operations for control of mechanical hardware (also referred to herein as mechanism, gear service); a service that utilizes a generic abstraction for actuators (also referred to herein as actuator service); a service that provides abstractions for motors in a system (also referred to herein as motor service); and a service that utilizes timer capabilities to provide a set of abstractions for actuating motors using pulse-width-modulated (PWM) method (also referred to herein as timer, pwm service). Further non-limiting exemplary embodiments include: a service that utilizes a generic abstraction for modeling robotic conduct (also referred to herein as conduct service); a service that utilizes a generic abstraction for mobilizing robotic conduct (also referred to herein as mobility service); a service that utilizes a wheeled platform; a service that utilizes a legged platform; a service that utilizes a tracked platform; a service that utilizes flight operations, including helicopter operations; and a service that utilizes a generic abstraction for navigation. In various non-limiting embodiments, abstractions are provided for encapsulating a route and course over which a robot travels, planning navigation of a robot, and encapsulating route planning based on map data (also referred to herein as navigation service). In yet further non-limiting embodiments, some embodiments provide a service that utilizes generic abstractions to determine and standardize behavior of a group of robots, and optionally also utilizes generic abstractions for behavioral initialization and termination for said robots (also referred to herein as robot god service); a service that utilizes rules engines or neural networks for encapsulating rules of behavior (also referred to herein as rules, neural service).

Other additional non-limiting embodiments provide a GPROS comprising: a set of application services that provides access to configuration data using a generic abstraction, such that the access is independent of any underlying robotics platform, and wherein the robotics platform allows for any combination of communication or operational conduct for any communication or operational task; a service that utilizes the generic abstraction to allow configuration data to be stored across different sources (also referred to herein as config service); a service that utilizes said generic abstraction to create objects in a dedicated, shared, or pooled fashion (also referred to herein as registry service); a service that utilizes the generic abstraction to link one or several peripherals to one or several interfaces (also referred to herein as comm service); a service that utilizes a generic abstraction to create and terminate synchronous, asynchronous, and real time application threads (also referred to herein as ap service); a service that utilizes a generic abstraction to allow client code to communicate with a remote server via a client-side envoy (also referred to herein as envoy service); and a service that utilizes a generic abstraction to allow for interacting with and managing peripherals external to any hardware system (also referred to herein as peripheral service)

In yet another aspect, an embodiment provides one or more devices which store, access, execute, and/or comprise the software of an embodiment, or components of the software of an embodiment. In general, the device can be or include any piece or combination of pieces of computer hardware that can store, access, execute, and/or comprise the software of an embodiment, or components of the software of an embodiment. Thus, the device can be or include a circuit board storing, accessing, executing, and/or comprising the instruction set of the software of an embodiment. Likewise, the device may be a central processing unit (CPU) which can store, access, execute, and/or comprise the software of an embodiment, or components of the software of an embodiment. The device can likewise be or include a motherboard which can store, access, execute, and/or comprise the software or components thereof, either on the board itself or as part of the board due to connection of the board with another piece of hardware (e.g., a CPU or peripheral board). Furthermore. the device can be or include random access memory (RAM) or another type of memory, storage, and/or hardware for ephemeral storage of some or all of the software of an embodiment. In some embodiments, the device can comprise two or more components, which together contain the software of an embodiment or components thereof (e.g. two or more banks of RAM: a CPU and a co-processor, etc.). Many such computer components are known in the art, and the device of an embodiment may be fabricated in the form of any of those. The device may be a single, separate unit, such as a CPU or circuit board that can be packaged and sold for use in larger automation or robotics devices, or it may be a component of a larger unit, such as an automated or robotic device. In aspects, the device can be connected to a network and/or other devices. In aspects, the network to which the device may connect can be a cloud-based network, or other type of local or remote network. The device may also be one that has one or more moving parts, such as would be seen in autonomously controlled units that can move in one way or another to achieve a physical task.

In embodiments, the device is capable of executing the software of an embodiment to achieve a desired goal. In other embodiments, the device is capable of comprising the software or components thereof, but can execute the instructions of the software only when the device is functionally connected to one or more other devices or one or more pieces of hardware, such as other components of a computer, a network, a micro-controller, a robot, an automated device, or an autonomously controlled device.

In aspects, an embodiment provides an article of manufacture comprising the software of an embodiment. For example, in embodiments, the article of manufacture can be a storage medium comprising the software of an embodiment. The article of manufacture can be any of the various articles known in the computer art as useful for storing, either permanently or ephemerally, computer programs or software. It can be a removable storage medium, such as a disk (e.g. CD, floppy disk, memory stick, flash memory disk, flash memory disk) or a non-removable storage medium (e.g., hard drive, tape). It can also be a medium accessed directly, remotely accessed, or downloaded from another computer (e.g. the Web, client-server. peer-to-peer). In general, the storage medium can be any known storage medium, such as those based on optical storage of data and those based on magnetic storage of data.

In aspects, an embodiment provides an autonomously controlled device. By autonomously controlled, it is generally meant that the device is capable of controlling one or more actions of itself, either a single time or repeatedly, without or with human intervention. That is, an autonomously controlled device comprises, either intrinsically or in conjunction with another device, sufficient computer software and mechanical elements to carry out one or more actions, without or with limited intervention of a human controller. In embodiments, the autonomously controlled device is provided as a completed unit that is programmed and fabricated to function without further modification of software or hardware (except to replace worn or broken parts or other maintenance or support). In other embodiments, the autonomously controlled device can be provided with software and hardware that is sufficient to achieve a pre-defined goal, but that is also designed to be updated with new software or hardware to adapt to changing conditions or goals. For example, a device that is designed not to be updated can be an automated device for sensing movement in a defined area and generating an alert or other detectable signal, or causing some other action, in response to detection of movement in the area. Because the area does not change over time and the pre-selected alert or other action is adequate to achieve the goal of surveillance and detection, there may be no need to update the device. In contrast, an exemplary device that is designed to be updated can be an autonomous unit that is capable of movement over various terrain, such as a UGV, through the air, such as a UAV, or under water, such as a UUV. Such vehicles can be reprogrammed or have their software updated, either as a periodic re-load or as a continuous, semi-continuous, periodic and/or episodic updating, or "learning" as new environments are encountered or as new units are added as part of a larger force that is intended to act in a coordinated fashion to achieve a goal, such as search or reconnaissance.

One type of autonomously controlled device is a robot. As mentioned above, numerous types of robots are now known or proposed. Any such robot is included within the scope of some embodiments, including, but not limited to, stationary robots and mobile robots. Among the stationary robots, exemplary ones are those that function without movement to achieve a task (e.g., by detection of movement or sound), and among the mobile robots are those that function, at least in part, with movement to achieve a task (e.g., automated devices for building other machines or devices, such as automobiles, UGV, UAV, and UUV). Exemplary robots thus include those for household applications, such as vacuums and security devices; those for industrial applications, such as those used in making motorized vehicles, and those for stocking, retrieving, and maintaining retail inventories; and those for military applications, such as UGV, UAV, and UUV applications. Other examples of robots and autonomous units can include entertainment robots and toys, sports playing robots, fire extinguishing robots, robotic lawn mowers, robotic fanning equipment, robotic and moving cameras, robotic vehicles in factories, robotic vehicles for planetary exploration, robotic vehicles for hospital supply and mail delivery, unmanned air vehicles, drones, unmanned underwater vehicles, unmanned sea vehicles, unmanned ground vehicles, articulated robotic building structures, bulk measurement scanning applications. automatic identification applications, classification and scanning applications, mine analysis and detection robots, among others.

The autonomously controlled devices of an embodiment can comprise hardware (including both computer hardware and other mechanical components for structure and movement) and software. The software is any software that can contain instructions for autonomously controlling the device, such as described elsewhere herein. The software can be written in any programming language and implemented in any type of computer hardware/software combination. Connections for hardware components running the software, and for the software itself, can be any connections known in the art as useful for implementing software. For example, connections that allow the software to load, execute, or communicate with devices or other software can be by way of electrical connections (e.g., wiring) or any type of signal or channel, including those based on electromagnetic radiation (e.g., light/optical, infrared, microwave, radio wave), acoustic, and/or other signals. Furthermore, the hardware for the structural components of the autonomously controlled devices may be any suitable hardware, fabricated from any suitable material. that is capable of achieving the pre-defined goal of the device. Thus, hardware and mechanical components may be fabricated from any combination of metals (e.g., iron, steel, aluminum, tin), plastics or other polymeric materials, glass, fiberglass, and the like. The hardware and mechanical components may be connected to each other, including parts comprising software, through any suitable connectors, fasteners, etc., such as, but not limited to, bolts, screws, rivets, wires, rods, hook-and-loop fasteners, adhesives, welds, magnetization, and friction fits.

In yet a further aspect, an embodiment provides methods for controlling an autonomously controlled device. In general, the methods comprise providing a set of instructions in the form of computer software that is functionally connected to the device; and executing the software to effect desired action by the device. By "functionally connected" it is meant that the software, when executed either completely or partially, causes one or more piece of the hardware or mechanical components to perform a task. For example, software that is functionally connected to a wheeled vehicle can receive information from a sensor (e.g., optical information indicating an obstacle is in front of the vehicle) and cause a motor within a steering mechanism of the device to engage, resulting in turning of the front wheels of the device to avoid the obstacle detected by the sensor.

Because an embodiment provides a general purpose platform and rich suite of services for which any type of robotics and automation application may be built, some of the services and built-in features of an embodiment may not always be used in every application scenario. Thus, for example, while the ability to configure and/or fuse one or more sensors, one or more behavioral conduct operations, and one or more actuators is provided by an embodiment, one use of an embodiment may be to employ an embodiment for distributed sensing applications wherein no actuators are used even though the embodiment provides such a capability. Furthermore, various built-in and configuration properties are provided by an embodiment but not all such built-in features or configuration properties may be utilized in a given system that incorporates the embodiment.

In embodiments, the methods further comprise modifying the software. For example, the methods can comprise updating the software to include new services. The methods can likewise comprise adding drivers or other applications to the software to provide specific functionalities for particular pieces of hardware of the device or for particular pieces of software to integrate. For example, the methods can comprise installing a software application for controlling a steering mechanism or for controlling a rotatable optical sensor. Modifying the software can also include installing updates to modify the functioning of the software as new or additional independent devices are provided, such as when the device is converted from a single unit to a member of a multi-unit force, as might often occur in military applications.

Provisioning or providing the software can occur prior to fabrication of the device, during fabrication of the device, or after fabrication of the device. Likewise, modifying the software can occur before, during, or after fabrication of the device. Thus, modifying the software may be accomplished by physical connection of one or more computers capable of modifying the software to the device, or from a distance, such as by way of transmission of updates via radio signals to the device. Similarly, hardware or mechanical components of the device may be modified, repaired, replaced, added, or removed at any time during fabrication and use of the device. Changes to the software and hardware may be made independently of each other, but are often made at the same time.

In aspects, according to methods of an embodiment, the desired action by the device can be any action. Thus, although the action is often physical movement of one or more parts of the device, it need not be so. Rather, the desired action may be physical movement or simply processing of information received from one or more sensors. In such a situation, the action may further comprise communicating the sensor information, or processed information from that sensor information, to one or more computers, which can be located in close proximity or at a distance. Accordingly. the action can comprise receiving sensor information and forwarding that information to another processor for processing and decision-making. The action also may comprise receiving information or instructions from a processor outside of the device, and causing an action to occur based on that information. For example, a robot may include the software of an embodiment, an optical sensor, and software for specifically controlling the optical sensor. The optical sensor may detect movement in a building and send that information to the software of an embodiment. The software may then forward that information to a control center hundreds of meters or kilometers away. A computer at a control center, which may be controlling multiple similar units, may send instructions back for the robot to proceed into the building. The software of an embodiment would receive those instructions and cause the robot to move into the building.

The software of an embodiment may also be used in simulation or development environments. That is, extensions of the software may be used to integrate the software into other software packages for simulating or developing robotics and automation applications. For example, extensions of an embodiment may provide software that simulates sensor information and environment reactions to actuators. An embodiment may be used in such an environment for simulation of robotics and automation applications. As another example, an embodiment may be used inside of or in conjunction with a development environment used to build robotics and automation applications.

In another aspect, an embodiment provides methods for using a GPROS. In aspects, the methods can comprise: providing a set of application services for accessing configuration data using a generic abstraction, such that the accessing is independent of any underlying hardware platform that is capable of performing any communication or operational conduct for any communication or operational task. The methods can further comprise executing one or more of the application services. In embodiments, the methods can further comprise one or more of the following steps (in any order): utilizing the generic abstraction to allow configuration data to be stored across different sources (also referred to herein as the config service); utilizing the generic abstraction to create objects in a dedicated, shared, or pooled fashion (also referred to herein as registry service); utilizing the generic abstraction to link one or several peripherals to one or several interfaces (also referred to herein as comm service); utilizing a generic abstraction to create and terminate synchronous, asynchronous, and real time application threads (also referred to herein as ap service); utilizing a generic abstraction to allow client code to communicate with a remote server via a client-side envoy (also referred to herein as envoy service); utilizing a generic abstraction to allow for interacting with and managing peripherals external to any hardware system (also referred to herein as peripheral service). This aspect is also a method for using a general purpose robotics operating system (GPROS), wherein the method comprises: providing a set of robotics application services to access configuration data using a generic abstraction, such that the accessing is independent of any underlying hardware platform that is capable of performing any communication or operational conduct for any communication or operational task. In embodiments, the method further comprises: utilizing a generic abstraction for sensors (also referred to herein as sensors service); providing base abstractions for range-type sensing (also referred to herein as range service); providing base abstractions for laser radar (L_ADAR) (also referred to herein as ladar service); providing base abstractions for dealing with LADAR-type range sensing using the SICK LMS product (also referred to herein as ladar sick service); providing base abstractions for radar-type range sensing (also referred to herein as radar service); providing base abstractions for radar-type range sensing using the vorad vbox radar product (also referred to herein as radar vorad service); providing base abstractions for camera-type sensing (also referred to herein as camera service); providing base abstractions for dealing with camera-type sensing using the MobilEye camera product (also referred to herein as camera mobileye service), providing base abstractions for dealing with camera-type sensing using the Point Grey camera products (also referred to herein as camera ptgrey service); providing base abstractions for sensing reference points including position and orientation (also referred to herein as reference service); providing base abstractions for geographic reference positioning and orientation (also referred to herein as reference geo service); providing abstractions that deal with parsing and interpreting GPS-type information in the NMEA format (also referred to herein as reference nmea service); utilizing a generic abstraction for operations to control mechanical hardware (also referred to herein as mechanism, gear service); utilizing a generic abstraction for actuators (also referred to herein as actuator service); providing abstractions for motors in a system (also referred to herein as motor service); utilizing timer capabilities, thereby providing a set of abstractions for actuating motors using pulse-width-modulated (PWM) method (also referred to herein as timer, pwm service); utilizing a generic abstraction to model robotic conduct (also referred to herein as conduct service); utilizing a generic abstraction to mobilize robotic conduct (also referred to herein as mobility service); utilizing a wheeled platform; utilizing a legged platform; utilizing a tracked platform; utilizing flight operations, including helicopter operations: utilizing a generic abstraction for navigation, thereby providing abstractions for encapsulating a route and course over which a robot travels; planning the navigation of a robot; and encapsulating route planning based on map data. The method may also comprise utilizing generic abstractions to determine and standardize the behavior of a group of robots, and initialize and terminate their behaviors; and utilizing rules engines or neural networks to encapsulate rules of behavior (also referred to herein as rules, neural service).

In other aspects, an embodiment provides systems for using a general purpose robotics operating system (GPROS), where the systems can comprise: providing a set of application services for accessing configuration data using a generic abstraction, such that the access is independent of any underlying hardware platform that is capable of performing any communication or operational conduct for any communication or operational task. The systems can further comprise executing the set of application services, or a subset thereof, to achieve a pre-defined goal. In embodiments, the system further comprises: utilizing the generic abstraction to allow configuration data to be stored across different sources (also referred to herein as the config service); including the generic abstraction to create objects in a dedicated, shared, or pooled fashion (also referred to herein as registry service); utilizing the generic abstraction to link one or several peripherals to one or several interfaces (also referred to herein as comm service); including a generic abstraction to create and terminate synchronous, asynchronous, and real time application threads (also referred to herein as ap service); utilizing a generic abstraction to allow client code to communicate with a remote server via a client-side envoy (also referred to herein as envoy service); utilizing a generic abstraction to allow for interacting with and managing peripherals external to any hardware system (also referred to herein as peripheral service). In yet other embodiments, an embodiment provides a system for using a general purpose robotics operating system (GPROS), where the system comprises: providing a set of application services for accessing configuration data using a generic abstraction, such that the access is independent of any underlying hardware platform that is capable of performing any communication or operational conduct for any communication or operational task. Systems according to an embodiment can further comprise executing some or all of the application services. In some embodiments, the methods can further comprise: utilizing a generic abstraction for sensors (also referred to herein as sensors service); providing base abstractions for dealing with range-type sensing (also referred to herein as range service); providing base abstractions for laser radar (LADAR) (also referred to herein as ladar service): providing base abstractions for LADAR-type range sensing using the SICK LMS product (also referred to herein as ladar sick service); providing base abstractions for radar-type range sensing (also referred to herein as radar service); providing base abstractions for radar-type range sensing using the vorad vbox radar product (also referred to herein as radar vorad service); providing base abstractions for camera-type sensing (also referred herein as camera service); providing base abstractions for dealing with camera-type sensing using the MobilEye camera product (also referred to herein as camera mobileye service), providing base abstractions for dealing with camera-type sensing using the Point Grey camera products (also referred to herein as camera ptgrey service); providing base abstractions for sensing reference points including position and orientation (also referred to herein as reference service); providing base abstractions for geographic reference positioning and orientation (also referred to herein as reference geo service); providing abstractions for parsing and interpreting GPS-type information in the NMEA format (also referred to herein as reference nmea service); utilizing a generic abstraction for controlling mechanical hardware (also referred to herein as mechanism, gear service); utilizing a generic abstraction for actuators (also referred to herein as actuator service); providing abstractions for motors in a system (also referred to herein as motor service); utilizing timer capabilities, thereby providing a set of abstractions for actuating motors using pulse-width-modulated (PWM) method (also referred to herein as timer, pwm service); utilizing a generic abstraction for modeling robotic conduct (also referred to herein as conduct service); utilizing a generic abstraction for mobilizing robotic conduct (also referred to herein as mobility service); utilizing a wheeled platform; utilizing a legged platform; utilizing a tracked platform; utilizing flight operations, including helicopter operations; utilizing a generic abstraction for navigation, thereby providing abstractions for encapsulating a route and course over which a robot travels; planning the navigation of a robot; encapsulating route planning based on map data; utilizing generic abstractions to determine and standardize the behavior of a group of robots, and initialize and terminate their behaviors; and utilizing rules engines or neural networks for encapsulating rules of behavior (also referred to herein as rules, neural service).

BRIEF DESCRIPTION OF THE DRAWINGS

The accompanying drawings, which are incorporated in and constitute a part of this specification, illustrate various embodiments and together with the written description, serve to explain various principles and details of some embodiments.

DETAILED DESCRIPTION

Some aspects will now be described with reference to various exemplary embodiments. Although the following detailed description will describe only certain embodiments, the disclosure should not be considered to be limited to those embodiments.

The following detailed description refers to the figures, which show various features of some embodiments. It is to be noted that some or all of these features may be included in the various embodiments. Those of skill in the art may select which features and combinations of features and hardware and mechanical components to include in a particular embodiment based on the particular uses of the software platform and hardware and mechanical components that are desired. In addition, the following detailed description provides and discusses various UML class/concept diagrams and UML sequence diagrams. It is understood by those of skill in the art that there are many tools commonly available that enable one to generate source code from such diagrams, alone or upon inclusion of non-critical details for implementing the actions depicted in the diagrams, and that the diagrams can be used to generate software in any of the various languages typically used in the art, such as, but not limited to, Java and C++. One non-limiting example of a tool that is available to programmers is the Rational Rose program.

Structural Aspects

Figure 1:
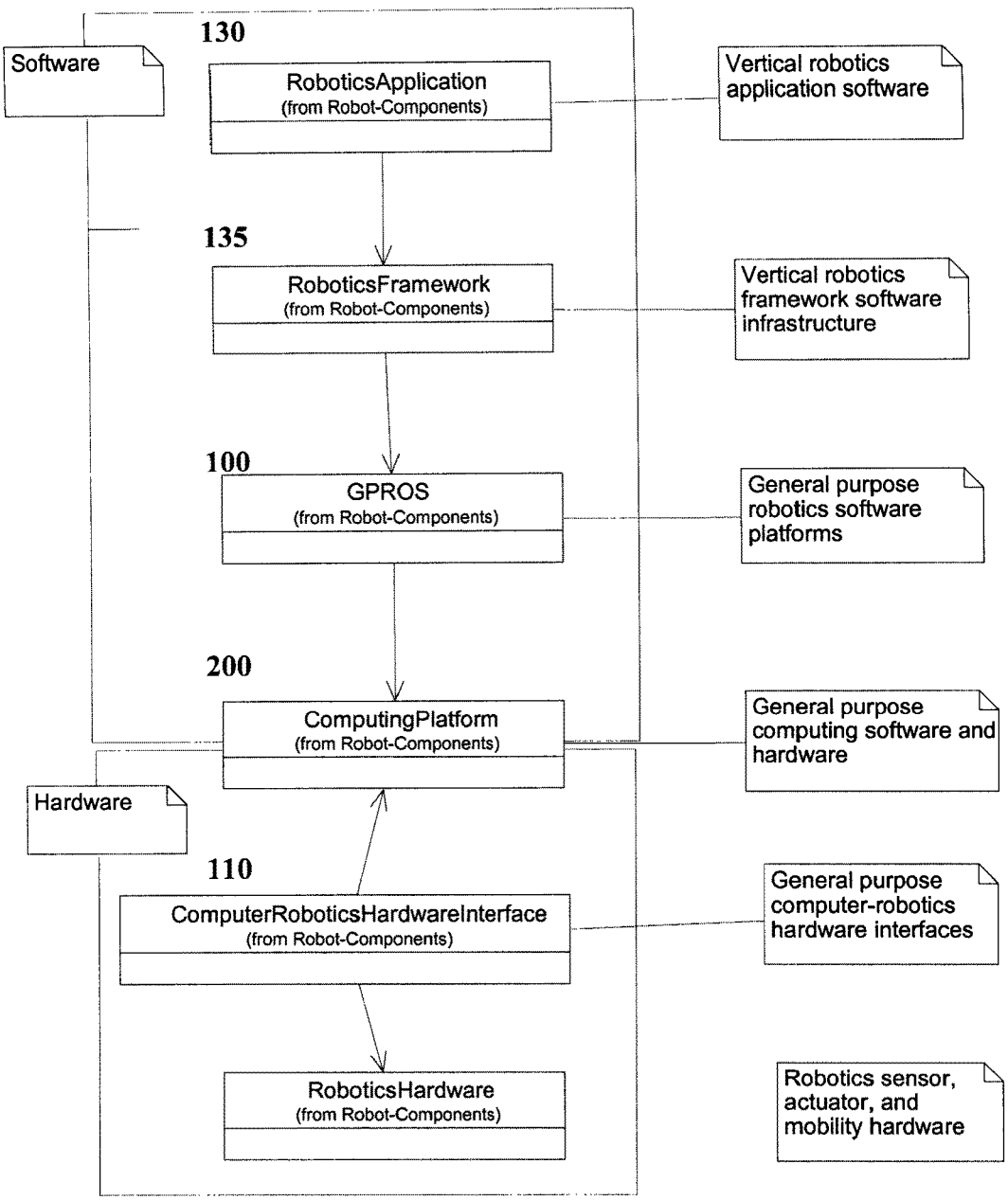
FIG. 1 is a UML class/concept diagram that illustrates the General Purpose Robotics Operating System (GPROS) Context, according to some embodiments.
Figure 2:
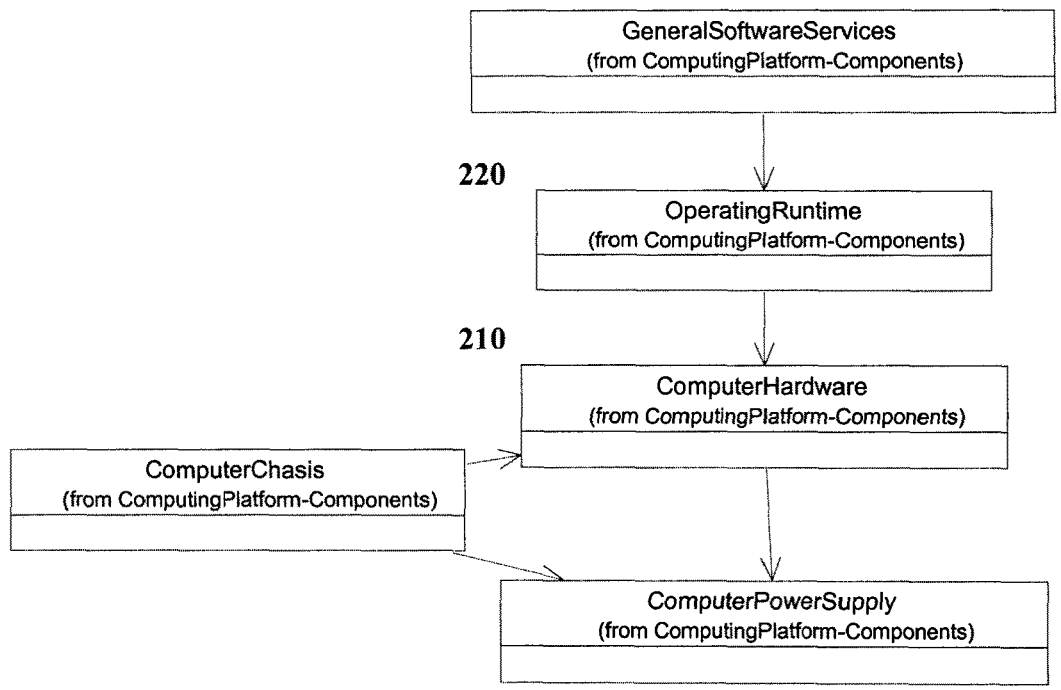
FIG. 2 is a UML class/concept diagram that illustrates a computing platform, according to some embodiments.
Figure 3:
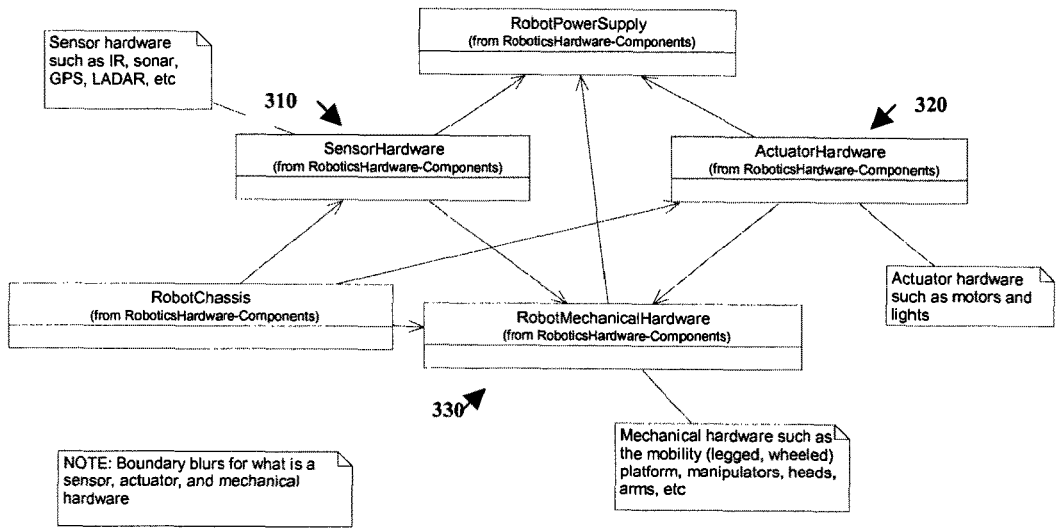
FIG. 3 is a UML class/concept diagram that illustrates the layout of actual robotics hard ware, according to some embodiments.

FIGS. 1-4 present a general context in which embodiments can be applied or operate. A General Purpose Robotics Operating System (GPROS) 100 serves to encapsulate operations and functionality common to all robotics applications. The GPROS runs on top of a computing platform (FIG. 2) 200 comprising computing hardware 210 (e.g., a standard micro-processing and/or micro-controller environment), a computing operating system or runtime 220 (e.g. Windows, Linux, Java virtual machine, micro-controller runtime), and additional computing software platform components (e.g., serial port driver, proprietary sensor driver). By use of a computing platform 200, access to robotics hardware 300 is allowed. Robotics hardware (FIG. 3) 300 may comprise robotics sensors 310, actuators 320, and mechanical components 330. Robotics hardware 300 may sometimes be directly connected to existing computing platforms 200 (e.g., via serial ports or USB ports) but may also require additional intermediate computer to robotics hardware interfaces 350 as illustrated in FIG. 1. Such a hardware interface may include motor drivers, analog I/O ports, digital I/O ports, and/or real-time and deterministic processing support.

GPROS, as depicted in FIG. 1, allows for specific robotics applications 130 to be created. For example, an autonomous unmanned ground vehicle (UGV) application for traversing a long distance within a route corridor while avoiding obstacles may be built on the GPROS, leveraging common robotics software services. The same common GPROS robotics software services may also be leveraged by an autonomous unmanned air vehicle (UAV) application, and/ or a UUV vehicle, such as a submarine or other submersible vessel. As shown in FIG. 1, additional commonality across specific vertical robotics applications are broken up into frameworks built on top of GPROS 100. These vertical robotics application framework (VRAF) 135 instances extend the GPROS 100 for specific vertical applications. Software services common to a specific vertical application domain are encapsulated within a framework. For example, a UGV framework that resides on GPROS 100 provides for generic use across any type of UGV application.

Figure 4:
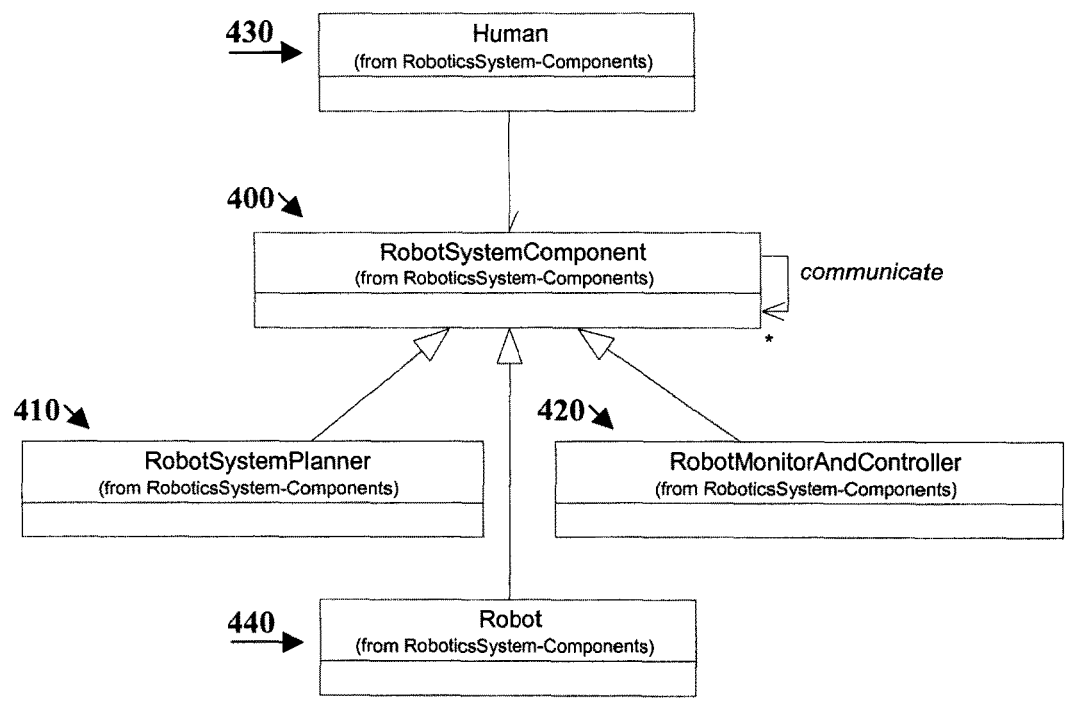
FIG. 4 is a UML class/concept diagram that illustrates general robotics applicability, according to some embodiments.

The GPROS 100 is not limited to software or firmware that runs onboard a robot. It may encapsulate common robotics software services that also run inside a centralized robot system planning tool 410 or inside of a robot monitoring and control device 420. A human 430 will often interact with the robot 400 directly, through a system planner, or through a monitoring and control device. The GPROS 100 may run in any such incarnation and environment. FIG. 4 depicts these relations and common inheritance hierarchy.

A set of common services exist within GPROS 100 that provide a rich and generic set of services. These services are defined in a generic fashion and are in fact not limited to robotics and automation applications. They in fact have applicability to a wide variety of applications. They are defined here, however, because they are heavily leveraged by GPROS and form the basis for many of its features.

The GPROS hence provides services common to any robotics and automation application. A set of robotics and automation specific services that may be commonly leveraged by any robotics and automation application are provided by GPROS. A set of general software application services that may be commonly leveraged by software application are also provided by GPROS. These general software application services are extended and used by the robotics and automation application specific services in a combined fashion within GPROS.

A VRAF extension of GPROS provides services common to a specific vertical robotics and automation application domain. A set of robotics and automation services specific to a particular vertical application domain (e.g., UGVs, UAVs) that may be commonly leveraged by any robotics and automation application in a vertical application domain are provided by a VRAF. The GPROS services are extended and used by VRAF services in a combined fashion.

By using some embodiments' services, robotics and automation applications inherit complete static and dynamic configurability, configurability using any underlying configuration medium, automateable assembly and construction based on configuration information, automateable deployment based on configuration information, configurable and distributable lifecycle management, configurable ability to plug-in any underlying distributed service communications approach, generic means for handling messages and data, generic means for configuring one or more application peripherals to interoperate with one or more external communication interfaces, generic means for encapsulating behavior, generic means for interfacing with and managing electronics hardware interfaces, and other core services. Provision of all of these services in a combined fashion enables robotics application providers (e.g., developers and tools) to focus on specifying the business logic and configuration data specific to a robotics or automation application. The GPROS engine provides the rest and hence a platform atop of which robotics and automation applications can be more rapidly, dynamically, extensibly, and affordably developed, configured, assembled, deployed, distributed, and managed. These common services are defined in such a way that they are not bound to robotics and automation applications but can be useful for any application development approach.

Figure 5:
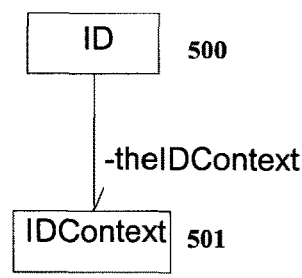
FIG. 5 is a UML class/concept diagram that illustrates the ID service, according to some embodiments.

FIGS. 5-19 illustrate general application services. FIG. 5 illustrates the ID service. The ID 500 service contains abstractions that encapsulate the identification of information in a system. IDs 500 are used throughout the system to identify attributes, objects. data, behavior, state, and other concepts. An ID 500 can be used as a name to reference some object. IDs 500 are commonly used to look up handles to services and other objects. The ID abstraction encapsulates an identifier of "something". It may identify an object, an attribute, a class, or some other entity. This ID class is a basic class whereby no constraints are imposed on the structure of an ID or on its uniqueness within an ID context. The IDContext 501 abstraction encapsulates a context within which an ID is valid and perhaps unique.

Figure 6:
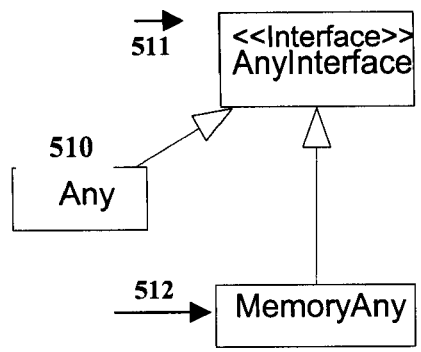
FIG. 6 is a UML class/concept diagram that illustrates the ANY service, according to some embodiments.

FIG. 6 illustrates the Any service. The Any 510 service provides generic abstractions to encapsulate any type of data or behavior in a system. Any sort of data may be attached and retrieved, and behavior may be registered and invoked using the abstractions in this service. The AnyInter-face 511 and Any 510 abstractions provide an interface and implementation, respectively, of a generic container of data and behavior. Any type of object data may be attached or retrieved from Any 510 objects including collections of objects. Any sort of behavior may also be registered and invoked on Any 510 objects. The storage of data and behavior in Any 510 objects is decoupled from their interface. The data for an Any 510 may, for example, be stored in memory, in a database, or in a remote server object. A default and concrete AnyInterface 511 implementation, MemoryAny 512, stores data and behavior in memory.

Figure 7:
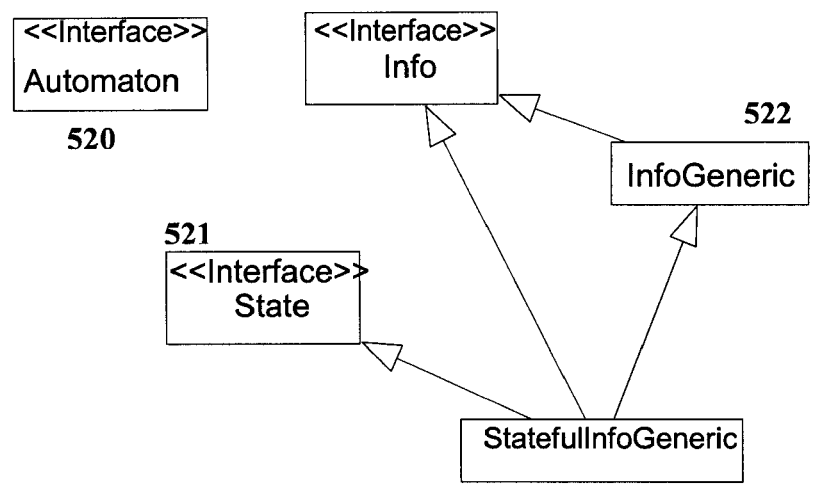
FIG. 7 is a UML class/concept diagram that illustrates the AUTOMATON service, according to some embodiments.

FIG. 7 illustrates the Automaton service. The Automaton service 520 provides base abstractions for encapsulating finite state automata. Information flowing through an Automaton 520, the state of the Automaton 521, and the functionality of the Automaton itself 522 are all encapsulated within this service.

Figure 8:
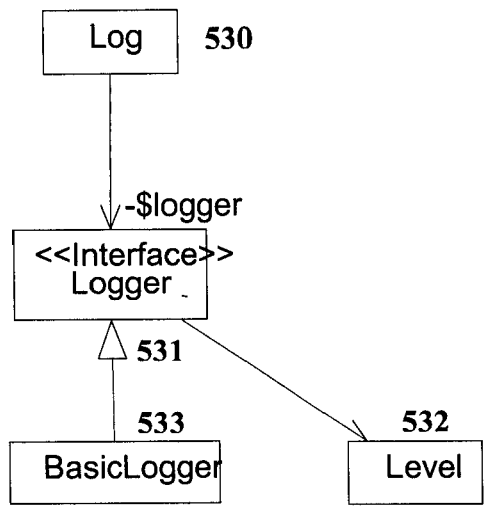
FIG. 8 is a UML class/concept diagram that illustrates the LOG service, according to some embodiments.

FIG. 8 illustrates the Log service. The Log service 530 provides a generic interface for logging information in the system. A Log 530 abstraction is used to log information from within applications defined according to different log levels 532 of importance. A Logger 531 interface provides a generic interface from which different types of concrete logging mechanisms may be implemented such as logging to a file, logging to a database, or logging to a remote server. A basic default logger 533 implementation logs to a log file or standard output stream. A generic interface is provided such that third-party logging mechanisms may also be configured into the system without changing application code.

Figure 9:
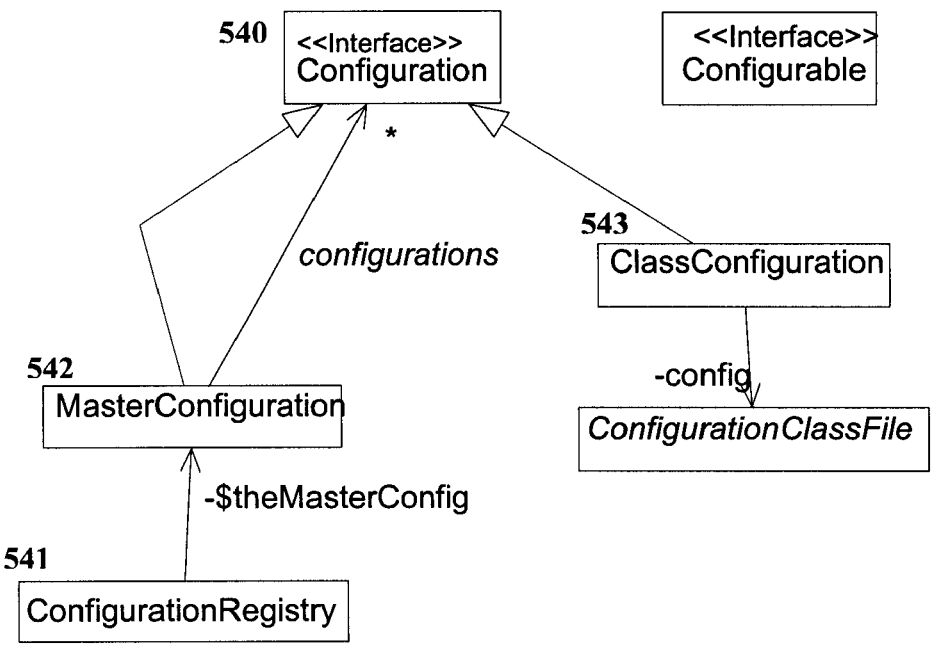
FIG. 9 is a UML class/concept diagram that illustrates the CONFIG service, according to some embodiments.

FIG. 9 illustrates the Config service, which provides a generic means for configuring applications. The Config service 540 leverages the Any service 510 for providing generic access to data storable across different underlying mediums transparent to the application interface. The Config service 540 extends the Any service 510 by providing specific calls and services that relate to retrieving and storing configuration data. Thus, configuration data may be stored in any type of underlying storage medium (e.g., file, XML, database, remote server, etc). In addition, the Config service 540 permits access to configuration data stored in one or more mediums. Thus some configuration data may be stored in multiple XML files while some data may be stored in a database. The dynamic update of configuration data in those mediums may also be dynamically propagated to the applications. Thus, while configuration data may be accessed upon application initialization. any new changes to configuration data may be dynamically propagated to an application at run time. A Configuration-Registry 541 abstraction encapsulates a central registry for accessing configuration information. Calls made on the ConfigurationRegistry 541 return access to a registered MasterConfiguration 542 serving as the root for one or more Configuration object handles. The MasterConfiguration 542 manages access to configuration information across different Configuration instances. A Configuration is a type of Any interface 510 for storing and retrieving information used in configuring an application. Configuration information may be stored in different underlying mediums 543 such as configuration files, XML documents, databases, statically in code (e.g., class files), or remote servers. Concrete configuration implementations handle mapping the generic configuration calls to specific underlying configuration stores. Third-party configuration sources may also be plugged into this framework by extending the Configuration implementation. Applications and objects that permit themselves to be configured by the Config service 540 implement the Configurable interface.

Figure 10:
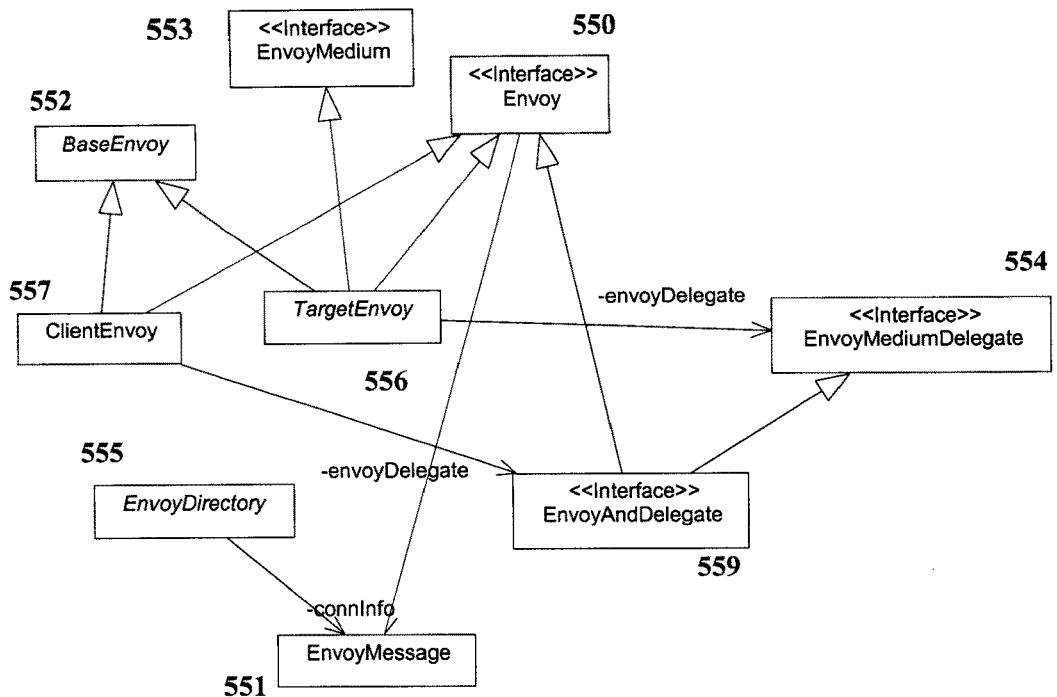
FIG. 10 is a UML class/concept diagram that illustrates the ENVOY service, according to some embodiments.

FIG. 10 illustrates the Envoy service. The Envoy service 550 provides a set of abstractions that enable a generic way to communicate with any object in the system in a distributed or decoupled manner transparent to the object code. Hence, application code communicating with an object can be designed to communicate with that object directly in memory using its object interface. During configuration, a handle to the object may be obtained which uses the Envoy service 550 to transparently route any invocations on an underlying client envoy to a target envoy 556 over any type of communications medium. Thus application code can remain unchanged and statically or dynamically configured to route invocation requests to objects that exist somewhere else on a network transparent to the client service. Support for different types of underlying communication mediums (e.g., Web services, CORBA. RMI, serial communications) can be provided using this mechanism. The EnvoyMessage 551 extends the Any service abstractions to encapsulate a message that may be delivered between envoys. The Envoy interface provides the base interface 552 implemented by envoys which allows an envoy to invoke an operation on another envoy by passing it an EnvoyMessage 551 and by receiving a return EnvoyMessage 551. EnvoyMedium 553 and EnvoyMediumDelegate 554 objects provide handles for underlying concrete envoy medium types. A concrete envoy medium may be a remote Web service medium, a distributed object medium such as CORBA or RMI, a serial communications medium, a publish-subscribe middleware service, or some other medium over which Envoy may communicate. The EnvoyDirectory 555 provides a service for registering envoys using a particular envoy medium and for looking up handles to those envoys via the medium. A TargetEnvoy 556 represents the generic server side of an envoy communication. The TargetEnvoy 556 provides services for registering and configuring an object which provides the actual business logic desired to be invoked. A ClientEnvoy 557 represents the generic client side of envoy communication. The ClientEnvoy 557 provides services for looking up handles to target envoys and provides the root calls that may be made for invoking that target envoy 556. The BaseEnvoy 552 provides services common to the ClientEnvoy 557 and TargetEnvoy 556 for obtaining handles to EnvoyDirectory 555 objects and creating handles for EnvoyMediumDelegate 554 objects.

Further elaborating on a concrete envoy medium for publish-subscribe services, a PublishSubscribeEnvoyMedium is a specialized Envoy service that provides services which allow for topics to be subscribed to by interested listeners and to which publishers can publish messages which get routed to those listeners. Multiple publishers can publish to a topic and multiple subscribers can subscribe to a topic.

The Registry service allows objects to be created based on a policy such as in a dedicated. shared, or pooled policy fashion, among other pluggable policies. An ObjectRegistry abstraction provides a means for obtaining handles to existing objects and creating new objects and services given their IDs. The ObjectRegistry uses the Config service 540 to obtain configuration information for a particular object. Hence, object configuration information may be stored in files, XML documents, databases, remote servers, etc. The object handle may be newly instantiated or simply returned if already created. Different policies may be configured for each object type indicating if the object handles should be returned solely for use by requesting client, if it may be shared across other clients, or if it should be returned from a pool of similar objects. Hence, whenever an object or service is to be obtained or created in the system, the ObjectRegistry may be consulted to provide that handle. The ObjectRegistry then handles determining how the object should be returned and may populate it with all of the necessary configuration and initialization information. This configuration information is configurably stored in any type of underlying medium. The ObjectRegistry may provide a handle to an object that exists in memory or perhaps via the Envoy service 550. An ObjectLauncher abstraction provides a generic means for creating a main entry point for starting a process, initiating the configuration of the process using the ObjectRegistry, and for instantiating and managing all root objects for the process.

Figure 11:
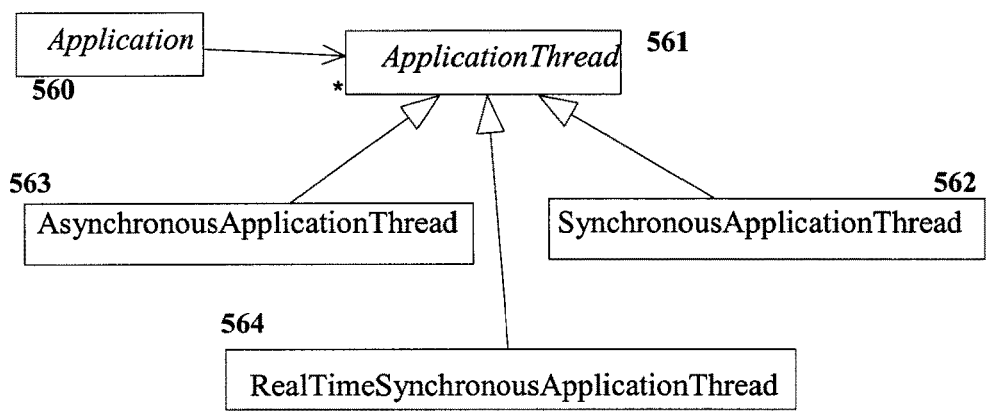
FIG. 11 is a UML class/concept diagram that illustrates the AP service, according to some embodiments.

FIG. 11 illustrates the Ap service. The Ap service provides a generic framework for encapsulating applications. An Application abstraction 560 provides a core set of services for launching, initializing, configuring. starting, pausing, stopping, and shutting down an application process. Concrete applications can extend or use this abstraction. A generic means for launching applications is also possible via the ObjectLauncher. The application can create additional application threads to encapsulate a thread within a process. The ApplicationThread 561 abstraction serves as a base generic encapsulation of an application thread. Concrete but generic threads exist for encapsulating synchronous 562, asynchronous 563, and real time synchronous threads 564. The Ap service also provides a means for configurably linking an ApplicationThread to a Component in a system such that a system component can be triggered by the thread according in a configurable manner.

Figure 12:
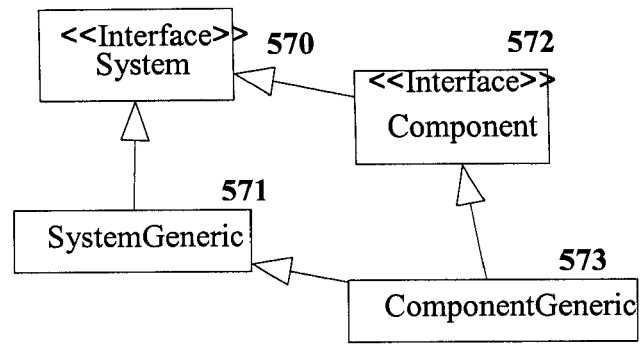
FIG. 12 is a UML class/concept diagram that illustrates the SYSTEM service, according to some embodiments.

FIG. 12 illustrates the System service. The System service provides base abstractions for assembling systems and their components. Envoys 550 are provided which enable remote communication with any sort of system or component to be configured transparently. The System.inter-face 570 and generic SystemGeneric 571 implementation provide base abstractions for configuring and accessing a system of components. The Component interface 572 and generic ComponentGeneric 573 implementation provide base abstractions for linking components together and inducing interactions between components.

The System service concept expressed is further extended to embody, inside of the SystemGeneric abstraction, more general re-usable services. By viewing SystemGeneric, as a generic implementation of a system, SystemGeneric has been extended in concept to serve as a concrete realization of a finite state automation. It is an abstract representation of a concrete system. As such, any typical object, which is not purely information, can be viewed as a system.

In the duality of systems theory, there is information and the automaton. SystemGeneric is extended to become the latter. In more object oriented programming terms, when considering entities and controls/behaviors, this is the latter. It's the embodiment of logic, operation, behavior, state transformations, and the like, as opposed to the information which flows through the system undergoing transformations by objects such as this one.

As an application service, SystemGeneric may also be further extended by sub-classes. Concrete sub-classes of this class can refine and provide more application-specific interfaces for programmers. But those sub-classes can reap the benefits of the services provided by SystemGeneric and make calls "up" to the base class, and wrap such calls with more application-specific interface names.

However, in terms of a class which can provide a "standard" for tools such as GUI-based robot creation, automated code generation, and other tools and practices whereby high levels of code reusability and standardization is helpful, this class satisfies those needs. How can we reduce the amount of code we write which is repetitive and redundant? What common operations and behaviors and patters can we extract which are common and fundamental and embody in code to relieve us from re-writing such code time and again? This class plays a key role in addressing those questions. GPROS also contains an InfoGeneric abstraction as its informational only complement.

A SystemGeneric abstraction has sub-components There are mapped and ordered sub-component types.

Mapped: A System can have sub-components registered with it. The sub-components have an ID and are associated by ID with this System. The sub-components are themselves systems. This is a map of sub-components.

Ordered: A System can have a set of ordered sub-components and configurable with a naming convention for IDs and where they're stored. As an example, this can apply to laser-based toll plazas having lane groups which have lanes which have lasers per lane. And there is an ordering of sub-components within each system. Each sub-component is a system as well. This is essentially a numbered sequence of sub-components.

A SystemGeneric abstraction also has triggers. There are event-based triggers, triggers that always fire for triggering other system objects, and conditional triggers.

Event-Based: A map of other systems can be specified for triggering by this system. That is, when triggered, this system will call the other's trigger( ) methods. These triggers trigger other objects based on registered events.

Always: A collection of other systems that are always triggered by this system.

Conditional: A collection of other systems that are conditionally triggered by this system. That is, conditions are evaluated and then the other systems triggered based on evaluation of such conditions. Thus, one or more conditions may be associated with whether or not one or more triggered system components are triggered.

This more general means for triggering systems is actively used and applied by sub-classes that embody autonomous ground vehicle movement planner and maneuver/maneuver action structure.

One or more parameterized conditions are evaluated to determine whether configured System objects should be executed. If there are one or more System objects (acting as finite state automata) are active or activated, arbitration, based on configurable priority, is used to determine which of the System objects may actually remain active, and which must be paused or stopped in favor of a higher priority System object.

During the course of execution of a System object, one or more parameterized conditions are evaluated to determine whether or not one or more other System objects registered to be triggered by this System object.

One or more conditions can be evaluated to dictate whether or not one or more triggered System objects by the currently active System object are executed. Furthermore, evaluation functions over those conditions may be configured. For example, the Boolean AND or Boolean OR of such conditions can be evaluated to assess whether or not the associated set of System objects should be triggered. Condition evaluation functions are expressible in a configurable format to evaluate conditions. A concrete implementation of a conditional evaluation function built into GPROS is regular expressions. But the user may also define other evaluation functions in concrete subclasses of the conditional evaluation abstraction.

Figure 53:
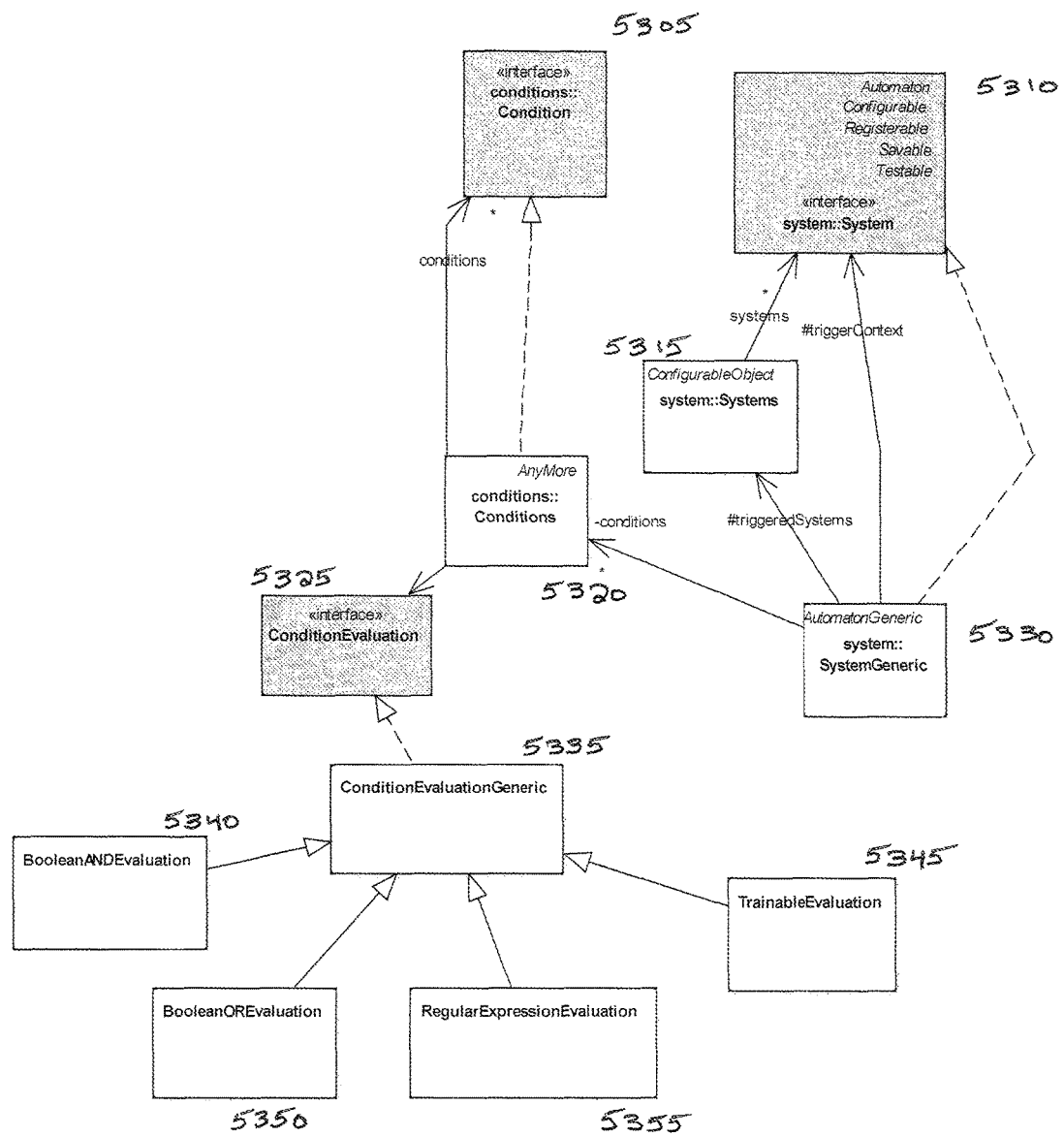
FIG. 53 is a diagram illustrating various extensions to a SystemGeneric abstraction, according to some embodiments.

FIG. 53 depicts extensions to the SystemGeneric abstraction. Here we have SystemGeneric with a handle to a collection of other System objects via a Systems collection object. Thus a SystemGeneric abstraction has a handle to zero or more System objects to trigger via this Systems collection. A SystemGeneric object can have conditions via a Conditions abstraction (from the Conditions service) to call on one or more Condition objects to evaluate before deciding whether or not to move on to the next stage and trigger the next collection of System objects. The recursive nature of this structure allows for an arbitrarily complex and hierarchical system triggering structure. Thus, a SystemGeneric object can have one or more SystemGeneric objects to trigger (via Systems) which in turn can themselves have one or more SystemGeneric objects to trigger, and so on recursively. At each stage, Conditions can be evaluated for determining which systems should be triggered or not.

A ConditionEvaluation interface may be realized by a concrete condition implementation class or a ConditionEvaluationGeneric abstraction. Standard Boolean AND, Boolean OR, and configurable regular expression evaluation objects are also embodied in GPROS. A TrainableEvaluation, also part of GPROS, also provides a service for training the parameters of a general evaluation function with interfaces to the GPROS Conduct services and facilitates machine learning to evaluate conditions.

The Conditions evaluate one or more concrete or generically evaluated conditions to assess whether or not the top-level evaluation of true may be returned to the SystemGeneric object in assessing whether or not to move on to the next stage of system activity.

All of such objects, by virtue of being part of GPROS, can be configured as well. Thus, the conditions and their parameters, the conditional evaluation functions, the System, the association of System objects to other triggered System objects, and the arbitration of which System objects are executed can all be defined in configuration files or objects using the Config service described here. Thus, the definition of new robotics behaviors can leverage existing discrete behavior implementations defined in classes, and be composed all through the configuration of files using the Config service. The scalability and configurability of such an approach in building complex robotics and automation applications is thus dramatically simplified.

Finally, plug-in with embodiments of the Conduct service described below, enable machine learning of how to set the parameters in the config files for such System objects. Via the Logging service, the state of sensors and state of the system is logged as well as which conditions were met along with which System objects were triggered. A Conduct service such as Neural, implementing a neural network for example, can look at the logged information, state of the system, state of inputs, and create new configuration files with new parameters for the conditions to trigger which System objects. The refinement of these parameters conditions using machine learning is thus further fostered by GPROS' combination of Logging, System, Config, and Conduct services.

A Hardware service provides a base Hardware interface and a generic HardwareGeneric implementation encapsulating configurable system components that represent some sort of electronics hardware. Operations common to hardware such as starting up, shutting down. restarting, and failing safe are all supported by this service. Envoys 550 are provided that enable remote communication with any sort of electronics hardware to be configured transparently. The Hardware service extends the system service.

Figure 13:
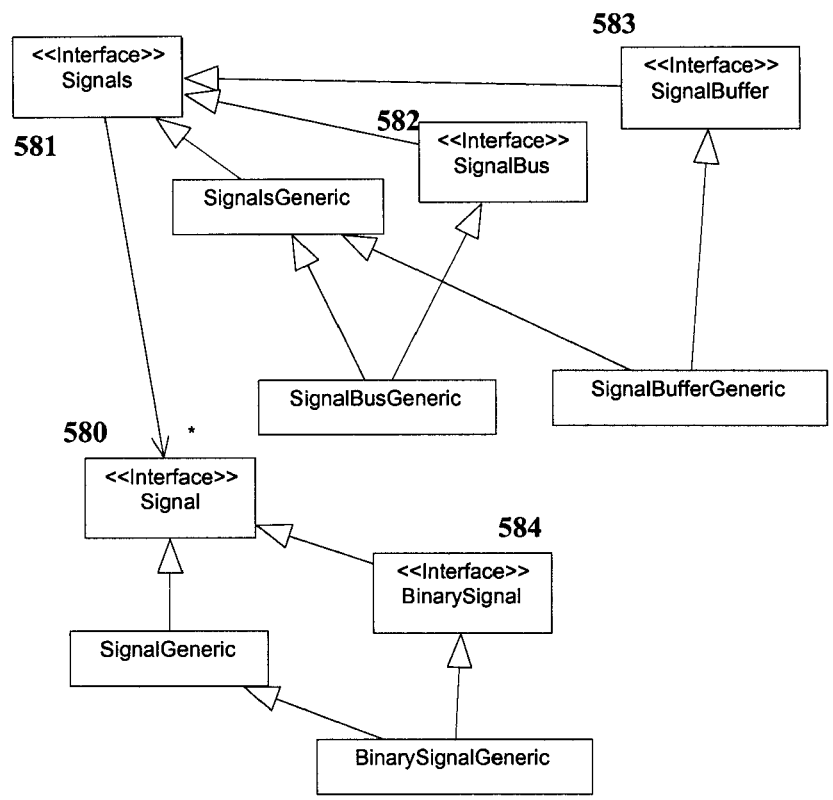
FIG. 13 is a UML class/concept diagram that illustrates the SIGNALS service, according to some embodiments.

FIG. 13 illustrates the Signals service. A Signal 580 represents a unit of information and Signals 581 represent collections of such information used in communication between system components. A SignalBus 582 represents a specific type of Signals collection for communicating over a randomly accessed system bus. A SignalBuffer 583 represents a specific type of Signals collection for communicating over a buffered sequential access medium. A specific type of signal 580, termed a Binary Signal 584, is used to encapsulate signal information that is binary (0 or 1, false or true) by nature or may have a "floating" state. The Signals Event service provides a means for generically registering interest in events associated with signals 580. Interested listeners for those events may be notified of the events in which they are interested. Notifiers will notify the listeners of the signal events when they occur. Different generic ways to handle signal events are also encapsulated in the Signals Handler service. Common and generic ways to handle signal events such as logging the events, propagating the events to other listeners in a chain, storing events in memory, or parsing events are provided.

A Signals Packet service provides a means for generically lumping signals together into discrete packets. A generic SignalPacket interface and implementation provides a means for collecting Signals into a discrete packet. The packet may have a packet header and may be terminated according to a delimiter or according to a fixed or dynamically defined length. A SignalPackets interface and implementation provides a means for parsing a stream of data into discrete SignalPacket instances. A Signals Mapping service provides a generic means for mapping signals from one form into another. A generic InterfaceMapping interface is concretely realized by a set of generic interface mapping implementations. Generic implementation include means for copying signal data from one Signals object into another, for copying references from one object to another, and for translating binary signals according to Boolean operations. Additional concrete signal mapping implementations are provided elsewhere in the framework or by applications.

Figure 14:
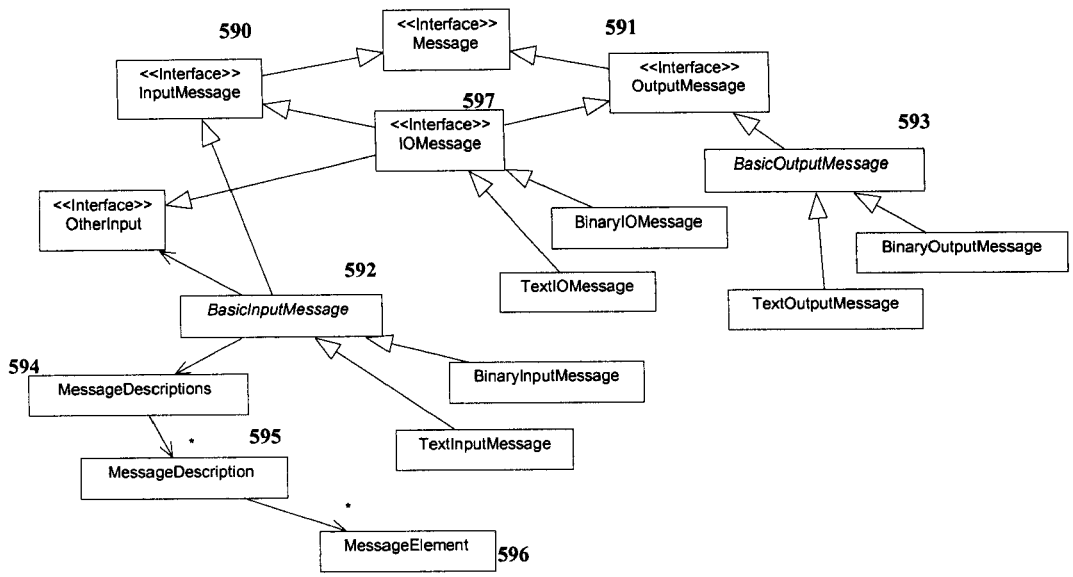
FIG. 14 is a UML class/concept diagram that illustrates the SIGNALS.MESSAGE service, according to some embodiments.

FIG. 14 illustrates the Signals Message service. The Signals Message service provides a set of abstractions used for generically transforming between Signals 581 and generic Any objects 510. When Signal 580 data is received from an input stream, an InputMessage 590 can be used to generically transform that data into more easily accessible and logical Any object 510 data. When Signal data 580 is to be delivered to an output stream, an OutputMessage 591 can be used to generically transform that data from the Any object 510 form to the output signal 580 form. A message that has both input and output translation capability is encapsulated by the IOMessage 597. Base classes for handling input and output messages are contained in the BasicInputMessage 592 and BasicOutputMessage 593 classes. Two generic types of concrete message formats are binary and text based messages for which there exists concrete input, output, and 10 realizations. A generic way to describe how to parse messages between their Signal 580 form and Any 510 form is provided by a MessageDescriptions 594 abstraction. This abstraction contains one or more MessageDescription 595 objects, each of which describes how to parse an individual message. Each MessageDescription 595 contains one or more MessageElement 596 objects which describe how to parse an individual field element within a message.

Figure 15:
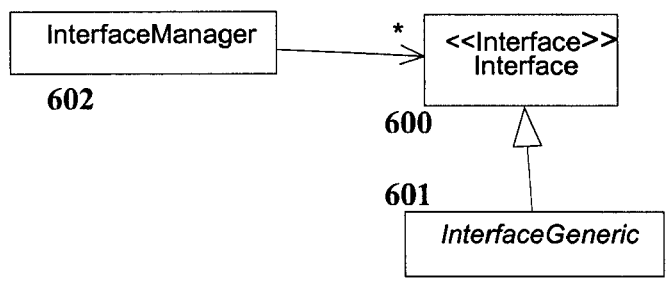
FIG. 15 is a UML class/concept diagram that illustrates the COMM service, according to some embodiments.

FIG. 15 illustrates the Comm service. The Comm service provides an extension of the hardware service for encapsulating and managing interfaces to hardware. The Interface 600 and InterfaceGeneric 601 interface and generic implementation, respectively, provide common operations for opening, closing, and resetting interfaces. Common operations also exist for synchronously and asynchronously reading signals 581 from and writing signals to interfaces.

Concrete extensions of the Comm service include such services as Ethernet, Serial, Publish-Subscribe messaging, CAN-bus, and other common communication methodologies. Further elaborating on a concrete Comm service extension for publish-subscribe services, a PublishSubscribeInterfaceGeneric is a specialized Comm service that provides services which allow for topics to be subscribed to by interested listeners and to which publishers can publish messages which get routed to those listeners. Multiple publishers can publish to a topic and multiple subscribers can subscribe to a topic.

Envoys 550 exist for providing a means to transparently communicate with distributed interfaces. The InterfaceManager 602 provides a general mechanism for managing one or more interfaces 600. Either a single or a group of hardware interfaces can be managed by the InterfaceManager 602. Configuration for how the interface(s) is managed is provided by the interface manager. A client can communicate with the InterfaceManager 602 as a single unit whereby, transparently to the client, the manager can be reading information from or writing information to multiple interfaces. The manager can configure whether associated interfaces are pollable, asynchronous, or scheduled, among other pluggable policies. The policy by which signals 580 are parsed to and from packets can also be defined. Clients interested in accessing interfaces can register themselves with the interface manager in order to be notified of specific events that occur on the interfaces. Numerous concrete interface types exist and can be extended from the interface service. Concrete extensions for serial port interfaces, parallel port interfaces, USB interfaces, Firewire interfaces, digital I/O port interfaces, analog I/O port interfaces, interfaces to joysticks, among others exist or can be plugged in. Interfaces 600 can also be chained together using a special interface chain service which extends from the interface service. With chained interfaces 600, one interface can be chained to another such that information received from one interface is automatically routed to another.

Figure 16:
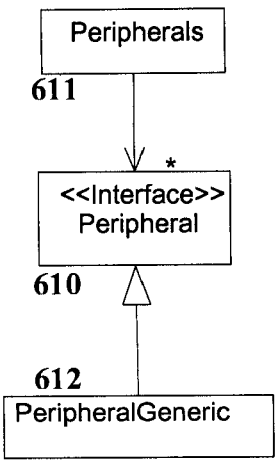
FIG. 16 is a UML class/concept diagram that illustrates the PERIPHERALS service, according to some embodiments.

FIG. 16 illustrates the Peripherals service. The Peripheral service provides abstractions for interacting with and managing peripherals external to a system. The Peripheral service's main abstractions are the Peripheral interface 610 and PeripheralGeneric 612 implementation. The Peripheral abstractions extend from the Hardware service abstractions. The ability to configure and create peripherals is inherited from built-in use of the Config 540 and Registry services. Concrete implementations of peripherals may extend from and specialize this service. The PeripheralGe-neric 612 abstraction provides a generic basis for defining system peripherals. The Peripheral abstraction 610 is associated with an InterfaceManager 602 and one or more Interfaces. During configuration, the PeripheralGeneric 612 abstraction is associated with an InterfaceManager 602 and these Interfaces in a configurable manner using the Config 540 and Registry services. The Peripheral abstraction 610 provides a number of operations that may be invoked by application clients to read from a peripheral (synchronously or asynchronously), write to a peripheral, get notified of peripheral events, and manage the lifecycle of a peripheral. Because the peripheral services uses the Comm service for interfacing 600. Clients of the Peripheral service may communicate with the Peripheral service without knowledge or consideration of how the peripheral is physically connected to the system. That is, because the Comm service provides a generic framework for plugging in interfaces, the actual underlying physical means by which a peripheral is connected (e.g., serial port, USB, etc) is transparent to the clients of the Peripheral service. The Peripheral service also uses the signals 581 mapping service to enable a configurable way to map data to and from an object form semantically meaningful to the peripheral client and the raw form required for external interface communications. Envoys 550 also exist enabling peripherals to be remotely communicated with in a fashion transparent to the client application. A generic Peripherals abstraction 611 also provides services for communicating with and managing peripherals as a collection.

The Measure service provides a set of abstractions commonly used in measurements. Abstractions exist for encapsulating an angle, distance, duration, speed, general rate, a generic unit, rotation, line, linear direction, angular direction, angular speed, among others. A Test service provides abstractions that provide a generic way for testing software. Objects that are testable leverage the Test service to allow the ability to set the test mode of an object, test if it is alive or not, and to inject an object with test data. A Time service provides a generic Time abstraction for recording, reading, and operating on a time value. An EventTime abstraction encapsulates information about a time for which an event may occur which includes a delay time before which it first occurs, an indication if it is periodic or not, an indication if it is indefinite or not, a period if it is periodic, and a duration if it is finite.

Figure 17:
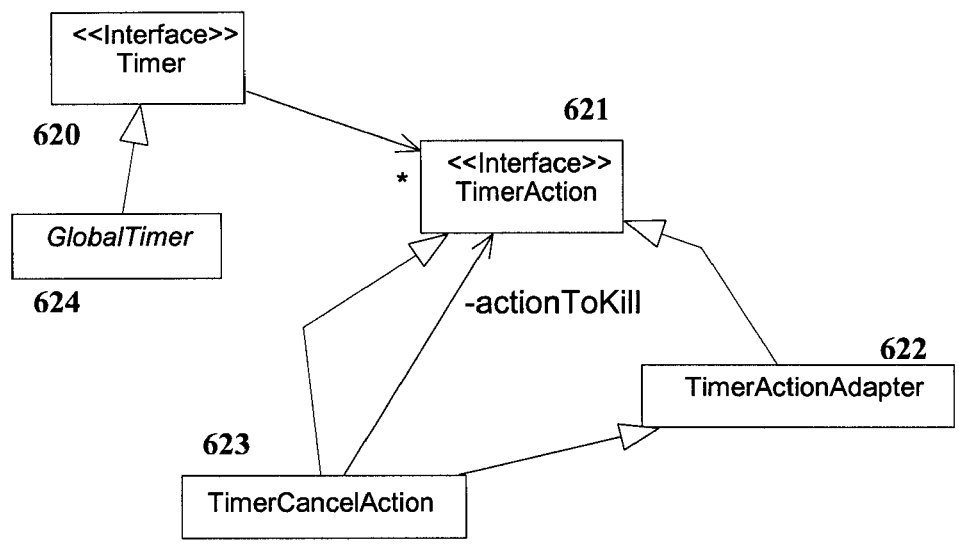
FIG. 17 is a UML class/concept diagram that illustrates the TIMER service, according to some embodiments.

FIG. 17 illustrates the Timer service. The Timer service provides a generic means for scheduling timers in a system. The TimerAction 621 interface represents a base interface for encapsulating an action to occur at a specific time. Operations are extended to implement the action to execute at a specified time, any preface to execute before an action, any prologue to execute after an action, and an operation to cancel a timer action. The Timer 620 interface provides a base interface for registering timer actions to occur once after a specified delay or at a specified period after an optional delay, optionally after some finite duration, or at some predefined time. Timers may be started, stopped, cancelled, and managed in other ways through this interface. A concrete TimerActionAdapter 622 provides a default implementation for a TimerAction, 621 a special TimerCancelAction 623 provides a generic way to cancel timers, and other concrete specialized timer actions exist throughout the framework. A GlobalTimer 624 abstraction serves as a base class for scheduling a global timer for a process or thread. The frame size, resolution, period, delay, priority, among other attributes may be set for the global timer. Individual timer actions that are to occur according to the global timer are registered with the GlobalTimer 624. Concrete implementations of the GlobalTimer 624 exist for different operating environments.

Figure 18:
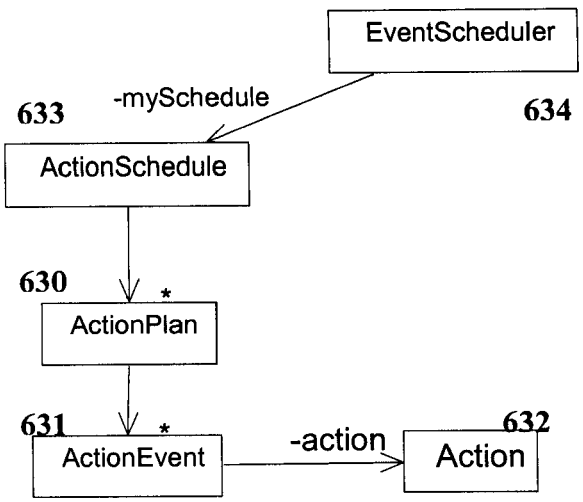
FIG. 18 is a UML class/concept diagram that illustrates the SCHEDULE service, according to some embodiments.

FIG. 18 illustrates the Schedule service. The Schedule service extends the Timer service by providing additional support for scheduling actions. The Schedule service extends the Timer service by providing additional support for scheduling actions. The Action 632 abstraction implements the TimerAction 621 interface to provide a means for scheduling actions with an event scheduler. An ActionEvent 631 associates an EventTime with an Action. Hence the event time at which an action occurs is encapsulated by an ActionEvent 631. An ActionPlan 630 contains one or more ActionEvents 631 which must take place. Hence, an action plan represents a plan for multiple actions to occur and the event times at which they must occur. An ActionSchedule 633 contains and provides operations to manage one or more ActionPlans 630 which much take place. Hence, an action schedule represents a schedule for multiple action plans. The EventScheduler 634 provides a generic way to create an ActionSchedule 633 and to create concrete Timers 620 based on configuration information provided by the Config service 540 and ObjectRegistry. The EventScheduler 634 then schedules the actions contained in the ActionSchedule 633 with the appropriate timers. A Profile service provides a Profile abstraction which is used to contain and register information according to different code base configuration profiles. Because some run time environments, such as embedded environments or non-deterministic operating systems, have restrictions that other environments may not have, a means for configuring which code base profile is loaded is provided by this service. A Util service provides a means for encapsulating miscellaneous common system abstractions and system abstractions that may vary by computing platform profile (e.g., floating point support, native mathematic operation support, and system property support).

Figure 19:
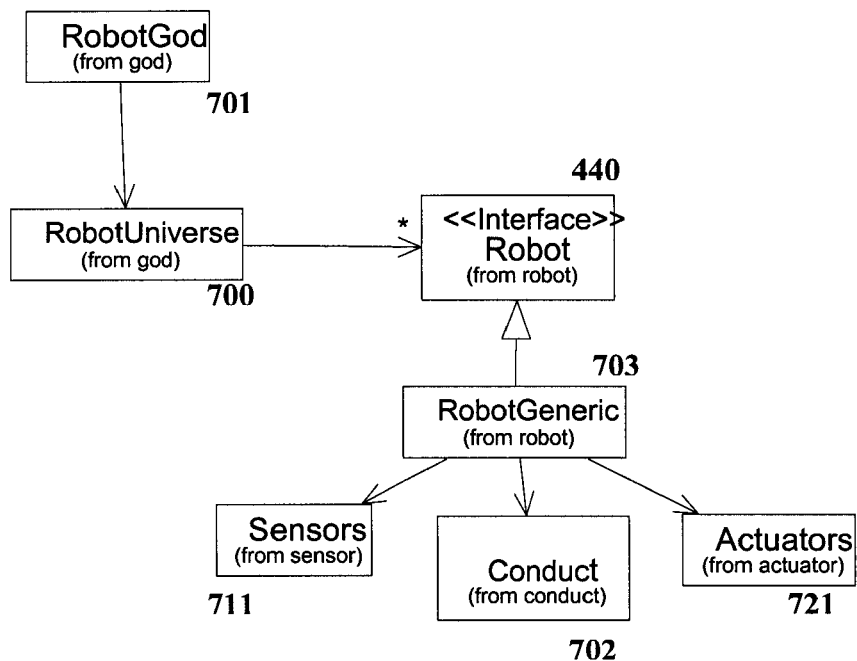
FIG. 19 is a UML class/concept diagram that illustrates the ROBOT.GOD and ROBOT.UNIVERSE services, according to some embodiments.

FIGS. 19-31 illustrate general robotics application services. FIG. 19 illustrates the general structure of a robotic application, specifically as a robot with sensors 711, actuators 721, and some conduct 702. A robot may have zero or more sensors 711 and zero or more actuators 721 configured with it using the config service 540 and automatically initialized and created using the registry service. The sensors 711 represent the external inputs to a robot for sensing its environment and world. The actuators 721 represent the external outputs from a robot for affecting its environment and world. The operations that occur between sensing and acting with its environment or that occur independent of its sensor inputs are embodied within its conduct. All conduct of a robot inherits from its Conduct services 702. Hence, robot reflexive actions to sensor inputs, robot planning, neural networks, sensor information analysis, rule-based behaviors, and other common robotic conduct services are all embodied by the Conduct service 702 and subclassed in other specific services. A means for launching one or more Robots operating according to the same universal time constraints is embodied by the RobotUniverse 700 and RobotGod 701 abstractions.

A Robot may be configured to have all three services (sensors 711, actuators 721, and conduct 702) or any combination thereof. For example. a Robot that only has Sensors 711 may represent a sensor application with no planning or operations performed on such information but rather the data is just presented via some visual display. Such flexibility allows. for example, for a distributed sensor application to be constructed by configuring only Sensors for an application, some of why may be accessed in a transparent and distributed fashion using the Envoy service. If Conduct 702 is added, a rules-based thought sub-service of Conduct 702 may, for example, analyze that sensor 711 information and categorize it in certain way and then display or log the resultant analysis. If Actuators 721 are added, some operations may be performed on its environment, such as movement for example, based on the sensed or analyzed information.

Figure 20:
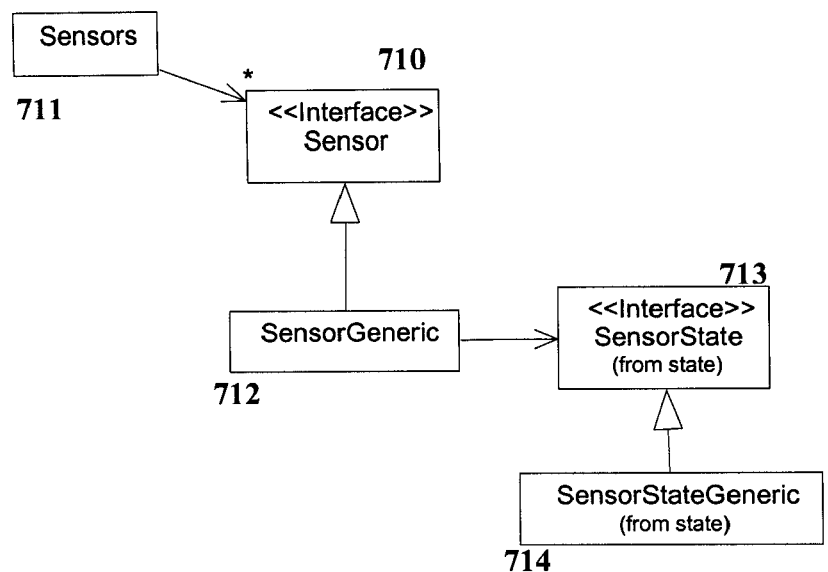
FIG. 20 is a UML class/concept diagram that illustrates the SENSOR service, according to some embodiments.

FIG. 20 illustrates the Sensor service. The Sensor service provides a set of abstractions for generically configuring, managing, and communicating with sensors. A Sensor interface 710 and SensorGeneric implementation extend from the Peripheral service 610. Hence. all of the features and capabilities inherent in the Peripheral service 610 are inherent in the sensor service (e.g., configurability, object registry creation, transparent distributed communication via envoys, transparent hardware interfaces, etc). The Sensor service extends the Peripheral service 610 by allowing for a configurable set of commands to be registered with a sensor 711. These commands may be sent to a sensor 711, transparent to the client, when the client invokes operations on a sensor that are associated with a particular command. The state of a sensor 713 is also encapsulated in generic sensor state 714 abstractions. The sensor state 713 is updated transparently to the client as information is read from the sensor (synchronously or asynchronously). Operations on the sensor interface 710 permit clients to access the sensor's state. Sensors 711 may also be managed as a collection.

Figure 21:
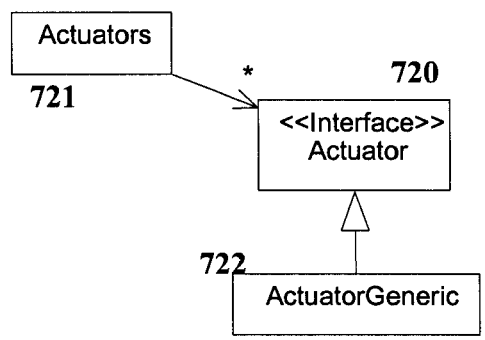
FIG. 21 is a UML class/concept diagram that illustrates the ACTUATORS service, according to some embodiments.

FIG. 21 illustrates the Actuator service. The Actuator service provides a set of abstractions for generically configuring, managing, and communicating with actuators 721.

An Actuator interface 720 and ActuatorGeneric 722 implementation extend from the Peripheral service 610. Hence. all of the features and capabilities inherent in the Peripheral service 610 are inherent in the Actuator service (e.g., configurability, object registry creation, transparent distributed communication via envoys, transparent hardware interfaces, etc). Actuators 721 may also be managed as a collection.

Figure 22:
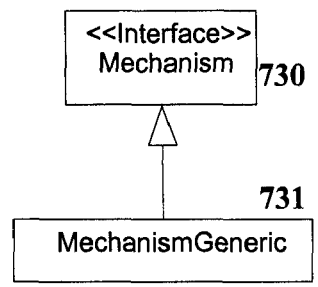
FIG. 22 is a UML class/concept diagram that illustrates the MECHANISM service, according to some embodiments.

FIG. 22 illustrates the Mechanism service. The Mechanism service 730 extends from the System service to encapsulate operations that are performed on and with mechanical components. While the Hardware service encapsulates electronics hardware, the Mechanism service 730 encapsulates mechanical hardware. MechanismGeneric 731 abstractions are used when modeling the behavior and interactions among mechanical components in a robotic system. Envoys 550 exist to enable transparent distributed communication with mechanisms. A Gear service extends from the mechanism service to provide abstractions for individual gears and gear trains. Generic abstractions for gears are used when modeling the behavior and interactions among gears in a robotic system.

Figure 23:
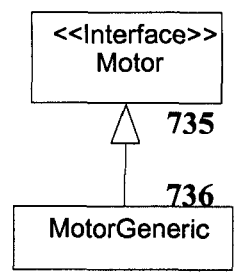
FIG. 23 is a UML class/concept diagram that illustrates the MOTOR service, according to some embodiments.

FIG. 23 illustrates the Motor service. The Motor service extends from the Actuator service to provide abstractions for motors in a system. A generic Motor interface 735 and generic MotorGeneric 736 implementation encapsulate the common services associated with operating motors. Concrete sub-interfaces and sub-classes of these abstractions provide services specific to operating with different types of motors. For example, a Concrete Motor DC service can provide a software interface for interacting with and operating DC motors. A Concrete Motor Servo service can provide a software service for interacting with and operating Servo motors. A Motor Stepper service can provide a software interface for interacting with and operating stepper motors. Other concrete sub-services for motors extends from the generic Motor service. Envoys 550 exist to allow transparent distributed communication with motors. A Command service provides a set of abstraction used to encapsulate the configuration of commands for various purposes (e.g., sensor commands and movement commands).

Figure 24:
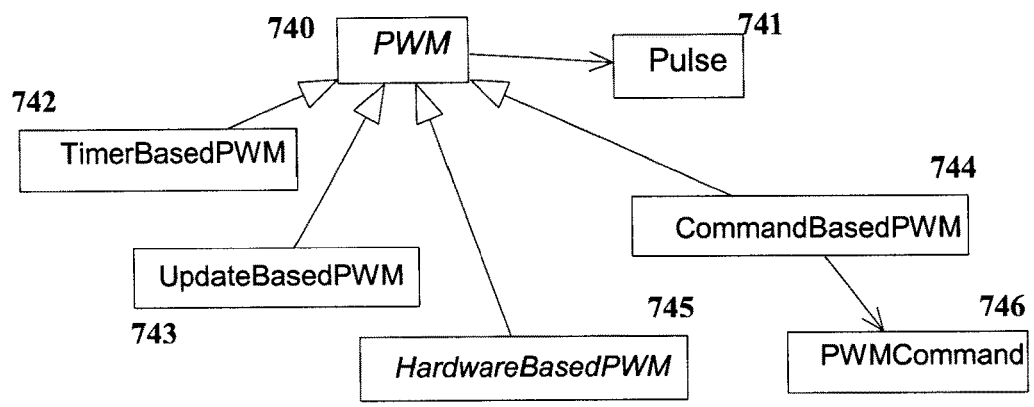
FIG. 24 is a UML class/concept diagram that illustrates the PWM service, according to some embodiments.

FIG. 24 illustrates the PWM service. The PWM service provides a set of abstractions used for actuating motors using a pulse-width-modulated method. A Pulse abstraction 741 encapsulates information about a pulse train used to control motors in a system. Motors are often controlled by delivering a pulse train to the motor which controls the motor speed and direction. The pulse train frequency can also affect motor operation efficiency. The Pulse 741 extends from EventTime and provides additional information needed for performing PWM 740 on a motor. The duty cycle (percent time the pulse is active), polarity of the pulse (active when pulse is high or low), and other generically defined conditions of a pulse are provided by the Pulse 741 abstraction. The PWM abstraction 740 provides a base generic abstraction for configuring, starting, stopping, restarting, and managing a PWM signal stream to a motor. Concrete sub-types of the PWM 740 provide generic ways to manage different PWM approaches. A TimerBasedPWM 742 abstraction provides a way to directly raise high and low the outputs of a motor's interface by interacting with the timer service to schedule updates according to a system timer. The UpdateBasedPWM 743 abstraction provides a way to directly raise high and low the outputs of a motor's interface by relying on an external timer or service to call the abstraction whenever a clock cycle has occurred. The HardwareBasedPWM 745 abstraction provides a way to delegate PWM timing control 742 to a dedicated PWM hardware circuit. The CommandBasedPWM abstraction 744 provides a way to delegate PWM timing control 742 to an external hardware device through a hardware interface.

Figure 25:
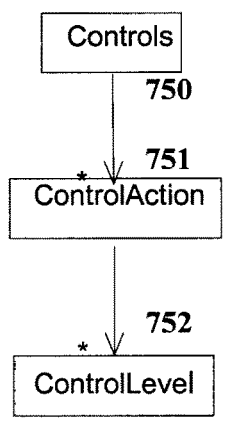
FIG. 25 is a UML class/concept diagram that illustrates the CONTROLS service, according to some embodiments.

FIG. 25 illustrates the Controls service. The Controls service 750 provides a generic means for defining information related to controlling a system. A ConrolLevel abstraction 752 extends the Units abstraction from the Measure service and adds a means for defining a minimum, maximum, and set control point. Operations and queries related to managing and providing status about a control point are also provided. A ControlAction 751 defines a set of ControlLevels 752 that induce some discrete control action. Subclasses of the ControlAction 751 include MovementControl for defining a movement action and RotationControl for defining a rotational control action. Controls define a set of ControlActions 751 that define a sequence or set of control actions to perform. Subclasses of the Controls abstraction 750 include MovementControls for defining a sequence of movement controls and RotiationalControls for defining a sequence of rotational controls.

Figure 26:
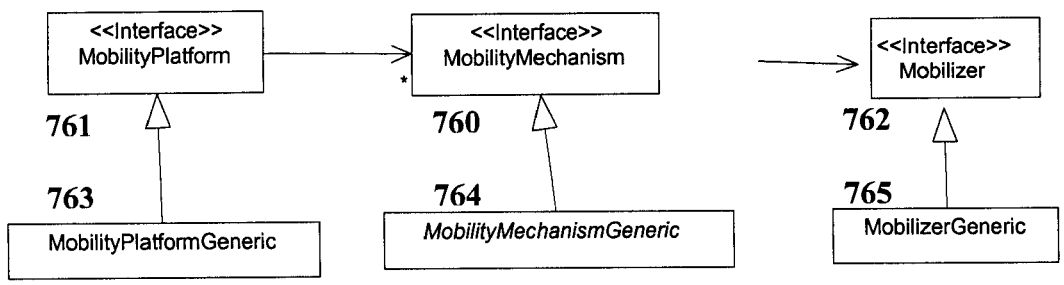
FIGS. 26-27 are UML class/concept diagrams that illustrates aspects of the MOBILITY service, according to some embodiments.

FIG. 26 illustrates the Mobility service. The Mobility service provides abstractions for encapsulating configuration and management of a means for mobilizing a robot. A MobilityMechanism 760 and its generic implementation that encapsulates a discrete mechanism that induces movement of some sort. The mobility mechanism contains some Mobilizer 762 (e.g., a wheel or individual leg), a reference to some actuation mechanism, and any mechanical linkages and gears between the Mobilizer 762 and the actuation mechanism source. The MobilityMechanism 760 makes use of the mechanism service to model mechanical linkages and permit configuration of such linkages in a variety of ways. In such a fashion, a completely generic means for modeling any type of mobility mechanism is provided in a configurable fashion. The actuator that drives the Mobilizer 762 through some mechanical linkage may be directly connected to the Mobilizer 762 or it may be indirectly connected via some mechanical linkage such as a differential gear train. The MobilityPlatform 761 interface and MobilityPlatformGeneric 763 implementation provide a generic means for configuring a mobility platform and for an application client to operate that platform as a whole. The MobilityPlatform 761 is configured with one or more MobilityMechanism 760 components using the Config service 540 and Registry service. Generic MovementControl or MovementControls 750 commands may be issued to the mobility platform requesting that it move in a particular fashion. These commands are translated into commands to associated underlying actuator mechanisms associated with individual mobility mechanisms. The Mobility service has envoys 550 which add support for transparent distributed communication with a mobility platform. The mobility abstractions may be generically configured for use as is or may be subclassed for specific mobility types. As an example, there is exists a mobility wheeled service which extends the mobility service for application to wheeled type mobility of any sort.

Figure 27:
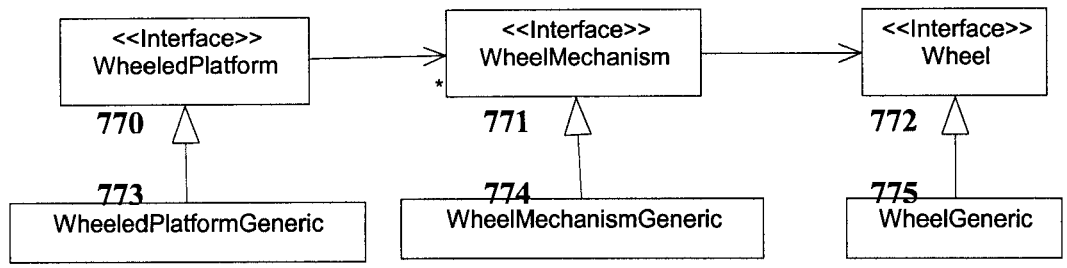

FIG. 27 illustrates extensions of the Mobility service. A WheeledPlatform 770, WheelMechanism 771, and Wheel 772 all extend from the MobilityPlatform 761, MobilityMechanism 760, and Mobilizer 762 abstractions respectively. A WheeledPlatformGeneric 773 implementation uses the Config 540 and Registry service to read a specific configuration of wheel mechanisms for the wheeled platform. As an example, the wheeled platform may read, via the Config service 540, that it is to be configured using four wheel mechanisms. These mechanisms are then automatically constructed via the Registry service. Each Wheel- Mechanism 771 may also be configured to construct a Wheel object 772 and corresponding Actuator 720 which happens to directly drive the Wheel. Alternately, the WheelMechanism 771 may reference a shared Actuator 720 which drives multiple Wheels through a shared differential GearTrain. Any sort of wheeled configuration can be achieved. Likewise, a LeggedPlatform, LeggedMechanism, and Legged abstractions can exist in a mobility legged service. Likewise, a TrackedPlatform, TrackedMechanism. and Track abstractions can exist in a mobility tracked service. The Mobility service is not limited to ground-based robots and vehicles. The Mobility service is extended to provide services common to air, sea, underwater, space, and any sort of approach for providing mobility. As an example, a FlightPlatform and FlightMechanism provided one type of base aeronautical mobility service. These abstractions are further subclassed into HelicopterPlatform and HelicopterMechanism for helicopter applications.

Figure 54:
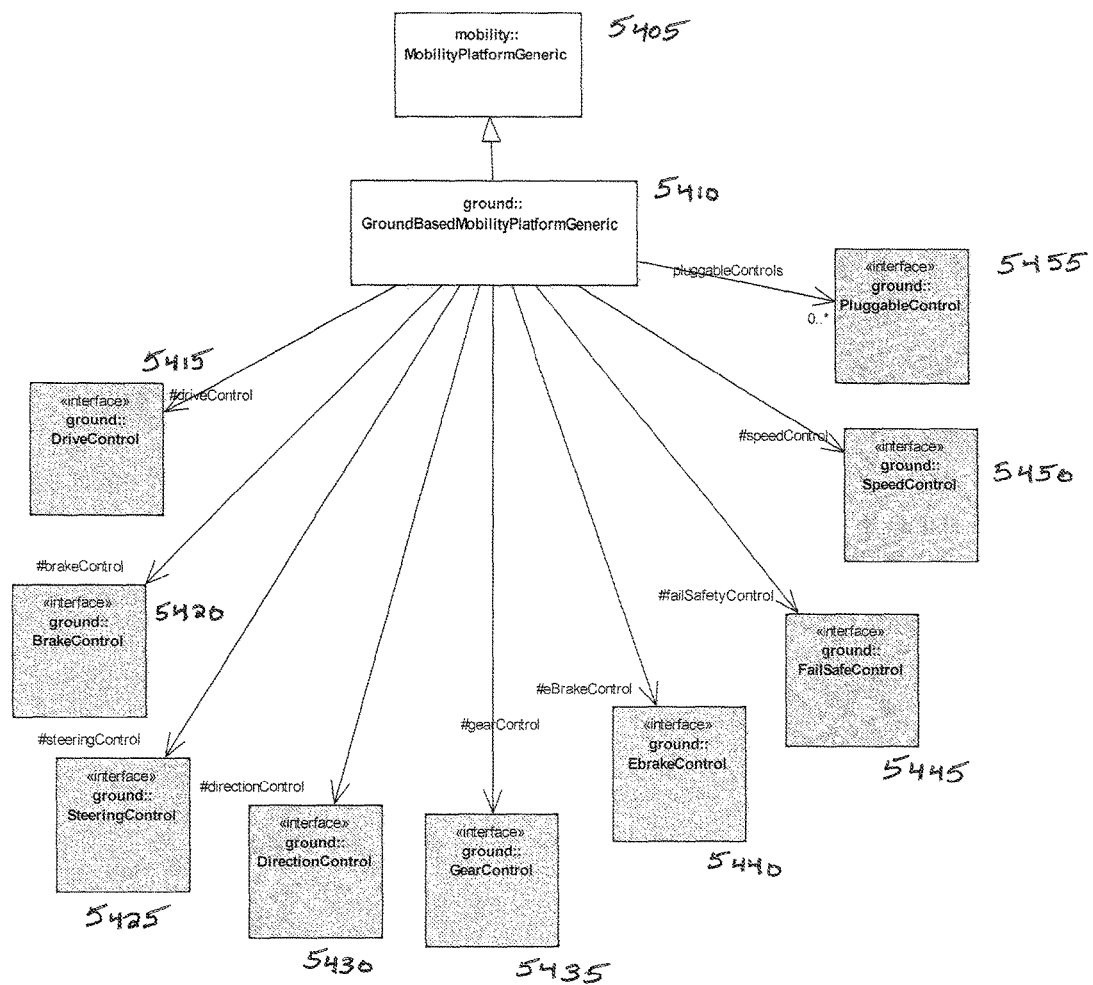
FIG. 54 is a diagram illustrating various extensions to a mobility service, according to some embodiments.

The GroundBasedMobility service is an extension of the MobilityService. FIG. 54 illustrates this extension. A GroundBasedMobilityPlatformGeneric abstraction extends the MobilityPlatformGenric abstraction for specific services localized to unmanned ground vehicles (UGV). A UGV includes both teleoperated and autonomous ground vehicles. This implementation further specializes the MobilityPlatform service by specifying specific types of mobility controls including DriveControl, BrakeControl, SteeringControl, DirectionControl, GearControl, EBrakeControl, FailSafeControl, SpeedControl, and a named collection of PluggableControl abstractions.

A DriveControl abstraction encapsulates control of the drive of a UGV. The drive speed of a UGV is thus dictated through DriveControl. A SteeringControl abstraction encapsulates control of the steering of a UGV. The steering direction or angle of a UGV is thus dictated through SteeringControl. A BrakeControl abstraction encapsulates control of the braking of a UGV. The braking of a UGV is thus dictated through BrakeControl. It should be noted that by commanding the DriveControl to a speed of zero may also result in the braking of a UGV. A DirectionControl abstraction encapsulates control of the direction of a UGV. The forward, reverse, or alternate directional state of a UGV is thus dictated through DirectionControl. It should be noted that by commanding the SteeringControl of a UGV, that its direction may also be impacted. A GearControl abstraction encapsulates control of the gearing for the drive system of a UGV. A GearControl abstraction thus may include gears for states such as low, high, park, and neutral, the different states for which are configurable by this service. An EBbrakeControl abstraction provides controls for inducing the emergency braking of a UGV. A FailSafeControl abstraction provides controls for inducing the fail-safe state of a UGV. Configurable states such as enable/disable, run/pause, and other states may be defined. A SpeedControl abstraction provides a means for controlling the speed of a UGV. This configurable abstraction may be defined to contain DriveControl and BrakeControl abstractions, to which discrete commands are dispatched for control of UGV speed. Finally, a PluggableControl abstraction provides a generic interface for triggering an action, triggering an action given a Boolean value, triggering an action given a floating-point value, or triggering an action given an Any interface defining a sequence of name-value pairs. The PluggableControl can thus be extended and used to implement auxiliary controls on a UGV platform (e.g. trigger turn signals or lights).

Figure 55:
FIG. 55 is a diagram illustrating various extensions to a ground based mobility service, according to some embodiments.

FIG. 55 depicts extensions to the GroundBasedMobilityService. Depicted here are abstractions which represent sub-classes of the GroundBasedMobilityPlatformGeneric abstraction. For each abstraction listed named according to the convention <NAME>Generic, there is a corresponding interface named <NAME> which each <NAME>Generic abstraction implements. In what follows, a description of each <NAME> service as extensions of the GroundMobilityPlatform service follows.

The SkidSteerPlatform service extends from the GroundMobilityPlatform service. The SkidSteerPlatformGeneric abstraction extends from the GroundMobilityPlatformGeneric abstraction. The SkidSteerPlatformGeneric abstraction encapsulates a more specialized UGV mobility platform which performs its functions via skid steering of a robot. Thus a port side and starboard side concept is embodied in the SkidSteerPlatformGeneric abstraction. DriveControl. SteeringControl, BrakeControl, and DirectionalControl commands, inherited from GroundMobilityPlatformGeneric are thus translated to control of port side and starboard side motor configurations to realize skid steering mobility controls.

The Standard4WDPlatform service extends from the GroundMobilityPlatform service. The Standard4WDPlatformGeneric abstraction extends from the GroundMobilityPlatformGeneric abstraction. The Standard4WDPlatformGeneric abstraction encapsulates a more specialized UGV mobility platform which performs its functions via control of a 4WD system. Thus the concept of four-wheel independent drive is embodied in the Standard4WDPlatformGeneric abstraction. DriveControl. SteeringControl, BrakeControl, and DirectionalControl commands, inherited from GroundMobilityPlatformGeneric are thus translated to control of motors for the independent 4WD system.

The Ackerman4WDPlatform service extends from the GroundMobilityPlatform service. The Ackerman4WDPlatformGeneric abstraction extends from the GroundMobilityPlatformGeneric abstraction. The Ackerman4WDPlatformGeneric abstraction encapsulates a more specialized UGV mobility platform which performs its functions via control of a 4WD system but with Ackerman style steering of one pair of the wheels. Thus the concept of Ackermann steering of one pair of the four wheels and four-wheel independent drive is embodied in the Ackerman4WDPlatformGeneric abstraction. DriveControl. SteeringControl, BrakeControl, and DirectionalControl commands, inherited from GroundMobilityPlatformGeneric are thus translated to control of motors for steering and the independent 4WD system.

The StandardNWDPlatform service extends from the GroundMobilityPlatform service. The StandardNWDPlatformGeneric abstraction extends from the GroundMobilityPlatformGeneric abstraction. The StandardNWDPlatformGeneric abstraction encapsulates a more specialized UGV mobility platform which performs its functions via control of an N-WD system, that is a configurable set of N wheels. Thus the concept of N-wheel independent drive (e.g. 6WD and 8WD) is embodied in the StandardNWDPlatformGeneric abstraction. DriveControl. SteeringControl, BrakeControl, and DirectionalControl commands, inherited from GroundMobilityPlatformGeneric are thus translated to control of motors for the independent NWD system.

The OmniDirectionalPlatform service extends from the GroundMobilityPlatform service. The OmniDirectionalPlatformGeneric abstraction extends from the GroundMobilityPlatformGeneric abstraction. The OmniDirectionalPlatformGeneric abstraction encapsulates a more specialized UGV mobility platform which performs its functions via control of wheels which embody omnidirectional capability of the robot. Thus a robot with omnidirectional wheels is embodied in the OmniDirectionalPlatformGeneric abstraction. DriveControl. SteeringControl, BrakeControl, and DirectionalControl commands, inherited from GroundMobilityPlatformGeneric are thus translated to control of omnidirectional wheels on a robot.

The MecanumPlatform service extends from the GroundMobilityPlatform service. The MecanumPlatformGeneric abstraction extends from the GroundMobilityPlatformGeneric abstraction. The MecanumPlatformGeneric abstraction encapsulates a more specialized UGV mobility platform which performs its functions via control of Mecanum wheels for omnidirectional capability of the robot. Thus a robot with Mecanum wheels is embodied in the MecanumPlatformGeneric abstraction. DriveControl. SteeringControl, BrakeControl, and DirectionalControl commands, inherited from GroundMobilityPlatformGeneric are thus translated to control of Mecanum wheels on a robot.

The AutomotiveMobilityPlatform service extends from the GroundMobilityPlatform service. The AutomotiveMobilityPlatformGeneric abstraction extends from the GroundMobilityPlatformGeneric abstraction. The AutomotiveMobilityPlatformGeneric abstraction encapsulates a more specialized UGV mobility platform which performs its functions via control of an automotive style platform. That is, a platform which has independently controlled speed and acceleration, braking, steering, transmission/gearing, and possibly E-braking. Thus the concept of automotive style controls is embodied in the AutomotiveMobilityPlatformGeneric abstraction. The DriveControl abstraction is specifically configured to engage automotive speed/accelerator functions. The BrakeControl abstraction is specifically configured to engage automotive braking functions. The SteeringControl abstraction is specifically configured to engage automotive steering functions. The DirectionControl abstraction may be specifically configured to partially engage automotive functions of forward or reverse. The GearControl abstraction is specifically configured to engage automotive gear and transmission functions such as park, neutral, drive, low gear, and high gear. The EBrakeControl abstraction is specifically configured to engage automotive E-braking functions.

A Range service extends the Sensor service and provides base abstractions for dealing with range type sensing. Generic Range information, RangeSensor interface and RangeSensorGeneric implementation. RangeSen-sorState and RangeSensorStateGeneric abstractions exist to encapsulate configuration and operations common to range sensing. A Ladar service extends the Range sensor service and provides base abstractions for dealing with laser radar type range sensing. Generic LADAR interface and LADARGeneric implementation, LADARState and LADARStateGeneric abstractions exist to encapsulate configuration and operations common to laser radar based range sensing. A Ladar sick service extends the Ladar service and provides base abstractions for dealing with LADAR sensing applications using the SICK LMS product. Generic LMS interface and LMSGeneric implementation abstractions exist to encapsulate configuration and operations common to SICK LMS laser radar based range sensing. A Radar service extends the range sensor service and provides base abstractions for dealing with radar type range sensing. Generic RADAR interface and RADARGeneric implementation, RADARState and RADARStateGeneric abstractions exist to encapsulate configuration and operations common to radar based range sensing. A Radar vorad service extends the radar service and provides base abstractions for dealing with RADAR sensing applications using the Vorad Vbox radar product. Generic Vbox interface and VboxGeneric implementation abstractions exist to encapsulate configuration and operations common to Vorad Vbox radar based range sensing.

Figure 56:
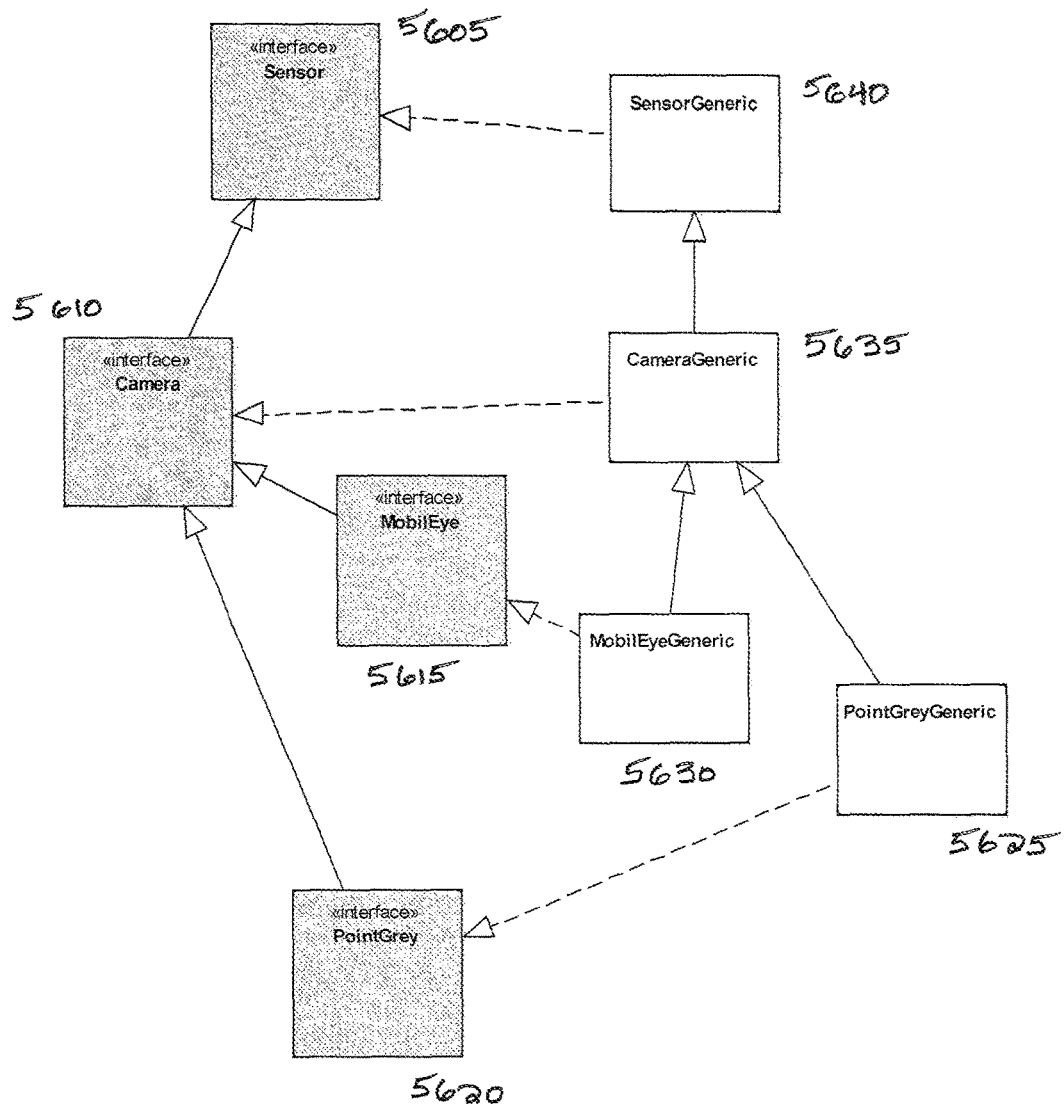
FIG. 56 is a diagram illustrating various relationships related to a camera service, according to some embodiments.

A Camera service extends the sensor service and provides base abstractions for dealing with camera type sensing. FIG. 56 illustrates the core Camera service relationships. Generic Camera interface and CameraGeneric implementation, CameraState and CameraStateGeneric abstractions exist to encapsulate configuration and operations common to camera based sensing. A Camera mobileye service extends the camera service and provides base abstractions for dealing with Camera sensing applications using the MobileEye camera products. Generic MobileEye interface and MobilEyeGeneric implementation abstractions exist to encapsulate configuration and operations common to MobileEye camera based sensing. A Camera ptgrey service extends the camera service and provides base abstractions for dealing with Camera sensing applications using the Point Grey camera products. Generic PointGrey interface and PointGreyGeneric implementation abstractions exist to encapsulate configuration and operations common to PointGrey camera based sensing.

A Reference service extends the sensor service and provides base abstractions for dealing with sensing reference points (e.g., position and orientation). Generic ReferenceSensor interface and ReferenceSensorGeneric implementation abstractions exist to encapsulate configuration and operations common to sensing reference points. A Reference abstraction encapsulates a generic point of reference. A Position abstraction extends the Reference abstraction to specify a generic position in space. An Orientation abstraction extends the Orientation abstraction to specify a generic orientation in space. Envoys exist for remotely accessing reference sensors. A Reference geo service extends the Reference Sensor service and provides base abstractions for dealing with geographic reference positioning and orientation. Abstractions for encapsulating the information coming from geographic reference sensors are provided including GeoPosition extending the Position abstraction. A GeoPosition contains Latitude, Longitude, and Altitude abstractions. A GeoOrientation abstraction extends the Orientation abstraction and contains Heading, Roll, and Pitch abstractions. A Reference nmea service provides abstractions that deal with parsing and interpreting GPS type information in the NMEA format. A NmeaMessage abstraction extends from the TextIOMessage provided by the Signals Message service.

Figure 57:
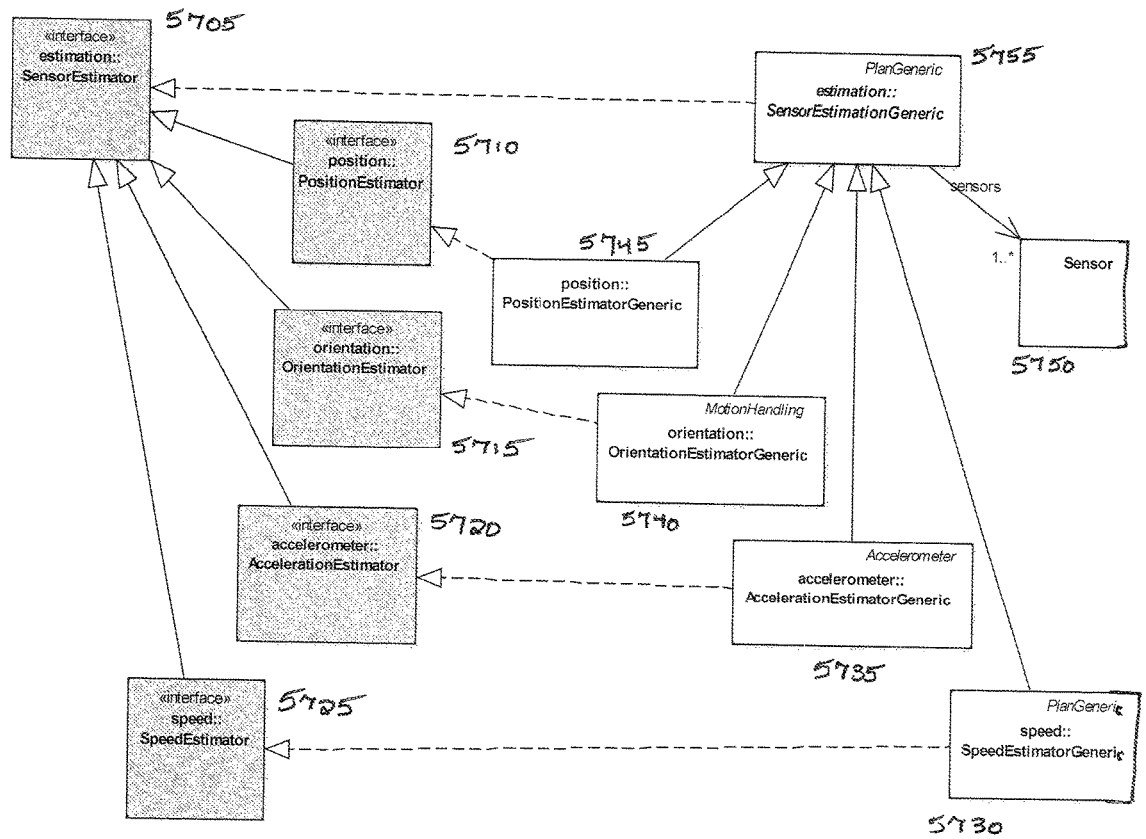
FIG. 57 is a diagram illustrating a sensor estimator service and various extensions to that service, according to some embodiments.

The SensorEstimator service consolidates information from multiple sensors. FIG. 57 depicts this service and a few key extensions of this service. The fusion of related information from a one or more sensors is performed within the SensorEstimatorGeneric abstraction. Managing collections of sensors (from the Sensor service) and characterizing sensors is encapsulated in this SensorEstimatorGeneric. Qualifiers such as primary versus redundant sensors, sensor priority, sensor quality, sensor confidence, and other configurable sensor characteristics and policies are embodied here.

The PositionEstimator service extends the SensorEstimator service and consolidates information from multiple sources of position and provides a configurable fashion for fusing data from these sources to provide a more reliable position estimate for the robot. Thus position from one GPS source via a ReferenceSensor object and position from another redundant GPS source via another ReferenceSensor object, may be combined in the PositionEstimator service to fuse and arbitrate, yielding a more robust and accurate position solution.

The OrientationEstimator service extending from the SensorEstimator service consolidates information from multiple sources of orientation information and provides a configurable fashion for fusing data from these sources to provide a more reliable orientation estimate for the robot. Thus heading orientation information from one heading sensor source via a ReferenceSensor object and heading inferred from a gyro source, may be combined in the OrientationEstimator service to fuse and arbitrate, yielding a more robust and accurate orientation solution.

The SpeedEstimator service extending from the SensorEstimator service consolidates information from multiple sources of velocity information and provides a configurable fashion for fusing data from these sources to provide a more reliable velocity estimate for the robot. Thus velocity orientation information from one wheel speed sensor source via a Sensor object and speed inferred from a GPS source via a ReferenceSensor object, may be combined in the SpeedEstimator service to fuse and arbitrate, yielding a more robust and accurate velocity solution.

The AccelerationEstimator service extending from the SensorEstimator service consolidates information from multiple sources of acceleration information and provides a configurable fashion for fusing data from these sources to provide a more reliable acceleration estimate for the robot. Thus acceleration information from a wheel speed sensor source via a Sensor object and acceleration inferred from an Accelerometer inferred from an AccelerometerSensor, may be combined in the AccelerationEstimator service to fuse and arbitrate, yielding a more robust and accurate acceleration solution.

In addition to position and orientation of a robot, the rates of change, and rates of rates of change of those values are important in robotics applications. That is, the position gives position of the robot, but the rate of change of the position gives velocity or speed, and the rate of change of speed gives acceleration. The rate of change of a robot orientation's heading can give the yaw rate.

Figure 58:
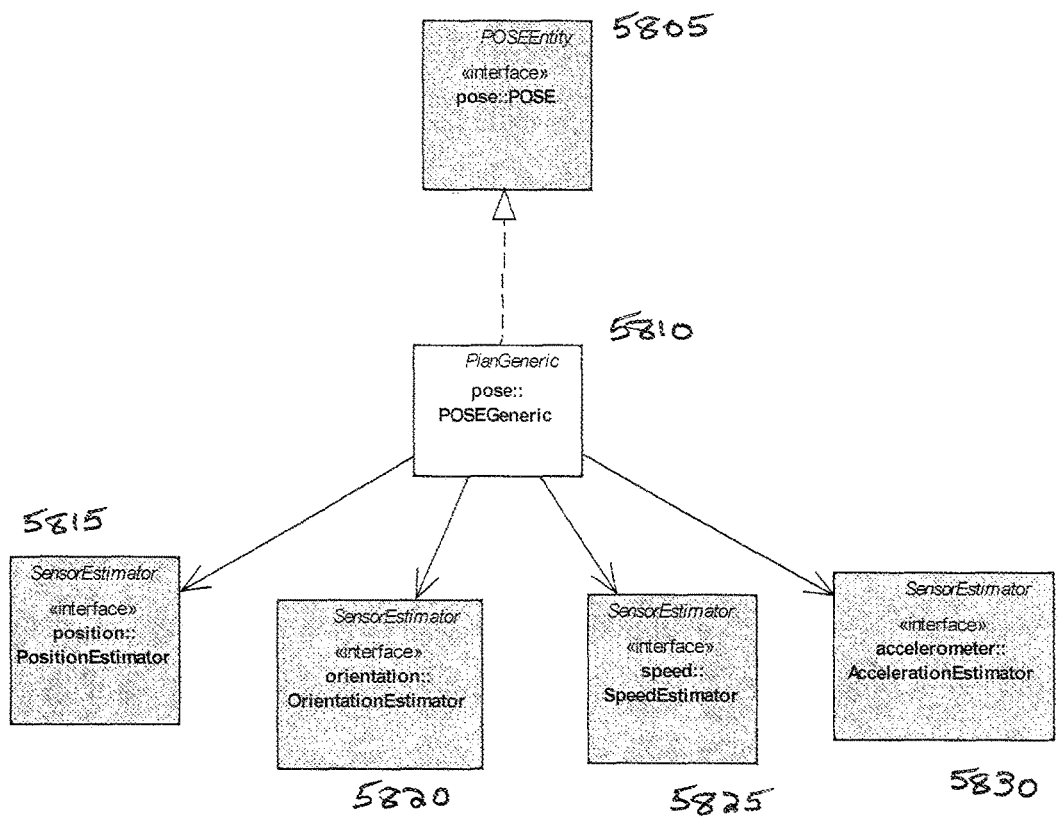
FIG. 58 is a diagram illustrating various aspects of a POSE service, according to some embodiments.

The POSE service with its POSE interface and POSEGeneric abstraction, provide services for the consolidation of robot position, orientation, rates of change of each, and rates of rates of change of each. The POSE service is depicted in aspects in FIG. 58. The POSE service contains one PositionEstimator object, one OrientationEstimator object, one SpeedEstimator object, and one AccelerationEstimator object. It thus can contain zero or more position sources, zero or more orientation sources, zero or more speed sources, and zero or more acceleration sources in a configurable fashion. Furthermore, it can be configured to give the rate of change of position from the PositionEstimator object along one or more of the position axes, rate of change of orientation from the OrientationEstimator object along one or more of the orientation axes, rate of rate of change from PositionEstimator object along one or more of the position axes, and rate of rate of change along one or more of the orientation axes.

A Digital service provides generic means for interfacing with digital I/O pins and ports. Abstractions for digital data (DigitalData), digital I/O points (DigitalPoint), and digital I/O ports (DigitalPort) serve to provide support in this category. An Analog service provides generic means for interfacing with analog I/O pins and ports. Abstractions for analog data (AnalogData), analog I/O points (AnalogPoint), and analog I/O ports (AnalogPort) serve to provide support in this category. A Feedback service and abstractions that extend from it encapsulate sensors and information related to low-level feedback from actuators or a mechanical system. A FeedbackSensor abstraction encapsulates a means for configuring and accessing a sensor that provides low-level feedback about the state of an actuator, mechanical, or electromechanical device. An EncoderSensor abstraction subclasses from the feedback service and encapsulates a means for configuring and accessing a sensor that provides low-level feedback from an encoder. A QuadEncoderSensor abstraction subclasses from the feedback service and encapsulates a means for configuring and accessing a sensor that provides low-level feedback from a quadrature encoder. A CounterSensor abstraction subclasses from the feedback service and encapsulates a means for configuring and accessing a sensor that provide low-level counts of external events. A Filter service provides abstractions for filtering data coming from sensors or events. A DataFilter abstraction provides a generic and configurable means for averaging data and filtering out noise across multiple samples of data from a sensor or external event source.

The Fusion service provides abstractions for fusing data received from multiple sensors. A SensorFusion abstraction provides a generic and configurable means for fusing data across multiple sensors or external event sources. A FusionRule abstraction provide the basis for encapsulating discrete rules about how to fuse a particular combination of sensor data.

The PhysicalObject service provides abstractions for representing objects and features in the physical world. The PhysicalObject interface and PhysicalObjectGeneric abstraction, part of the PhysicalObject service and extending the Any service, embody a physical object in the physical world. This is a very general class able to encapsulate many objects with which robotics and automation applications may interact. Examples include: a box, a car, a person, an animal, an obstacle, etc. For product measurement type applications, the physical object may be a product. This general type of object in and of itself may be a box, wood chips, or other things on a conveyor. In a vehicle measurement application, the products being measured and objects sensed are vehicles. In an autonomous navigation application, the objects sensed are just generally considered obstacles, but may include vehicles, trees, etc. Physical objects are matter that occupy space and can be perceived by the senses. Hence they have characteristics of size, shape, weight, etc. Many different attributes may actually be ascribed to a physical object and embodied in the Any object that this object specializes. However, this object defines those common characteristics that all physical objects have.

Generic policies and common attributes and operations on physical objects are implemented in the PhysicalObjectGeneric abstraction. Sub-classes extend this for specific domains (e.g. Vehicle for vehicle measurement). Physical objects also implement the info rule checking interface which allows queries to be performed to determine if something is a physical object based on information based to this class.

The WorldBoundary abstraction embodies the abstract concept of a physical world boundary. Sub-classes may define boundaries using different shapes and geometries. This base class serves as a marker class and abstract class for common methods involving manipulation and use of world boundaries.

Figure 59:
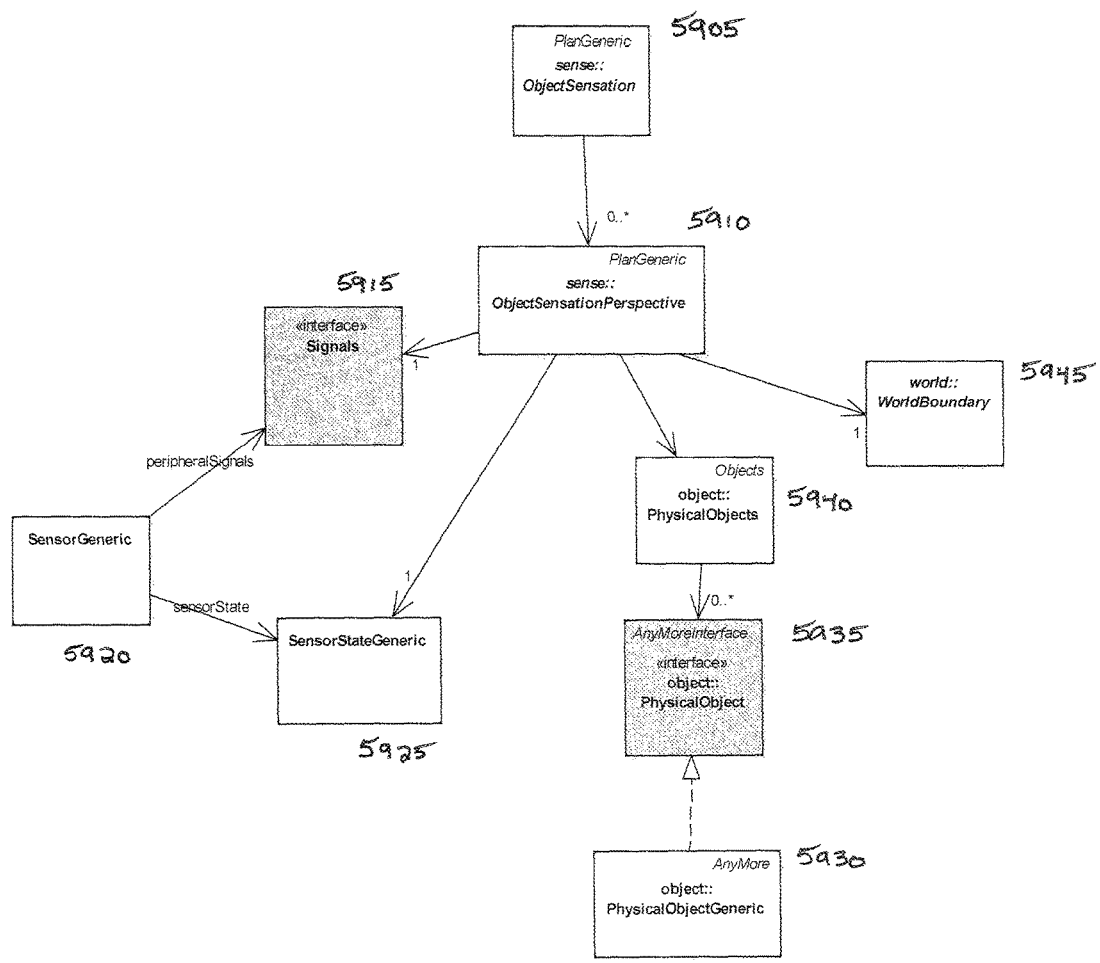
FIG. 59 is a diagram illustrating various aspects of object and sensation services, according to some embodiments.

The Sensation service, an extension of the Fusion service, provides abstractions for translating sensory data into PhysicalObjects describing something in the physical world. Thus, the sensation service may also be viewed as a perception service. FIG. 59 depicts the Object and Sensation services. The ObjectSensation abstraction, extending Plan-Generic, embodies the concept of sensing physical objects from sensor data. When sensor info is received, the sensation process attempts to resolve any physical world objects from the data. The physical world objects identified are limited to the world boundary(ies) considered by the sensation process. After sensation, other components may be triggered with the info (i.e. physical objects) identified by the object sensation process.

For example, ObjectSensation may represent the process of detecting and characterizing vehicles (e.g. Vehicle extending PhysicalObject) from LiDAR point data at a toll plaza (e.g. TollPlaza as WorldBoundary).

Object sensation is a two step process. First, physical objects are detected. Then, these objects are resolved against previously detected objects or objects detected from other detection sources (fusion). The resolution process provides a general way to perform functionality such as "sensor fusion". Here, the fusion (i.e. resolution) is performed on objects detected by multiple detection operations, either performed concurrently, or over time. Hence, object sensation involves one or more object detection instances that independently attempt to detect characteristics and physical objects. One or more chained object resolution instances then attempt to refine and resolve the detected physical objects as unique, combining and merging characteristics along the way.

The ObjectSensationPerspective embodies the concept of one perspective of the object sensation process. Whereas ObjectSensation embodies the concept of sensing physical world objects using one or more sensors contrasted against one or more physical world boundaries (or none), ObjectSensationPerspective embodies the concept of sensing physical world objects using one sensor contrasted against one physical world boundary. Thus, this class embodies the concept of one perspective of the overall object sensation process.

For example, ObjectSensationPerspective may represent one LiDAR view (e.g. LiDARPerspective extending ObjectSensationPerspective) whereby there are multiple LiDARs mounted at a toll plaza. Thus an ObjectSensation object of the sub-type VehicleMeasurement may have one or more ObjectSensationPerspective objects of the sub-type VehicleMeasurementView which obtain data from LiDAR sensors and translate that into PhysicalObject objects of the sub-type Vehicle. The world boundary for which would be a LaserBasedReferenceProfile (sub-type of WorldBoundary) which is a reference profile against which the laser view is differentiated to make sense of the shapes that LiDARPerspective sees.

A Watchdog service provides abstractions for realizing watchdog timers in a system. The Watchdog abstraction provides a configurable means for implementing a watchdog timer in a system. Watchdog event, listener, and action abstractions provide the means by which watchdog events are generated, listened for, and acted upon. A Safety service provides abstractions for failing the outputs for a system to a safe state. A SafeInter-face abstraction provides a configurable means for safely shutting down a set of outputs to their safe state.

A WatchdogChecking service provides abstractions for checking the correct operation of a system. The Watchdog abstraction provides a configurable means for loading one or more WatchdogCheck abstractions. Concrete implementations of these WatchdogCheck abstractions implement a check on system behavior. The check may access information from sensors, actuators, plan objects, or any other component in the GPROS system. In this way, the concrete watchdog checking implementation checks for certain correctness of the information. For example, a concrete watchdog checking implementation may check that a GPS sensor has a quality level above a certain threshold. The Watchdog abstraction provides a means to statically or dynamically load WatchdogCheck abstractions. The Watchdog abstraction provides a means to implement a configurable evaluation function over the configured watchdog check implementations. The WatchdogEvaluationFunction abstractions supports this service. The WatchdogEvaluationFunction may be configured to implement a Boolean evaluation function or a regular expression over the watchdog checks to evaluate. For example, the WatchdogEvaluationFunction can specify that all watchdog checks must evaluate as true and thus a Boolean AND over the WatchdogCheck abstractions will be evaluated.

The WatchdogSignature service implements a signature generation function which generates a signature over the evaluation of checks. This signature may be fed to comparator functions which looks for specific signatures to be generated over the watchdog check evaluations. The WatchdogSignature abstraction encapsulates this behavior. If any single bit, for example, in the WatchdogSignature does not compare properly, an error may be assumed to have occurred in the system. The Watchdog service provides a means to route these signatures to watchdog reaction functions.

The WatchdogReaction service includes a WatchdogReaction abstraction which may be configured to trigger one or more responses of the system based on a detected error. The error may induce a fail-safe response if the WatchdogReaction service is configured for safety checking. Or the error may induce a fail-secure response if the WatchdogReaction service is configured for security checking. In this way, the WatchdogReaction service provides a set of abstractions that allow for the configurable loading of new rules for checking system behavior that may check the safety and security of a robotic system, an autonomous vehicle, a driverless car, or some other system being checked. Such a service also allows for the quantifiable safety and security of a system under check. Furthermore, the configurable and dynamic loading of checking rules allows for a configurable and evolutionary system which can be updated with new rules for safety and security checking of a robot, autonomous vehicle, driverless car, or other system.

The WatchdogSpecification service provides abstractions for defining new watchdog check rules. Using formal methods implemented by concrete implementations of the WatchdogSpecification service, the rules to check may be formally defined. In this way, the formal specification of watchdog check rules may be defined in a way that allows formal methods to verify and validate the correctness and completeness of the watchdog checking rules for the particular system being checked by the watchdog.

Figure 28:
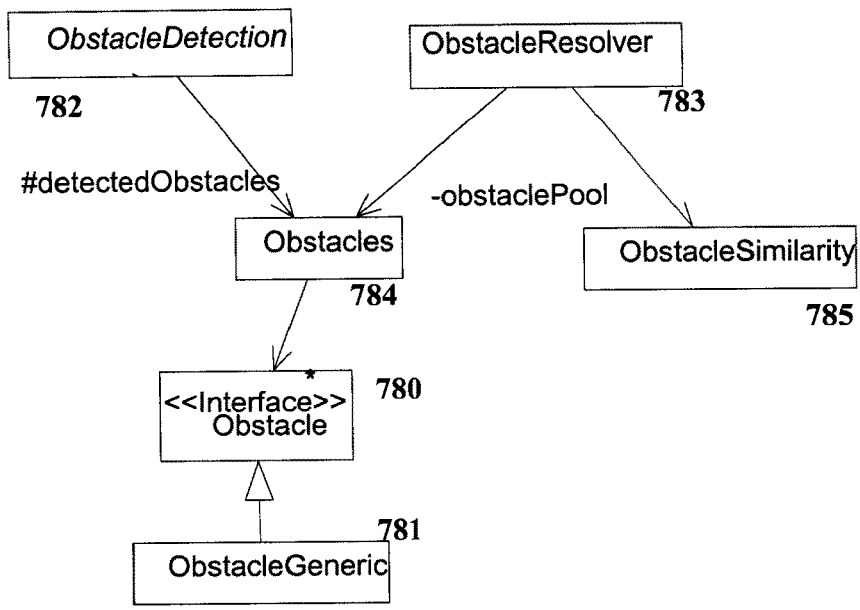
FIG. 28 is a UML class/concept diagram that illustrates the OBSTACLE service, according to some embodiments.

FIG. 28 illustrates the Obstacle service. The Obstacle service provides a generic and configurable service for classifying, detecting, and resolving obstacles that a robot may need to avoid or react to. The Obstacle interface 780 and ObstacleGeneric 781 implementation provide base abstractions for defining the characteristics of an obstacle for a robot. Attributes such as obstacle size, position, and confidence in its actually being an obstacle are all encapsulated within this abstraction. The obstacle type is also classifiable using such generic abstractions and concrete abstractions such as, for example, positive obstacles (e.g., objects in the way), negative obstacles (e.g., ditches or holes to avoid), and surface obstacles (e.g., walls or surfaces to avoid). The Obstacles abstraction 784 encapsulates a collection of Obstacle 780 objects and operations that are performed on such obstacles as a whole. The ObstacleDetection 782 abstraction encapsulates a generic process for detecting obstacles 784. Specific types of detection based on, for example, laser/radar or radar sensors, may specialize the detection process. The ObstacleResolver 783 abstraction encapsulates a generic process for resolving between multiple obstacles to determine which obstacles are similar 785 and to fuse information between identified obstacles. The parameters of resolution are configurable within the ObstacleResolver 783.

Figure 29:
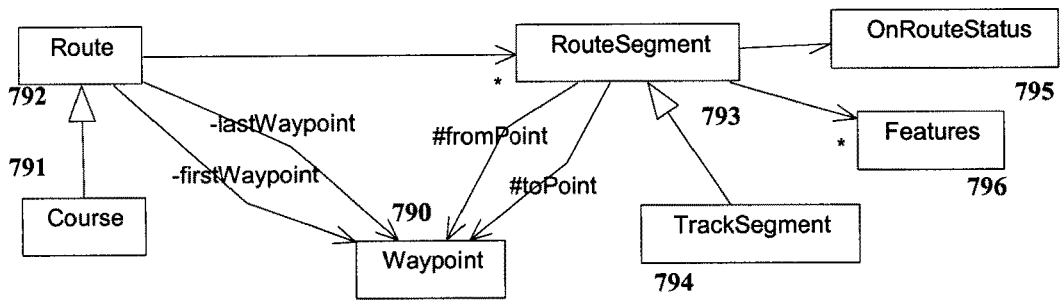
FIG. 29 is a UML class/concept diagram that illustrates the NAVIGATION.COURSE service, according to some embodiments.

The Navigation service provides a generic set of abstractions for robotic navigation. FIG. 29 illustrates the Navigation Course service, which provides abstractions for encapsulating a route 792 and course 791 over which a robot travels. A Waypoint 790 abstraction encapsulates a position and set of attributes about a discrete location to which a robot travels. A RouteSegment 793 encapsulates a linear route from one waypoint to another waypoint, and attributes about that route such as a collection of features, direction, route segment speed, and length. A Route 792 encapsulates a collection of RouteSegments 793 over which a robot travels. Attributes about the Route 792 include laps, first waypoint, and last waypoint. Operations may be performed on the route to dynamically add, remove, or modify route segments within the route. The route may also be used to track the location of a robot on the route. A TrackSegement 794 is a type of RouteSegment 793 that specifically outlines a desired track over which a robot may or should travel. A TrackSegment 794 defines boundaries within which a robot may travel over a route segment. A Course 791 is a type of Route 792 which defines the TrackSegments 794 over which a robot may or should travel. The actual route taken by a robot may differ from the desired route and the Course 791 defines the boundaries for the robot's travel.

Figure 60:
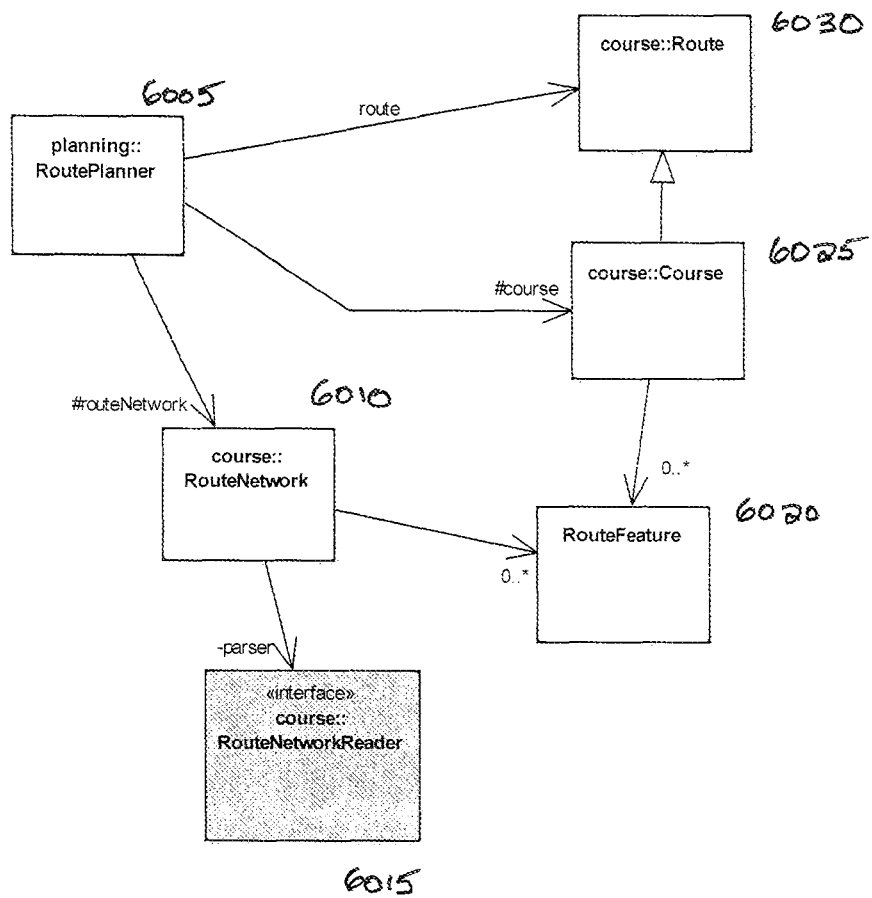
FIG. 60 is a diagram illustrating various aspects of course abstractions related to a navigation course service, according to some embodiments.

The Navigation Course service also includes abstractions for encapsulating more generally configurable information about a robot course such as roads, lanes, stop signs, intersections, u-turns, and other road data on common public and private roads. As shown in FIG. 60, a Course abstraction contains this information in a collection of RouteFeature objects. A RouteFeature example may be a UTurn or a StopSign.

The Course service is generically specified to obtain this information from a variety of specification formats but is generically encapsulated in a RouteNetwork object. The RouteNetwork is essentially a map with the various course features that may be identifiable on a map. A RouteNetworkReader interface is implemented to parse different map formats. One concrete format is a route data definition file (RDDF) format as used in the DARPA Grand Challenge. Another concrete format is a route network definition file (RNDF) format as used in the DARPA Urban Challenge. Finally, another concrete format is map data from Google maps. All of these formats are read into a common representation format with configurably defined course and route features.

The Navigation RoutePlanner service provides services for charting a route of travel for a robot based on information from the Course service. Given checkpoints and goals, the RoutePlanner service plots a route to meet those goals according to pluggable optimization algorithms. For example, a pluggable algorithm may include an A-Star algorithm for reaching nodes in the network in an optimal path. Goals may be expressed in a configurable and extensible fashion by sub-classes, with default goals embedded into the RoutePlanner service. Default goals include expressing goals in the form of waypoints to reach by specified times. Thus, given a route network virtual map of a city, checkpoints and goals for robot visits, the RoutePlanner service plots the optimal route through the network to visit those checkpoints and achieve its traversal goals.

Figure 30A:
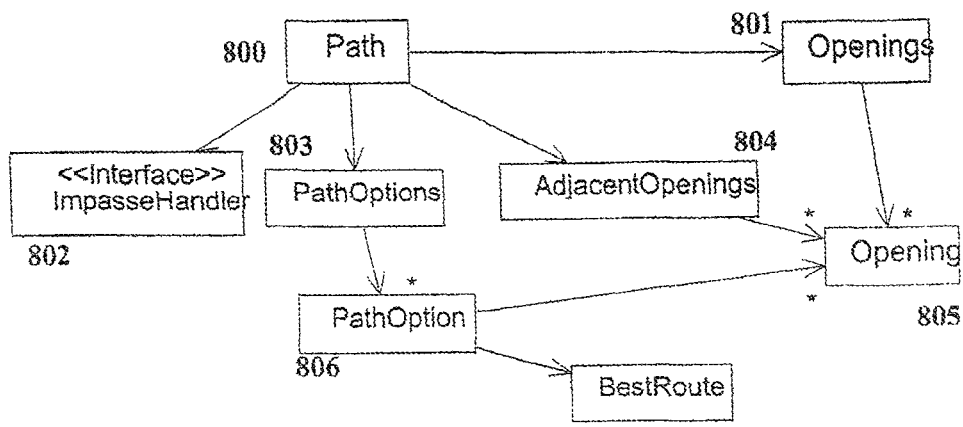
FIG. 30A is a UML class/concept diagram that illustrates the NAVIGATION.PLANNING service, according to some embodiments.

The Navigation Planning service is illustrated by FIG. 30A. The navigation planning service encapsulates abstractions used for planning the navigation of a robot. An Opening 805 characterizes a discrete opening through which a robot may traverse on a particular track segment. The Opening 805 is bounded by obstacles and potentially by track boundaries. Openings 801 encapsulate the collection of known openings on a track segment. AdjacentOpenings 804 encapsulate a grouping of openings on a track segment that are adjacent to one another such that the robot must choose a passage between the openings based on the adjacent openings. A PathOption 806 encapsulates a discrete option for a path of robot travel as defined by a sequence of openings. A PathOption 806 defines the BestRoute 807 for the robot to take. A BestRoute 807 defines the best possible route for a robot to take based on a generic description of factors used to make such a determination. PathOptions 803 define all of the possible path options a robot may take along a known route. The Path abstraction 800 encapsulates a process for planning the path a robot will travel. A set of Obstacles 784 are examined and a set of Openings 801 are identified for which the robot may navigate over a course. Those AdjacentOpenings 804 through which the robot may travel are then identified. Any identified impasses are handled by an ImpasseHandler 802. The PathOptions 803 are then identified including the best route to travel out of all of options available.

The Navigation Mapping service encapsulates route planning based on map data. MapData information such as Elevation, Water, and other Features are used to identify Obstacle and Opening information based on Map-Data. The navigation mapping data easily plugs into the Navigation Planning service and hence enables navigation planning based on information from map data as well as from sensor data.

Figure 30B:
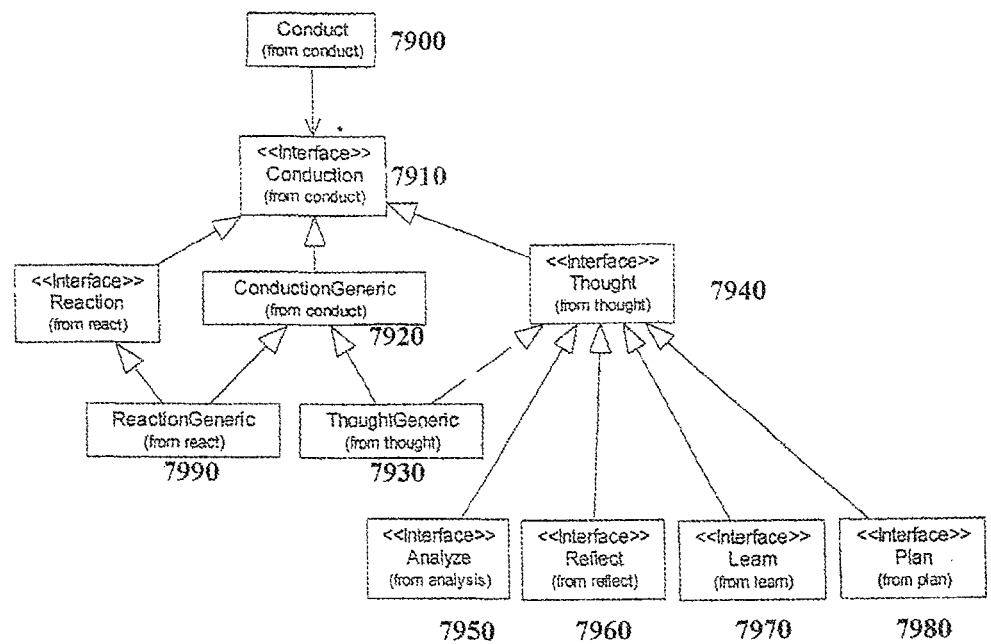
FIG. 30B is a UML class/concept diagram that illustrates the CONDUCT service and sub-services, according to some embodiments.

As shown in FIG. 30B, the Conduct 7900 service provides a Conduction interface 7910 and ConductionGe-neric 7920 implementation which models the conduct of a robotic process. Conduct represents the behavior and inherent properties of existence for a robot. Upon sensing information, a robot may perform artificial intelligence operations on that data, reflexively react to such information, or perform some other operation that exudes some conduct on the information. The Conduction operations may also be scheduled or randomly execute based on time or some other stimuli. The Conduction abstractions may result in modifications to the robot state or in stimulating Actuators to perform some action. The Conduction abstractions serve as base abstractions for all operations by a robot that occur between or independently of sensing and acting. The Conduct service extends from the System service abstractions. A generic Conduct abstraction also provides services for communicating with and managing Conduction abstractions as a collection.

A Thought service provides a Thought interface 7940 and ThoughtGeneric 7930 implementation which models a thought process. The generic means for modeling artificial intelligence is achieved in this fashion. Concrete subtypes from this service's abstractions are used to embody different types of thought processes such as analysis, inference, deduction, and planning. The Analysis services provides an Analyze 7950 and AnalyzeGeneric implementation used for encapsulating analysis of information retrieved from a sensor. A Reflect service provides a Reflect 7960 and ReflectGeneric implementation used for encapsulating rules for reflecting on information after it is analyzed in order to generate new information. A Learn service provides a Learn 7970 and Learn Generic implementation used for encapsulating rules for learning and generate knowledge and new state information based on existing information. A Plan service provides a Plan 7980 and PlanGeneric implementation used for planning a course of action based on sensor information, analyzed information, new information. new state information, or new knowledge. A React service provides a Reaction and ReactionGeneric 7990 implementation used for encapsulating a direct reaction on one or more actuators based on some stimuli from a sensor. A Rules service provides a Rule, RuleGeneric, Rules, and RulesGeneric implementation for encapsulating rules of behavior. Poprietary, custom, and third-party rule engines seamlessly plug into the framework using these abstractions. A Neural service provides a Neuron, NeuronGeneric, NeuralNetwork, and NeuralNetworkGeneric implementation for encapsulating neural networks. Proprietary, custom, and third-party neural networks seamlessly plug into the framework using these abstractions. An HMM service provides a HMM and HMMGeneric implementation for encapsulating hierarchical Markov models. An HHMM service provides a HHMM and HHMMGeneric implementation for encapsulating hierarchical hidden Markov models. Proprietary, custom, and third-party hierarchical Markov models and hierarchical hidden Markov models seamlessly plug into the framework using these abstractions. A GeneticLearning service provides a GeneticLearning and GeneticLearning Generic implementation for encapsulating genetic learning algorithms. Proprietary, custom, and genetic learning algorithms seamlessly plug into the framework using these abstractions.

As there are various machine learning algorithms in the field, and no one algorithm that necessarily applies to all robotics, UGV, and AGV problems, GPROS provides a pluggable architecture for integrating such algorithms via its Conduct service. Thus specific rule engines may be integrated using the Rules service adapters and specific neural networks may be integrated using the Neural service adapters as an example.

The Robot service provides a Robot interface 440 and RobotGeneric 703 implementation which models the generic concept of a robot. The RobotGeneric 703 is a completely configurable abstraction that can be used to model any type of robot. Sensors 711, Conduct, and Actuators 721 are associated with a robot in a configurable fashion. In this way, any type or number of sensors, actuators, and conduct can be configured with the robot and linkages made between them. Upon construction using the Config 540 and Registry service, the robot may be commanded according to its lifecycle to live, wake, sleep, and die.

The robotic God 701 (see FIG. 19) service provides the base services used to create and define the universe within which a robot operates. The RobotUniverse 700 abstraction is used to configurably define when and which Robot objects live and die. In this way, a network, local or distributed, of robots can live, perform their missions, operate, and die according to a common universe. The RobotGod 701 abstraction is used to configurably start and stop the RobotUniverse 700. It is essentially a robot universe launcher program.

An autonomous vehicle application is one type of unmanned ground vehicle application. Unmanned ground vehicles can be tele-operated, autonomous, or some variation which includes autonomous behavior and some level of manned operation or guidance. An unmanned ground vehicle application is one type of robotics application. GPROS in fact refers to the use on a device such as an Unmanned Ground Vehicle (UGV), one type of which is an Autonomous Ground Vehicle (AGV). Thus, the services of GPROS, given their generality, are and have been applied to UGVs and autonomous vehicles. Autonomous vehicles include automated vehicles, driverless cars and trucks, self-driving cars and trucks, and generally refer to those ground-based vehicles which are capable of transporting humans or goods. Thus, GPROS applies to and is used as an unmanned ground vehicle operating system and autonomous vehicle operating system.

Another viewpoint is to view the UGV layer referenced in the parent application as a vertical robotics application framework (VRAF) that extends GPROS. The combination of GPROS with an UGV VRAF as an extension thus defines an unmanned ground vehicle operating system and autonomous vehicle operating system.

Figure 61:
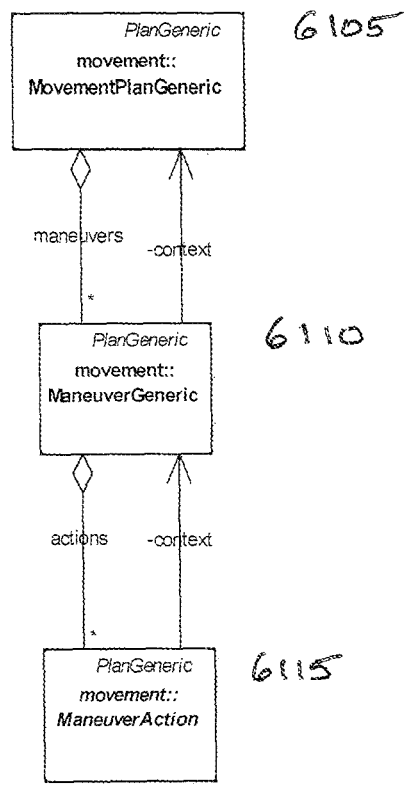
FIG. 61 is a diagram illustrating various extensions that can be used in an unmanned ground vehicle or related application, according to some embodiments.

Further extensions for use as an unmanned ground vehicle operating system and autonomous vehicle operating system are described here and illustrated in FIG. 61. A ManeuverAction abstraction extends the PlanGeneric abstraction. Because PlanGeneric ultimately extends from SystemGeneric, all of the SystemGeneric behaviors are available to ManeuverAction. A ManeuverAction defines one discrete action to be taken by a UGV or AGV in some sequence of actions to be taken during a maneuver. For example, a maneuver action may be defined as setting the desired speed of the vehicle to some designated value.

A ManeuverGeneric abstraction also extends the PlanGeneric abstraction and thus inherits all of the behaviors from SystemGeneric. Thus, by virtue of the fact that a System object can trigger one or more other System objects based on parameterized conditions, so too can a Maneuver be configured to trigger one or more ManeuverAction objects since ManuverAction objects extend from SystemGeneric objects. Furthermore, arbitration over which ManeuverAction objects are activated are also inherited from the System service.

Examples of concrete ManeuverGeneric configurations include stopping, roaming, obstacle avoidance, cliff avoidance, object following, vehicle following, lane following, line following, three point U-turns, stop sign handling, stop light handling, intersection handling, merging, passing, passing on impasse, re-routing, self-parking, open zone handling, traffic sign handling, platooning, sudden obstacle avoidance, curb avoidance, speed bump management, floating obstacle avoidance, gated obstacle avoidance, negative obstacle avoidance, and rendezvous at specified time and waypoint handling. In fact, services that represent concrete and parameterizable versions of these maneuvers, which extend from the System service and Maneuver service, are defined here:

Stopping maneuver and service: Allows for configuration of a maneuver actions to realize the autonomous stopping of a vehicle or robot based on a parameterized conditions dictating how the vehicle or robot should transition through those maneuver actions.

Roaming maneuver and service: Allows for configuration of a maneuver actions to realize the autonomous roaming and wandering of a vehicle or robot based on a parameterized conditions dictating how the vehicle or robot should transition through those maneuver actions.

ObstacleAvoidance maneuver and service: Allows for configuration of a maneuver actions to realize the avoidance of obstacles by a vehicle or robot based on a parameterized conditions dictating how the vehicle or robot should transition through those maneuver actions.

CliffAvoidance maneuver and service: Allows for configuration of a maneuver actions to realize the autonomous avoidance of driving over a cliff or into a ditch by a vehicle or robot based on a parameterized conditions dictating how the vehicle or robot should transition through those maneuver actions.

ObjectFollowing maneuver and service: Allows for configuration of a maneuver actions to realize the autonomous following of an object by a vehicle or robot based on a parameterized conditions dictating how the vehicle or robot should transition through those maneuver actions.

VehicleFollowing maneuver and service: Extends ObjectFollowing and allows for configuration of a maneuver actions to realize the autonomous following of another vehicle by a vehicle or robot based on a parameterized conditions dictating how the vehicle or robot should transition through those maneuver actions.

LaneFollowing maneuver and service: Allows for configuration of a maneuver actions to realize the autonomous following a lane by a vehicle or robot based on a parameterized conditions dictating how the vehicle or robot should transition through those maneuver actions.

LineFollowing maneuver and service: Allows for configuration of a maneuver actions to realize the autonomous following of a line by a vehicle or robot based on a parameterized conditions dictating how the vehicle or robot should transition through those maneuver actions.

UTurn maneuver and service: Allows for configuration of a maneuver actions to realize an autonomous U-turn by a vehicle or robot based on a parameterized conditions dictating how the vehicle or robot should transition through those maneuver actions.

StopSignHandling maneuver and service: Allows for configuration of a maneuver actions to realize the autonomous stopping based on a perceived sign by a vehicle or robot based on a parameterized conditions dictating how the vehicle or robot should transition through those maneuver actions.

StopLightHandling maneuver and service: Allows for configuration of a maneuver actions to realize the autonomous stopping based on a perceived light by a vehicle or robot based on a parameterized conditions dictating how the vehicle or robot should transition through those maneuver actions.

IntersectionHandling maneuver and service: Allows for configuration of a maneuver actions to realize the autonomous navigation of an arbitrarily complex intersection by a vehicle or robot based on a parameterized conditions dictating how the vehicle or robot should transition through those maneuver actions.

MergingHandling maneuver and service: Allows for configuration of a maneuver actions to realize the autonomous merging in moving traffic by a vehicle or robot based on a parameterized conditions dictating how the vehicle or robot should transition through those maneuver actions.

PassOnImpasseHandling maneuver and service: Allows for configuration of a maneuver actions to realize the autonomous passing of a blocked passage by a vehicle or robot based on a parameterized conditions dictating how the vehicle or robot should transition through those maneuver actions.

ReRouting maneuver and service: Allows for configuration of a maneuver actions to realize the autonomous re-routing of a vehicle or robot based on a parameterized conditions dictating how the vehicle or robot should transition through those maneuver actions.

SelfParkHandling maneuver and service: Allows for configuration of a maneuver actions to realize the autonomous self-parking by a vehicle or robot based on a parameterized conditions dictating how the vehicle or robot should transition through those maneuver actions.

OpenZoneHandling maneuver and service: Allows for configuration of a maneuver actions to realize the autonomous navigation of an open zone by a vehicle or robot based on a parameterized conditions dictating how the vehicle or robot should transition through those maneuver actions.

TrafficSignHandling maneuver and service: Allows for configuration of a maneuver and actions to realize the autonomous reaction based on a perceived sign by a vehicle or robot based on parameterized conditions dictating how the vehicle or robot should transition through those maneuver actions.

Platooning maneuver and service: Allows for configuration of a maneuver and actions to realize the autonomous caravaning of one or more vehicles or robots based on parameterized conditions dictating how the vehicle or robot should transition through those maneuver actions.

SuddenObstacleAvoidance maneuver and service: Allows for configuration of a maneuver and actions to realize the autonomous perception and/or reaction to obstacles suddenly appearing in view (e.g. deer or kangaroo) of a vehicle or robot based on parameterized conditions dictating how the vehicle or robot should transition through those maneuver actions.

CurbAvoidance maneuver and service: Allows for configuration of a maneuver and actions to realize the autonomous perception and/or reaction to curbs on the side of a road by a vehicle or robot based on parameterized conditions dictating how the vehicle or robot should transition through those maneuver actions.

SpeedBumpHandling maneuver and service: Allows for configuration of a maneuver and actions to realize the autonomous perception and/or reaction to speed bumps encountered by a vehicle or robot based on parameterized conditions dictating how the vehicle or robot should transition through those maneuver actions.

FloatingObstacleAvoidance maneuver and service: Allows for configuration of a maneuver and actions to realize the autonomous perception and/or reaction to obstacles appearing above the ground and not connected to the ground in field of view (e.g. railroad crossing or hanging trees) of a vehicle or robot based on parameterized conditions dictating how the vehicle or robot should transition through those maneuver actions.

GatedObstacleAvoidance maneuver and service: Allows for configuration of a maneuver and actions to realize the autonomous perception and/or reaction to obstacles that are thin and hard to detect (e.g. gates or power lines) in the field of view of a vehicle or robot based on parameterized conditions dictating how the vehicle or robot should transition through those maneuver actions.

NegativeObstacleAvoidance maneuver and service: Allows for configuration of a maneuver actions to realize the autonomous perception and/or reaction to gaps or holes in the ground in field of view of a vehicle or robot based on parameterized conditions dictating how the vehicle or robot should transition through those maneuver actions.

RendezvousHandling maneuver and service: Allows for configuration of a maneuver actions to realize the autonomous rendezvous at a configurable or dynamically updated location at a configurable time by a vehicle or robot based on a parameterized conditions dictating how the vehicle or robot should transition through those maneuver actions.

A MovementPlanGeneric abstraction, part of the MovementPlan service, also extends the PlanGeneric abstraction and thus inherits all of the behaviors from SystemGeneric. Thus, by virtue of the fact that a System object can trigger one or more other System objects based on parameterized conditions, so too can a MovementPlanGeneric object be configured to trigger one or more ManeuverGeneric objects since ManeuverGeneric objects extend from SystemGeneric objects. Furthermore, arbitration over which ManeuverGeneric objects are activated are also inherited from the System service.

A MovementPlanGeneric encapsulates a plan for movement of a robot. It has a handle to the mobility platform for movement and a collection of maneuvers which can be triggered and induce movements of the mobility platform. Functions such as the start, stop, disable, and enable of movement; inducing of detection of maneuvers to trigger and execute maneuvers are embodied in the MovementPlanGeneric abstraction. As another mode of operation, the movement plan can be told to run a specified/identified manuever. And then the start/stop/control of said maneuver is controlled externally.

Given a suite of possible maneuvers, such as the ones listed above (e.g. Stopping and Following) and applied to autonomous vehicles, a fully autonomous vehicle can be more easily built and configured. GPROS thus allows for decomposition of a complex problem into simpler and manageable sub-parts. That is, by decomposing an autonomous vehicle into the maneuvers it can provide, the MovementPlanGeneric object which can configure one or more of those ManeuverGeneric object implementations can manage and arbitrate which maneuvers are executed and when. Furthermore, each maneuver can be further decomposed into a sequence of MovementAction objects. The triggering of which movement actions are engaged and when, as well as which maneuvers are engaged and when, are localized to configuration of parameterized conditions via the Conditions service. Inheriting its structure from the recursive and hierarchical Systems service, these movement plans, maneuvers, and movement actions can leverage the highly programmable and configurable services offered by and localized within the Systems service.

All of these objects such as MovementPlanGeneric, ManeuverGeneric, ManeuverAction, Conditions, and ConditionEvaluationGeneric, by virtue of being part of GPROS, can be configured using the Config service as well. Thus, the conditions and their parameters, the conditional evaluation functions, the movement actions to take, the association of actions to maneuvers, and the arbitration of actions and maneuvers can all be defined in configuration files using the Config service described here. Thus, the definition of new autonomous driving maneuvers (e.g. lane keeping, passing a vehicle) can leverage existing discrete actions defined in classes, and be composed all through the configuration of files using the Config service. The scalability and configurability of such an approach in building complex applications like driverless cars, whereby there are many maneuvers possible for a car, is dramatically simplified.

Finally, plug-in with embodiments of the Conduct service described here, enable machine learning of how to set the parameters in the config files for such maneuvers. Via the Logging service, the state of sensors and state of the system is logged as well as which conditions were met along with which actions and maneuvers were triggered. A Conduct service such as Neural, implementing a neural network for example, can look at the logged information, state of the system, state of inputs, and create new configuration files with new parameters for the conditions to trigger which actions and maneuvers. The refinement of these parameters conditions using machine learning is thus further fostered by GPROS' combination of Logging, System, Config, and Conduct services.

A PathPlanner services provides a means for dictating the path of a robot. Given outputs from the MovementPlanGeneric object which dictate desired target points for a robot (based on current POSE information, Course information, and maneuvers), the PathPlanner service provides a smooth path and set of target points over which the robot can travel based on configured robot dynamics information.

A SpeedRules service provides a way to dictate the allowed maximum and desired target speed of a robot. It consolidates desired speeds set from other objects and chooses the most restrictive speed based on the set input speeds. It also allows for input of a target speed, which if lower than the maximum allowable speed, will limit the robot to that speed. The PathPlanner may, for example, set a target speed.

A SteeringRules services provides algorithms for calculating of desired target steering angles of a robot. It consolidates information on target steering angle and other configurable steering limit factors such as maximum allowable steering for the robot, maximum allowable steering to not roll the robot over based on current POSE information and configurable robot characteristics, and maximum allowable steering based on the ability of the robot to handle turns at the current speed. The PathPlanner can provide input to SteeringRules to dictate the target steering angle of the robot based in its known achievable path plan, robot dynamics, and robot characteristics.

Figure 62:
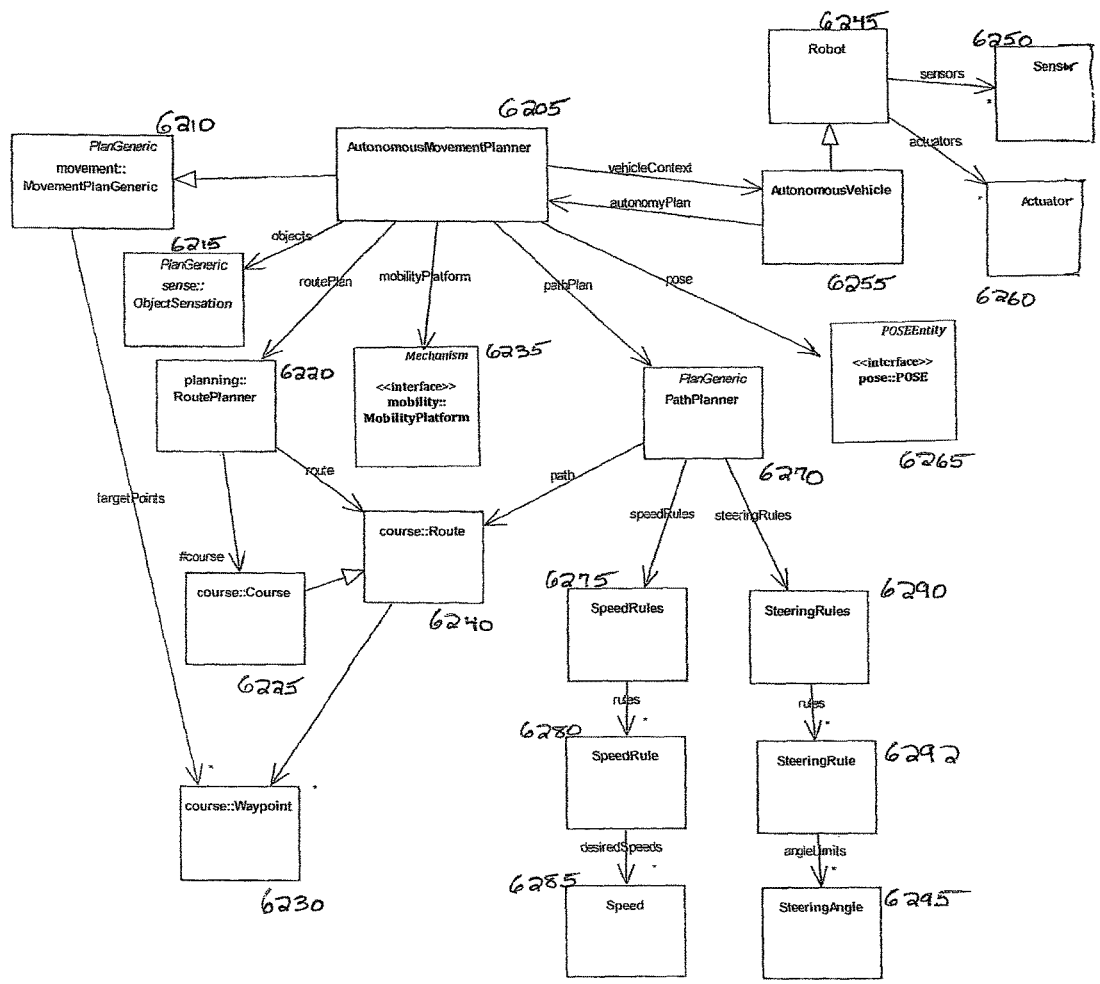
FIG. 62 is a diagram illustrating an autonomous movement planner service and related services, to some embodiments.

An AutonomousVehicle service extends from and leverages the services of the Robot service. An AutonomousVehicle abstraction, by virtue of its Robot service inheritance, can thus be associated with a collection of sensors and actuators that embody the autonomous vehicle robot. An AutonomousVehicle extends the concept further and has an AutonomousMovementPlanner which is a type of MovementPlanGeneric object. This is depicted in aspects in FIG. 62.

An AutonomousMovementPlanner, part of the AutonomusVehicle service, extends from and leverages the MovementPlan service. It is a concrete service that encapsulates an autonomous movement plan and which encapsulates all of the hooks to MovementPlan behavior and configured autonomous maneuvers, a MobilityPlatform, ObjectSensation, Course, PathPlanner, SpeedRules, SteeringRules, and POSE. Thus, by combining they services of other application services defined here, the AutonomousMovementPlanner ties together the services in a configurable fashion to yield the behavior and integration services for an autonomous vehicle. While the discrete services can be configured in configuration files distinctly and linked to one another using links which specify which messages from which objects trigger which other objects, the AutonomousMovementPlanner provides a more concrete definition of such linkages for tying together the requisite components for an autonomous vehicle configuration.

Operational Aspects

Figure 31:
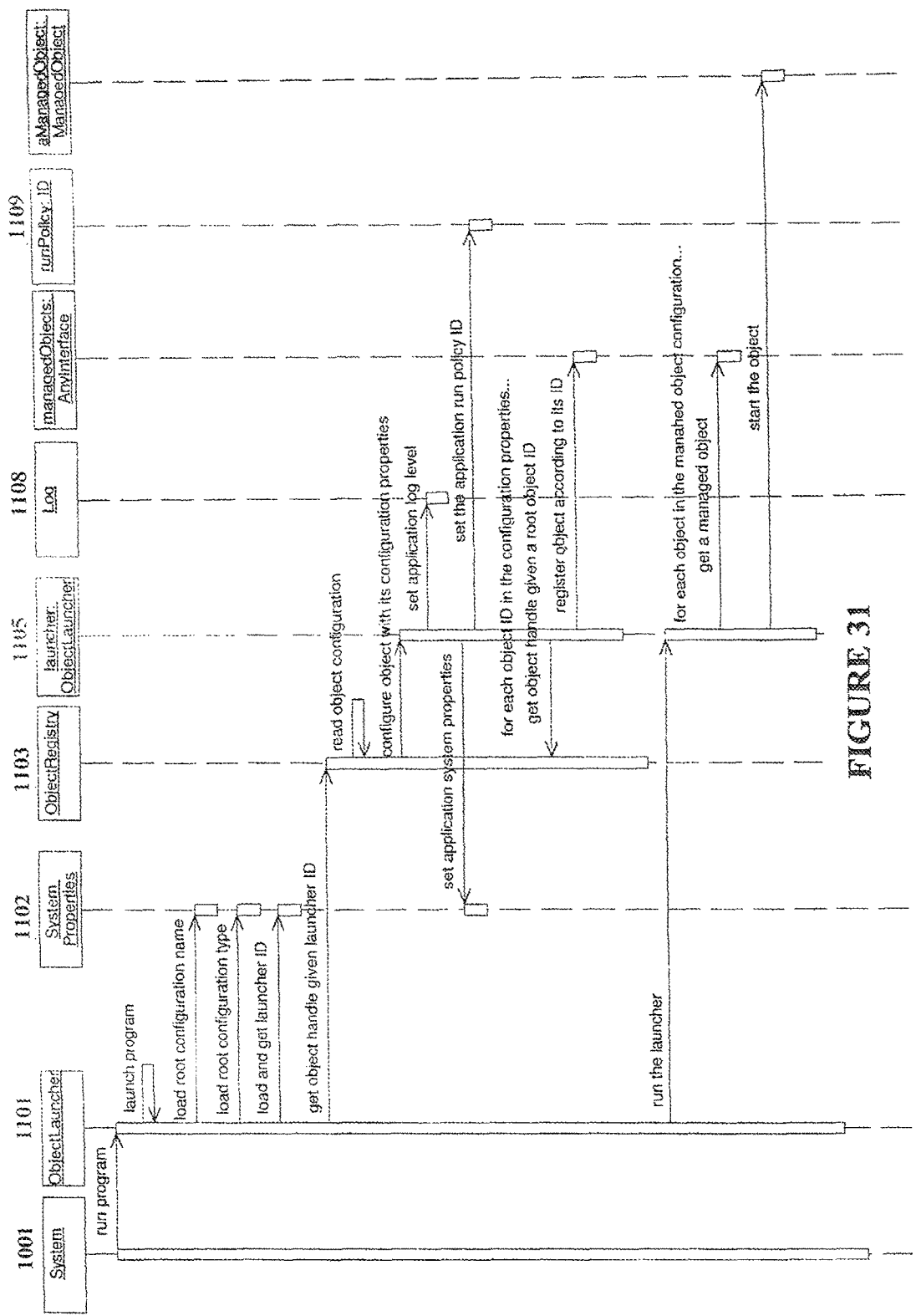
FIGS. 31-44 are UML sequence diagrams that illustrate various general aspects, according to some embodiments.

FIGS. 31-44 illustrate general embodiments in various aspects. FIG. 31 shows how any sort of application can be launched generically and configurably using the registry service. The ObjectLauncher 1101 is launched as a program on a system 1001. The ObjectLauncher 1101 then loads the root configuration name and type from the System Properties (part of util service) 1102. The ObjectLauncher 1101 then retrieves a launcher ID and supplies it to the ObjectRegistry 1103 in order to get an object handle. The ObjectRegistry 1103 then reads the object configuration and induces the object to configure itself, wherein here the object to be configured is the Launcher:ObjectLauncher 1105. The Launcher:ObjectLauncher 1105 then sets the application log level (using the Log service) 1108, sets any application system properties using the util service, and sets the application run policy ID 1109. For each object ID in the configuration properties, the Launcher:ObjectLauncher 1105 gets an object handle from the ObjectRegistry 1103 given an object ID, and registers the object according to its ID 1109 by means of the Any service. The ObjectLauncher 1101 is then able to run. For each object in the managed object configuration, the ObjectLauncher 1101 gets the managed object and starts its operation.

Figure 32:
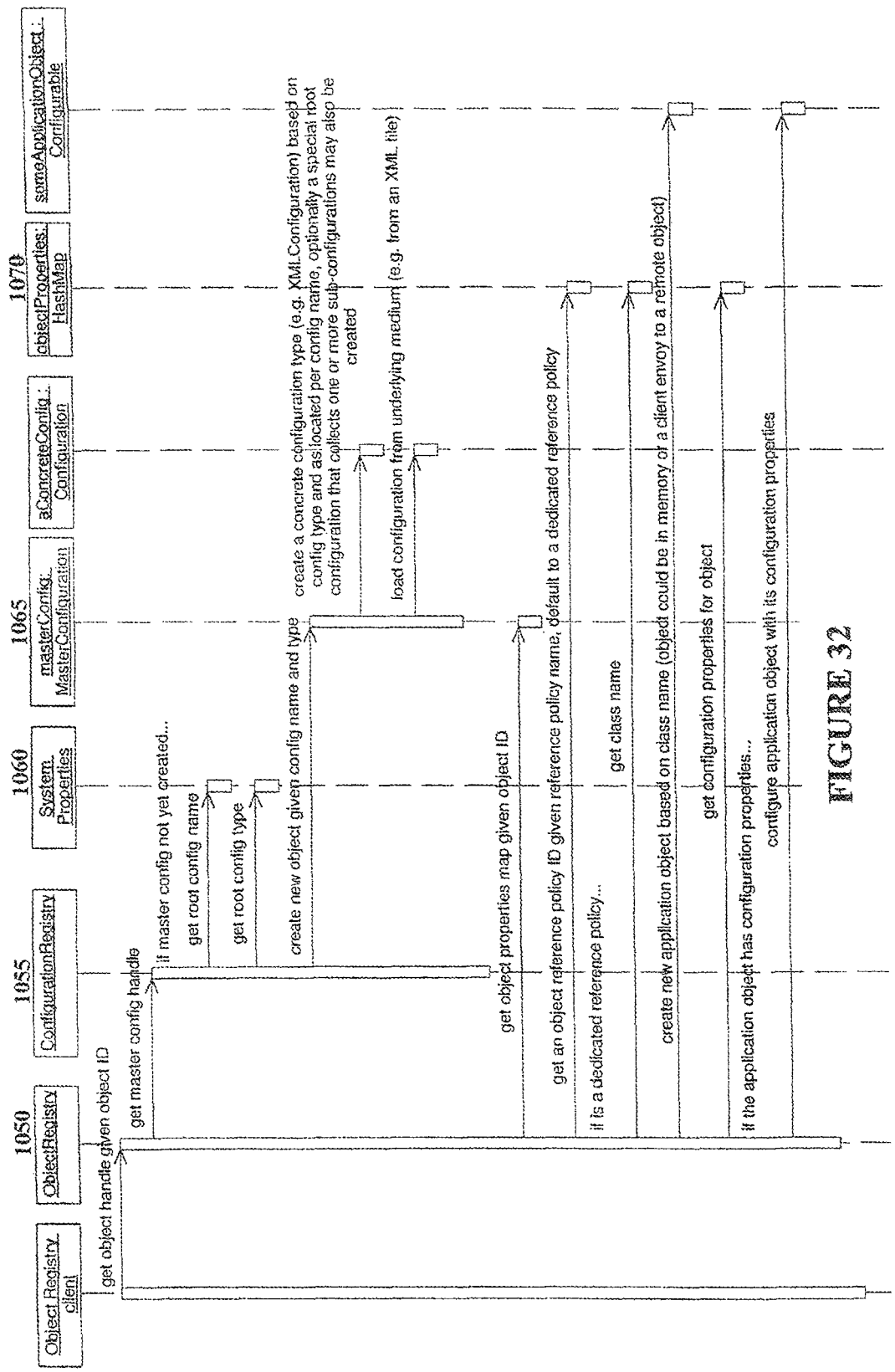

FIG. 32 illustrates how any sort of application objects can be automatically created and configured using the registry and config services. The client obtains an object handle from the ObjectRegistry 1050 given its ID. The ObjectRegistry 1050 meanwhile gets a master config handle from the ConfigurationRegistry 1055. If a master config has not yet been created, the ConfigurationRegistry 1055 must get a root config name and type from the System Properties 1060 (util service), and then create a new object given config name and type by means of the MasterConfiguration 1065. A concrete configuration type (e.g., XML Configuration) is created based on this information. Optionally, a special root configuration that collects one or more sub-configurations may also be created. The MasterConfiguration 1065 loads a configuration from the underlying medium (e.g., an XML file). With the master config created, the ObjectRegistry 1050 can now proceed to get an object properties map from the MasterConfiguration 1065, as well as an object reference policy ID from the HashMap 1070. (If this cannot be obtained, it will default to dedicated reference policy.) It will be understood by those skilled in the art that the term HashMap refers to a manner of storing name-value pairs as in a software hash table. An object can be retrieved from the HashMap 1070 collection using an ID or string. In the case of a dedicated reference policy, the ObjectRegistry 1050 gets a class name from the HashMap 1070 and uses this to create a new application object. The object could be in memory or be a client envoy to a remote object. The ObjectRegistry 1050 then attempts to obtain configuration properties from the HashMap 1070. If such properties exist, the application is configured given these properties.

Figure 33:
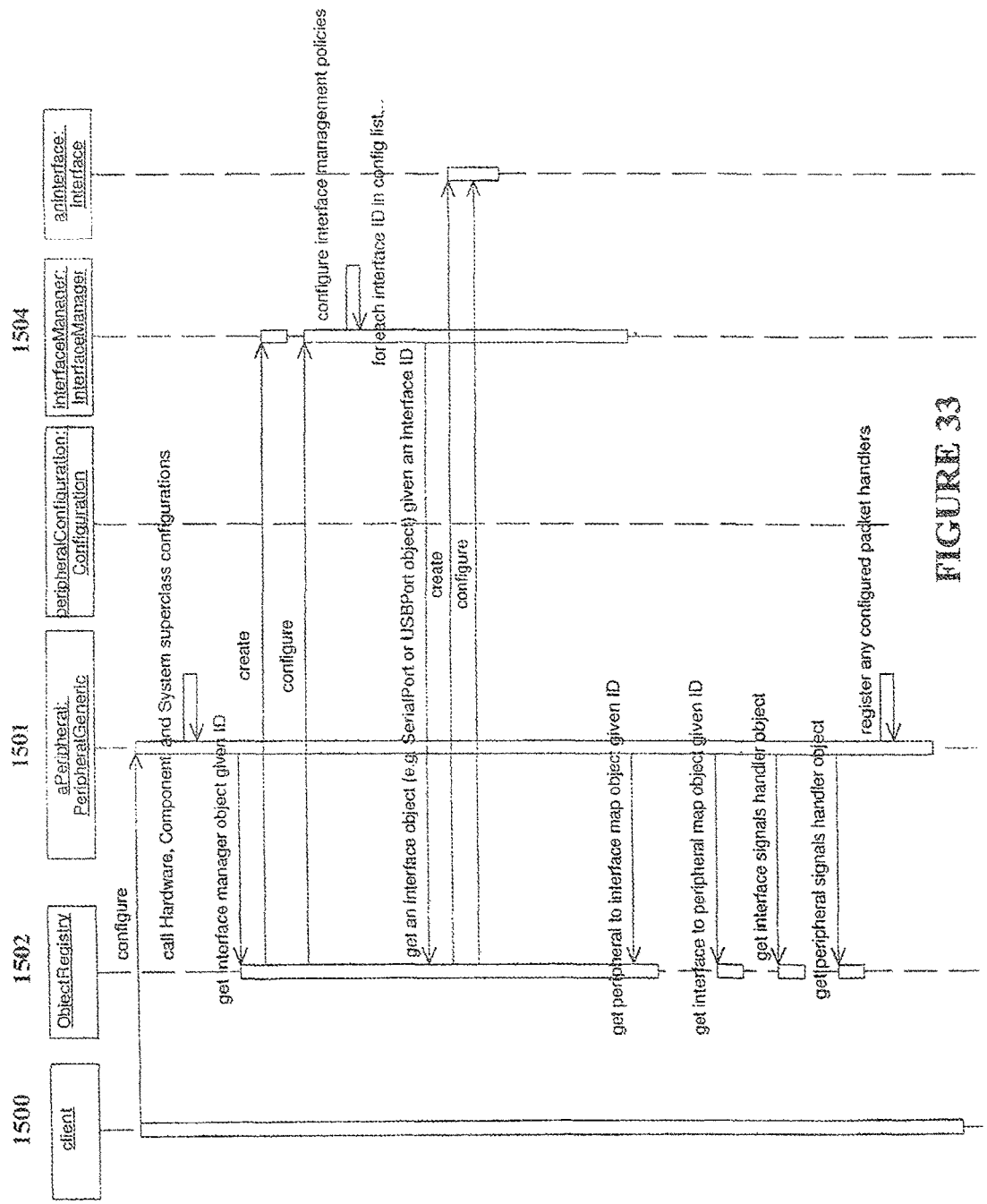

FIG. 33 illustrates how peripherals are generically configured and created. including their relation to one or more system interfaces. The Client 1500 begins by inducing the configuration of a PeripheralGeneric object (e.g., via the registry service) 1501, which in turn calls the hardware, component, and system superclass configurations. The PeripheralGeneric 1501 abstraction primarily operates in conjunction with the ObjectRegistry 1502 and InterfaceManager. Specifically, once the PeripheralGeneric 1501 obtains the interface manager object from the ObjectRegistry 1502 given an ID, it can create and configure the InterfaceManager 1504 and the interface management policies. For each interface ID in the configuration list, an interface object is obtained from the ObjectRegistry 1502 (e.g., SerialPort or USBPort object), and the interface is created and configured. The PeripheralGeneric 1501 abstraction must then obtain a few other objects from the ObjectRegistry 1502. An object that maps data used by a peripheral to data used by an interface is retrieved given its ID. An object that maps data used by a interface to data used by a peripheral is also retrieved given its ID. Interface and Peripheral signals handler objects are obtained as well. Finally. the PeripheralGeneric 1501 registers any configured packet handlers.

Figure 34:
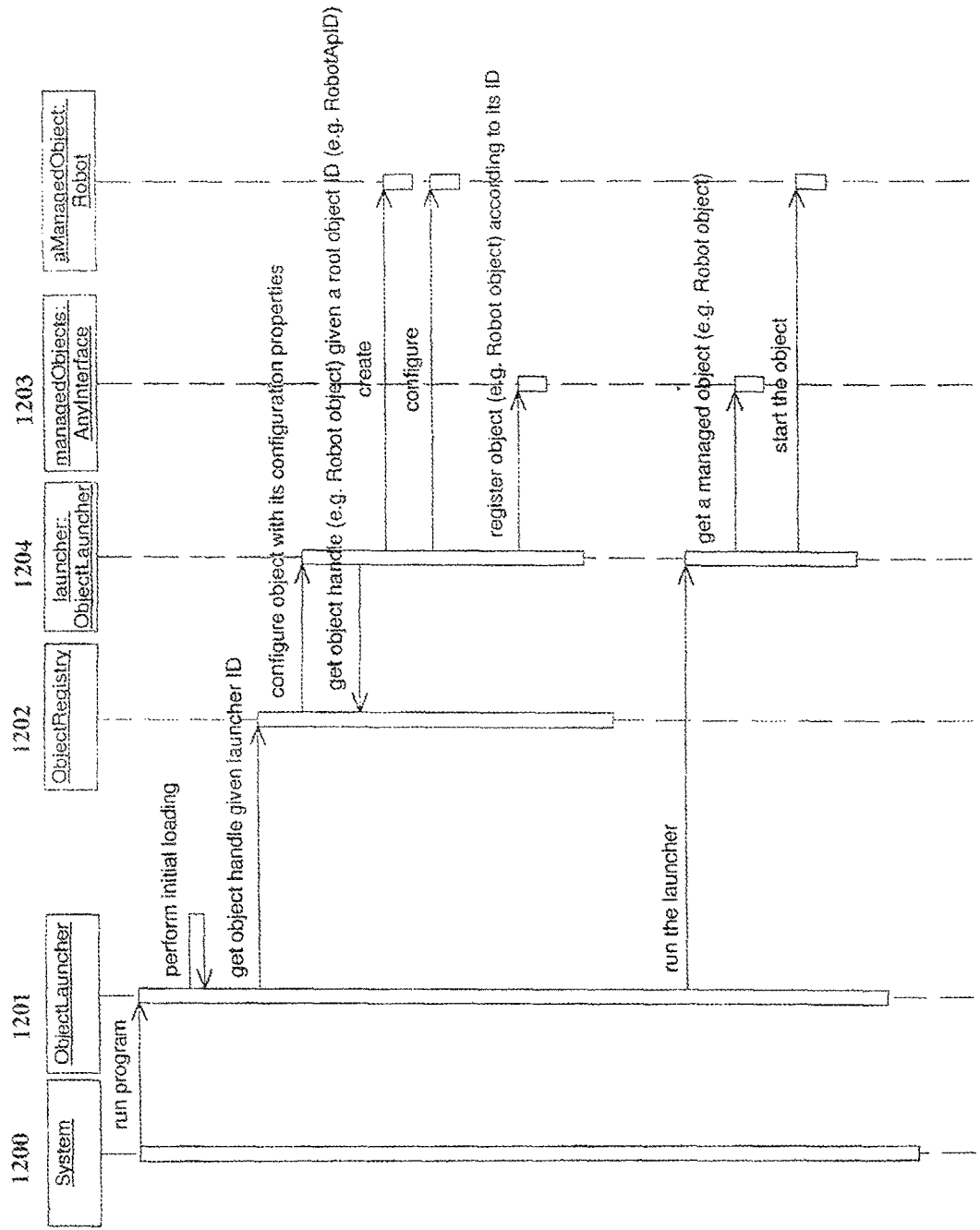

FIG. 34 illustrates how the registry service is used to launch generic robotics applications. The System 1200 initiates the ObjectLauncher 1201, and after the initial loading of the program, an object handle is obtained from the ObjectRegistry 1202 given its launcher ID. The laun-cher: ObjectLauncher 1204 is configured, and another object handle (e.g., "robot object") is obtained from the ObjectRegistry 1202, this time given its root object ID (e.g., "RobotAplD"). A Robot abstraction is created and configured as a managed object, and the object is registered through the AnyInterface 1203 given its recently obtained handle (i.e., "robot object"). Once this object creation has been completed, the ObjectRegistry 1202 will be able to obtain and start the object by means of the AnyInterface 1203 and the recently created managed object's interface.

Figure 35:
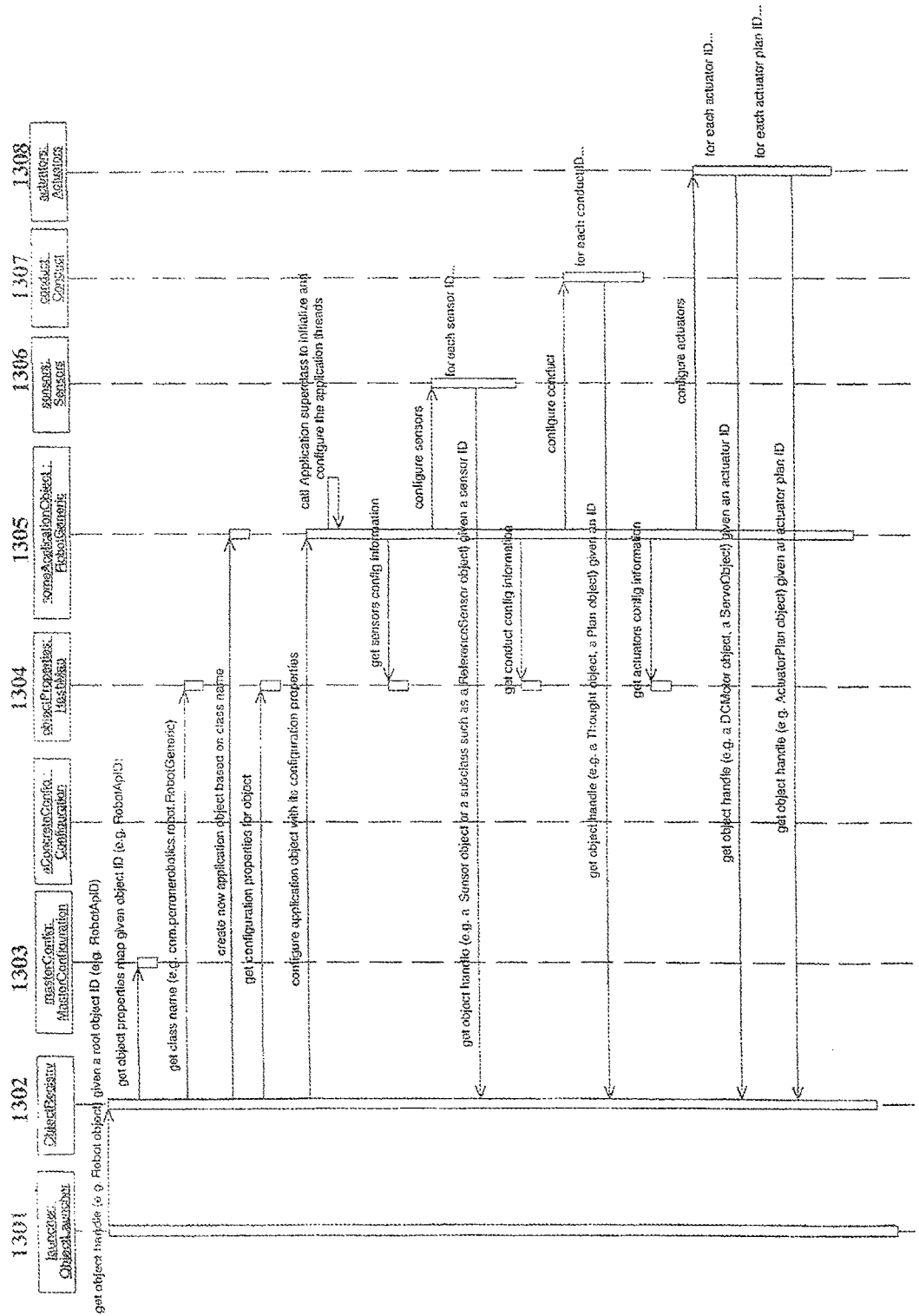

FIG. 35 illustrates how the registry and config services are used to automatically create and configure a general purpose robotics application. The launcher:Object-Launcher 1301 must get an object handle (e.g., "robot object") from the ObjectRegistry 1302 given a root object ID (e.g., "RobotAplD"). The ObjectRegistry 1302 in turn gets an object properties map from the Masterconfiguration 1303, given the object ID (e.g., "RobotApld"), and a class name (e.g., "com.perronerobotics.robot.RobotGeneric") from the HashMap 1304. Given this class name. a new ApplicationObject 1305 is created (e.g., "RobotGeneric"). The ObjectRegistry 1302 configures this new object using properties obtained from the HashMap 1304. The newly created object calls upon the Application superclass in order to initialize and configure the application threads. Sensor configuration information is obtained from the HashMap 1304 and configured using the Sensors service 1306. For each sensor ID, an object handle must be obtained from the ObjectRegistry 1302. The object handle might be a Sensor object, (or a subclass such as a ReferenceSensor object). Conduct is initialized the same way, using the Conduct 1307 service instead of the Sensors 1306 service. Object handles for conduct might include a Thought object or a Plan object. Actuators are initialized similarly, using the Actuators 1308 service. For each actuator ID an object handle is obtained (e.g., a DCMotor object or a ServoObject) and for each actuator plan ID an object handle is obtained (e.g., an ActuatorPlan object).

Figure 36:
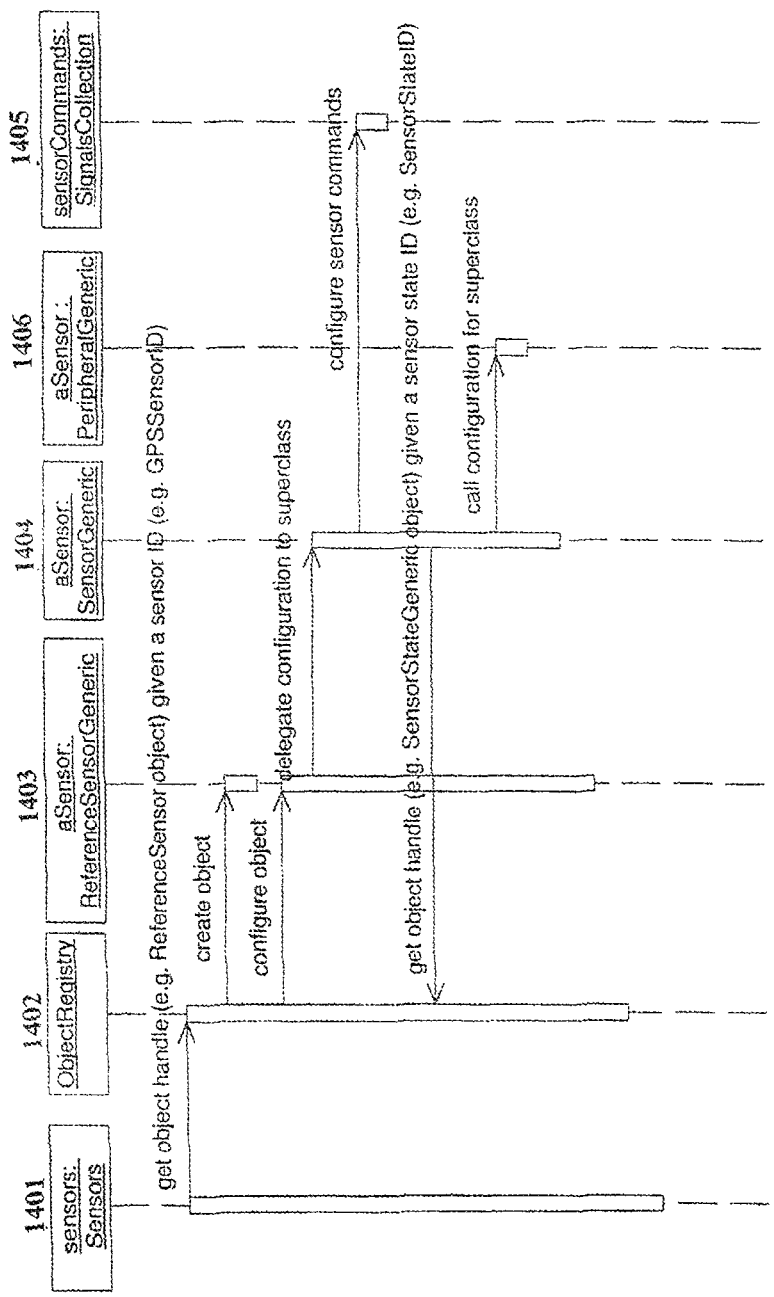

FIG. 36 illustrates an example of how a reference sensor (e.g., for GPS) is created and configured. The Sensors 1401 service gets an object handle (e.g., ReferenceSensor object) from the ObjectRegistry 1402 given a sensor ID (e.g., GPSSensorID). A new object (e.g., ReferenceSensor-Generic) 1403 is created and configured. The object configuration is delegated to the superclass, i.e., SensorGeneric 1404. Sensor commands are configured through the SignalsCollection 1405. Given the sensor state ID (e.g., SensorStateID), an object handle is obtained from the ObjectRegistry (e.g., SensorStateGeneric object) 1402. The SensorGeneric 1404 calls the configuration for the superclass, in this case the PeripheralGeneric sensor 1406.

Figure 37:
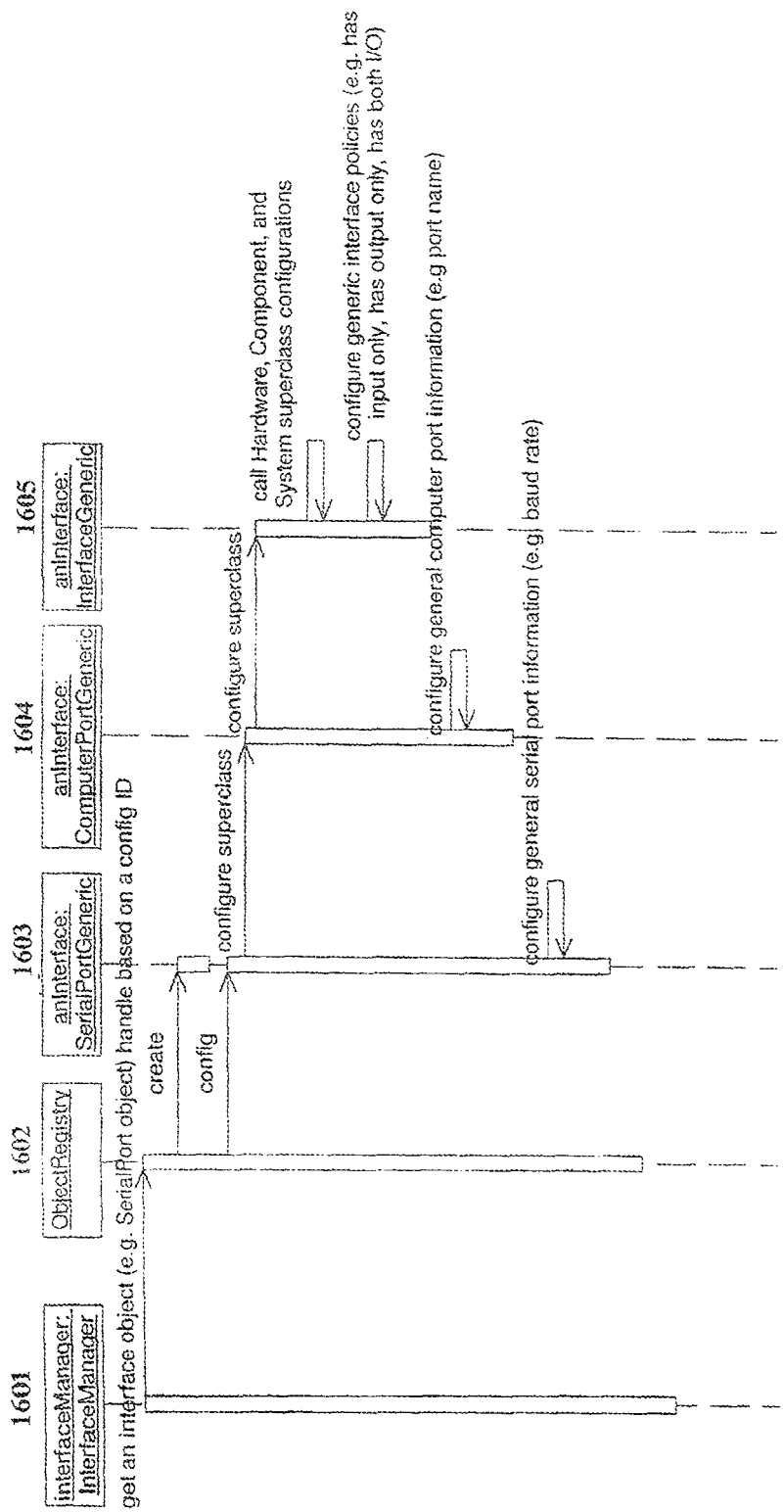

FIG. 37 illustrates an example of how a serial port type of system interface is created and configured. The InterfaceManager 1601 begins by obtaining an interface object handle (e.g., SerialPort object) from the ObjectReg-istry 1602, based on a config ID. The new interface (i.e., SerialPortGeneric 1603) is created and configured. General serial port information, such as the baud rate, will later be configured. The superclass is configured, in this case a ComputerPortGeneric 1604 interface. General computer port information will later be configured, such as the port name. This computer port interface configures its superclass, in this case an InterfaceGeneric 1605. This interface calls its hardware, component, and system superclass configurations, and configures the generic interface policies (e.g., has input only, has output only, has both I/O, etc.). Configuration is then completed.

Figure 38:
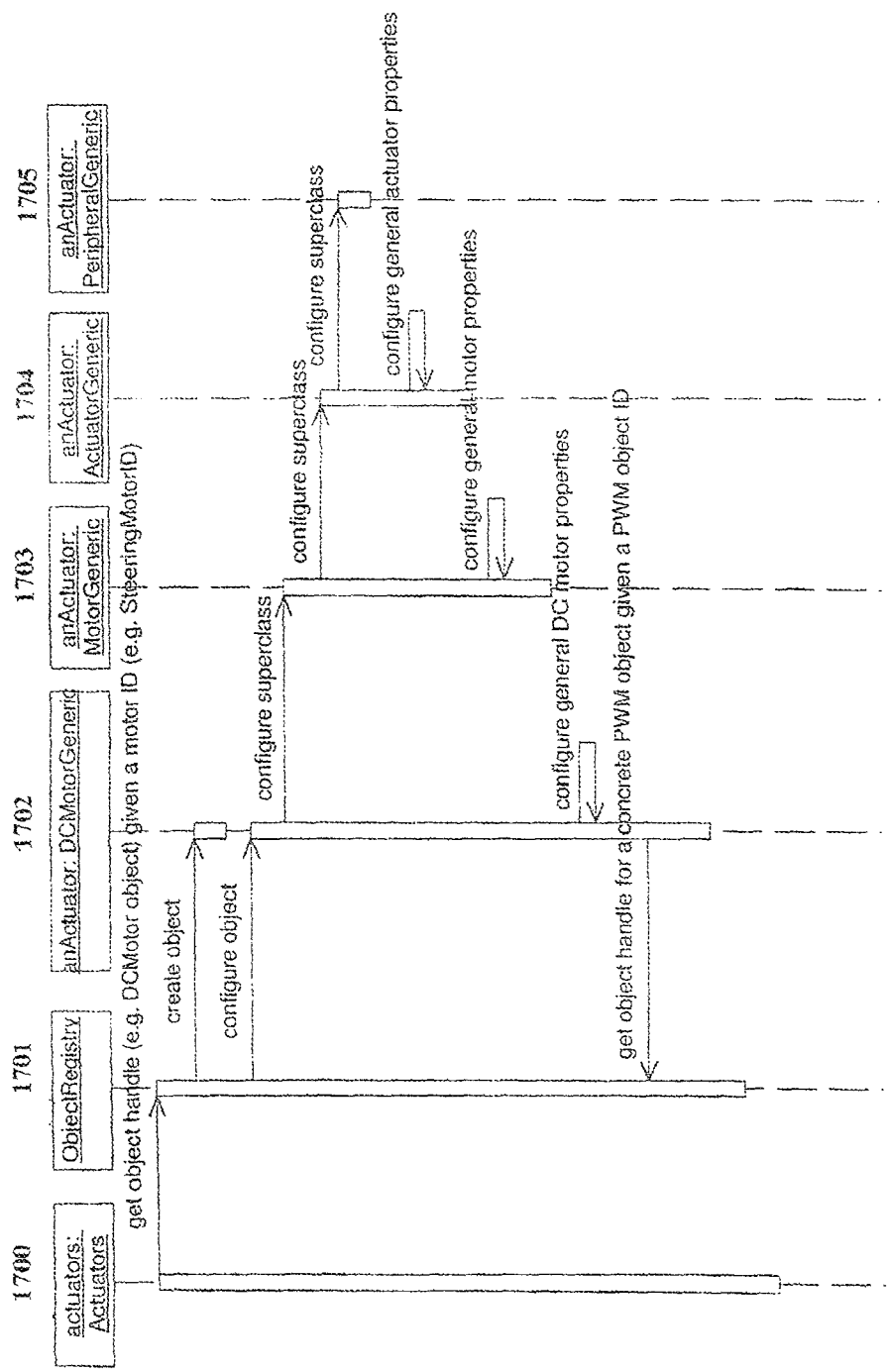

FIG. 38 illustrates an example of how a DC motor actuator type of peripheral is created and configured. The Actuators 1700 service gets an object handle (e.g., DCMotor object) from the ObjectRegistry 1701, given a motor ID (e.g., SteeringMotorID). A DCMotorGeneric 1702 actuator object is created and configured. Three superclasses are configured in turn the MotorGeneric 1703, the ActuatorGeneric 1704, and the PeripheralGeneric 1705. The general properties for the actuator, motor, and DC motor objects are configured. Given a PWM object ID, the DCMotorGeneric 1702 gets an object handle from the ObjectRegistry 1701 for a concrete PWM object.

Figure 39:
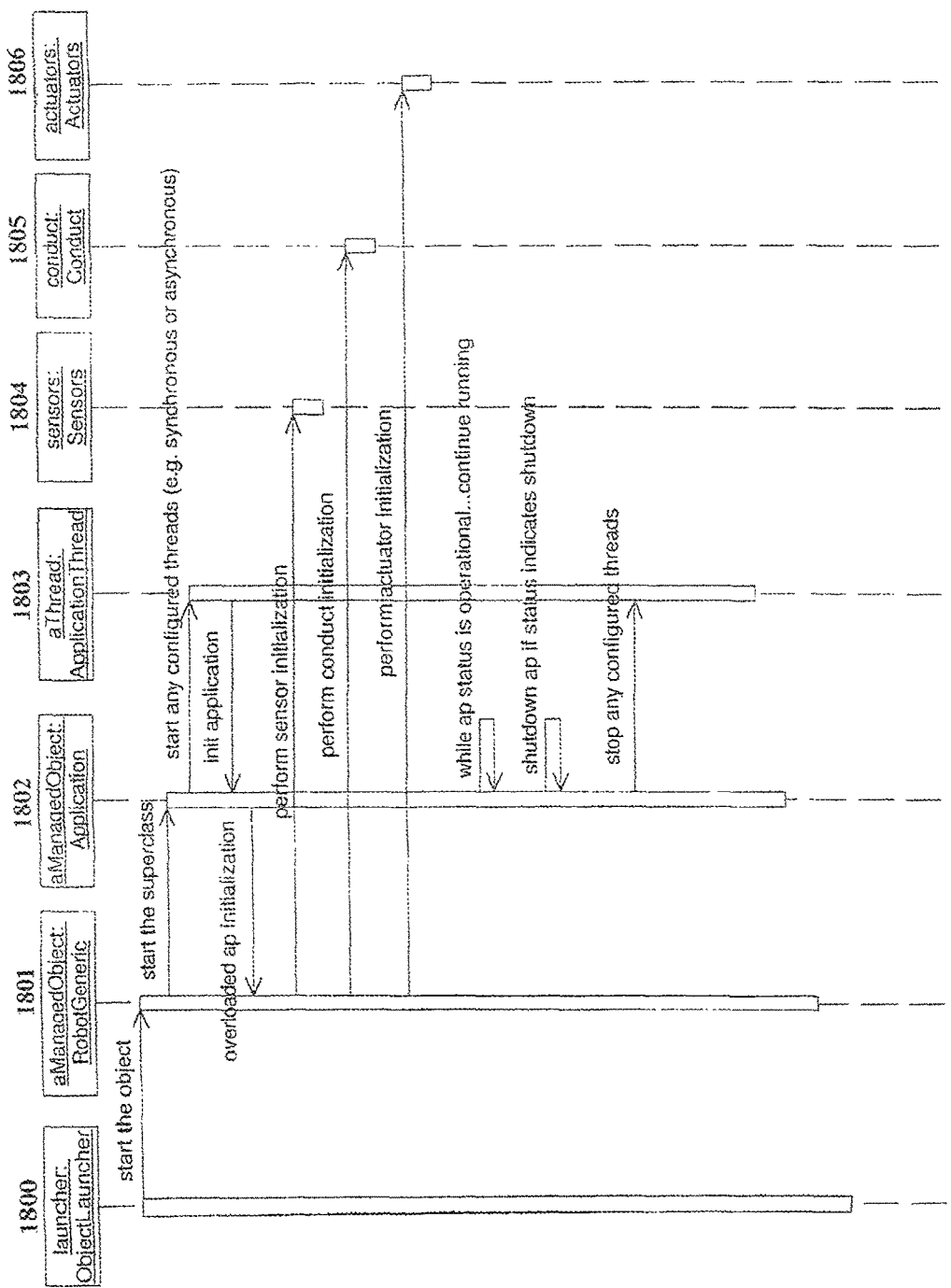

FIG. 39 illustrates how a generic robotic application is started. The ObjectLauncher 1800 starts a RobotGe-neric 1801 managed object. An application superclass 1802 is started. Any configured threads (e.g., synchronous or asynchronous) are started by means of the Application-Thread 1803. The ApplicationThread 1803 is initialized and the Application 1802 initialization is overloaded appropriately by the RobotGeneric 1801 application class. The term "overloaded" is taken from its object-oriented programming meaning. It will be understood by those skilled in the art that a method on a class can be "overloaded" by a subclass if it is named the same way and shares the same operation signature (input and output parameters). When an object of that class type is invoked, the subclass's method implementation is called instead of or before the superclass's method. The subclass can also invoke the superclass's method from within the overloaded method.

Sensor 1804, Conduct 1805, and Actuator 1806 initialization is performed through their respective initialization interfaces. The application continues running as long as it is told to stay operational. When the status is changed to indicate shutdown. any configured threads are stopped.

Figure 40:
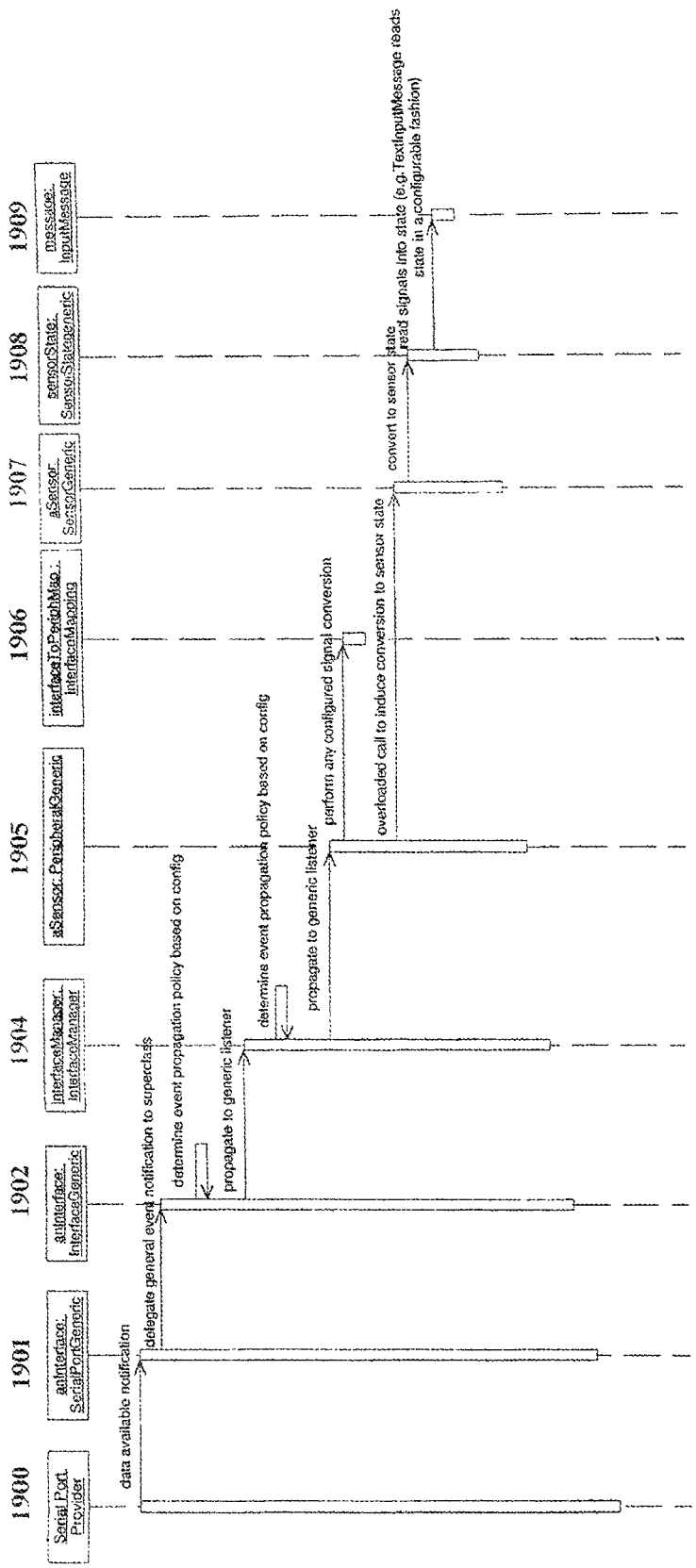

FIG. 40 illustrates how a sensor can be asynchronously updated using a serial port as an interface input example. The SerialPortGeneric 1901 interface is notified of data availability by the Serial Port Provider 1900. It then delegates general event notification to the superclass, the InterfaceGeneric 1902, which determines event propagation policy based on the configuration. This in turn propagates to the generic listener, the InterfaceManager 1904. This process is repeated and the propagation in turn proceeds to the PeripheralGeneric sensor 1905. Any configured sensor conversion is performed via the InterfaceMapping service 1906. The PeripheralGeneric 1905 produces an overloaded call in order to induce conversion to the sensor state via the SensorGeneric abstraction 1907. Conversion to sensor state is delegated to the SensorStateGeneric object 1908. The object reads signals into the state (e.g., TextInputMessage reads state in a configurable fashion) via the InputMessage 1909 function of the Message service.

Figure 41:
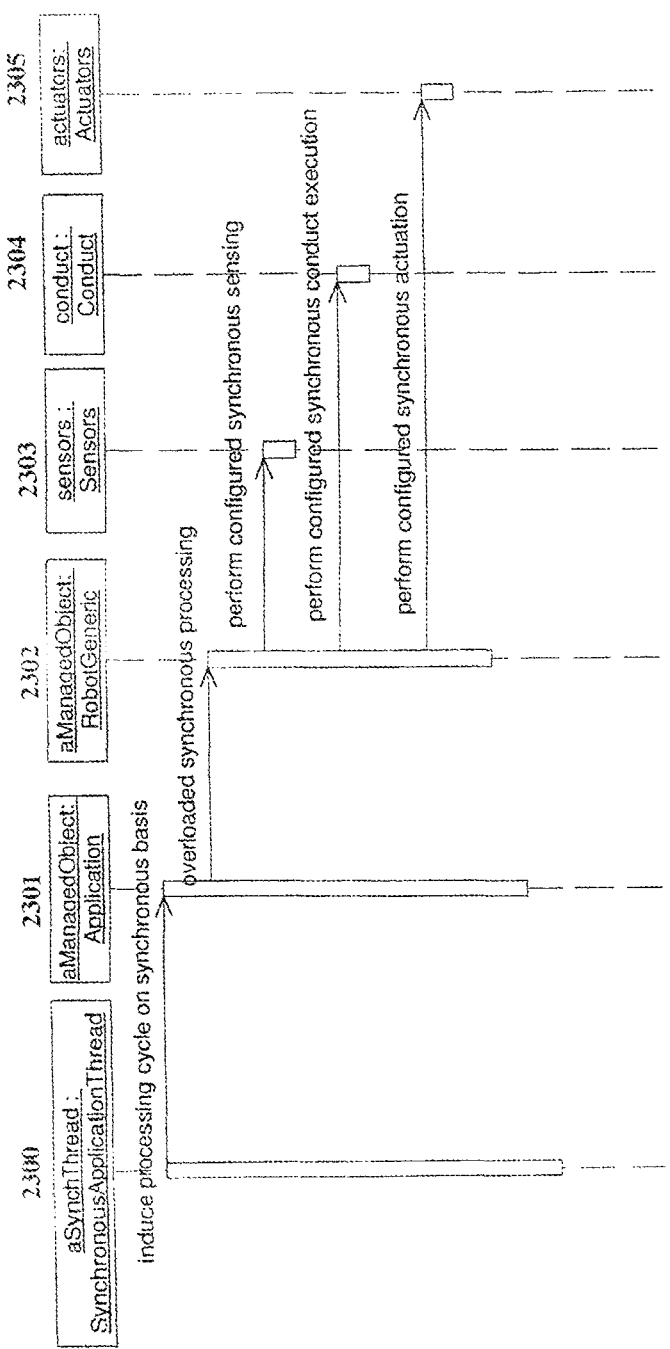

FIG. 41 illustrates an example of how a basic robotic synchronous processing thread can be executed generically. A SynchronousApplicationThread 2300 induces a processing cycle on a synchronous basis on an Application managed object 2301. Overloaded processing then results in a call to a RobotGeneric managed object 2302. The Robot-Generic object 2302 performs configured synchronous sensing, conduct execution. and actuation via the Sensor 2303, Conduct 2304, and Actuator 2305 services, respectively.

Figure 42:
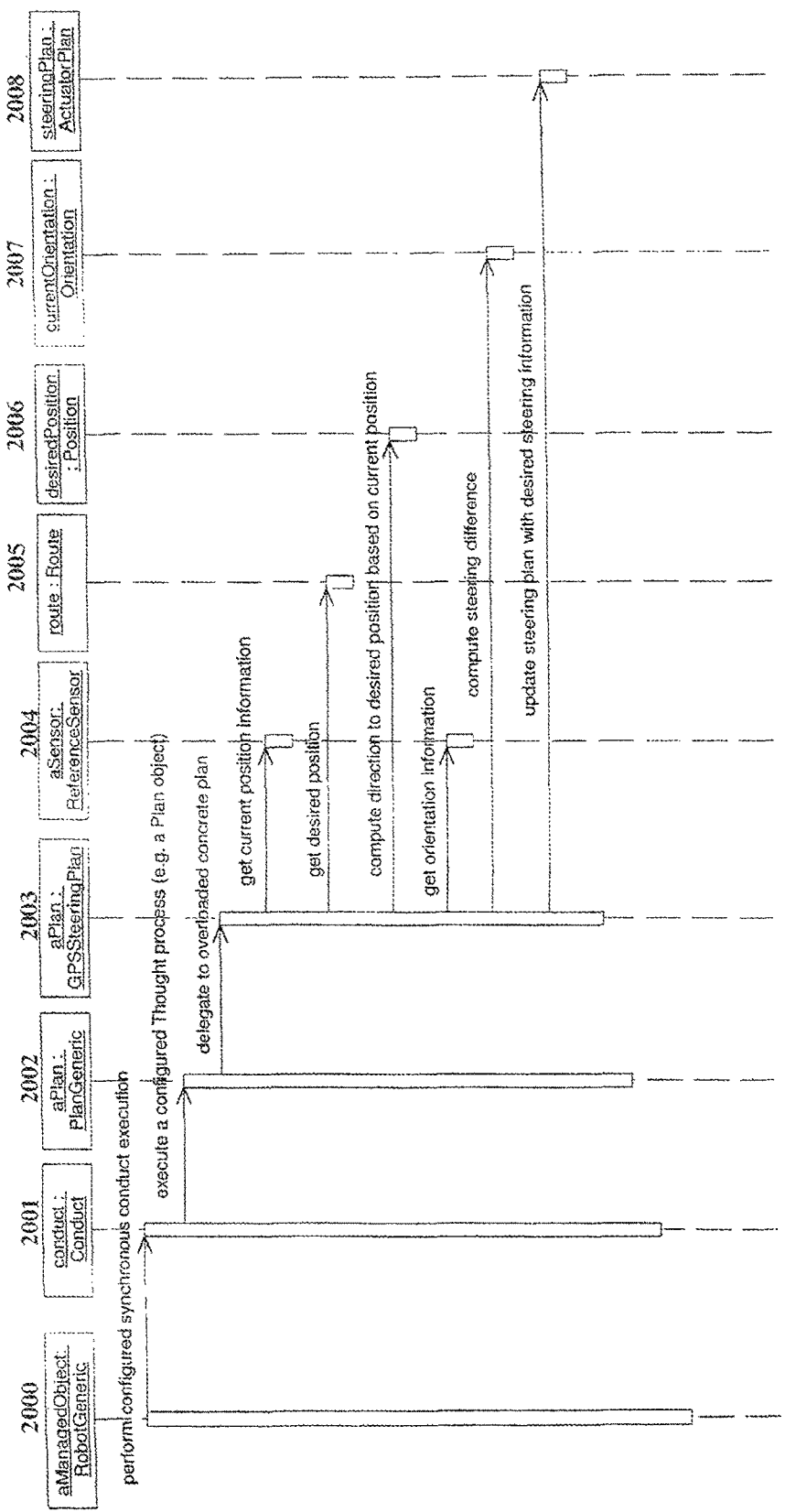

FIG. 42 illustrates an example of how a concrete conduct implementation is invoked in order to implement a GPS-based steering plan. A RobotGeneric managed object 2000 induces a configured synchronous conduct execution via the Conduct service 2001. This results in execution of a configured Thought process (e.g., a Plan object). This generic PlanGeneric 2002 delegates to an overloaded concrete plan, in this case a GPSSteeringPlan 2003. The GPSSteeringPlan 2003 gets current and desired position information from the ReferenceSensor 2004 and Route service 2005, respectively. The Position 2006 service uses this information to compute the direction to the desired position. The GPSSteeringPlan 2003 then gets orientation information from the ReferenceSensor 2004. After all this information has been obtained, the GPSSteeringPlan 2003 computes the steering difference via the Orientation service 2007 and finally updates the steering plan with the desired steering information through the ActuatorPlan service 2008.

Figure 43:
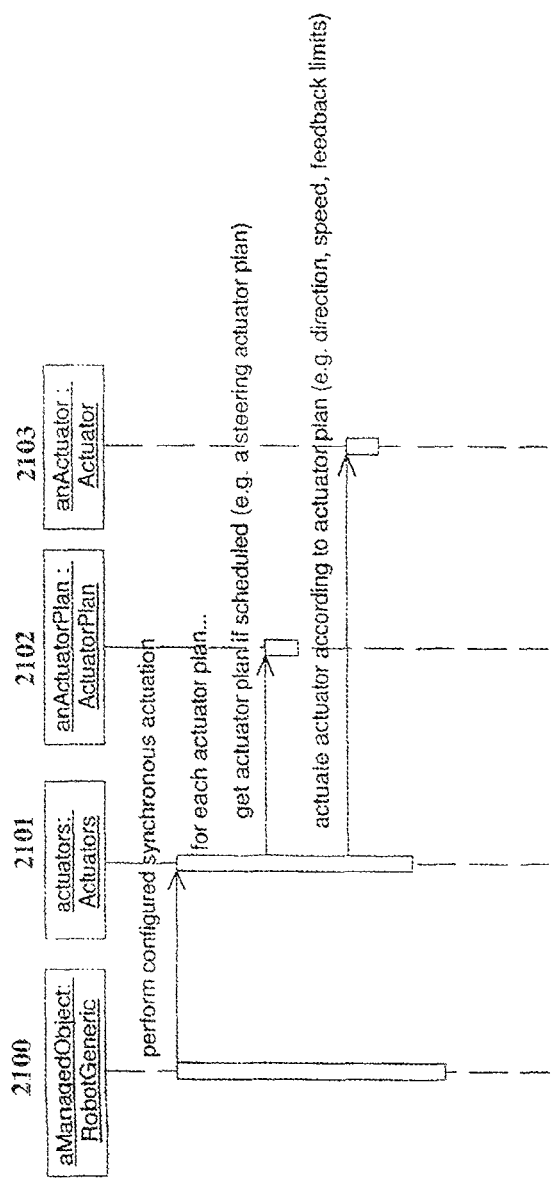

FIG. 43 illustrates an example of how an actuator plan is initiated generically. The RobotGeneric 2100 managed object performs configured synchronous actuation via the Actuator Service 2101. For each actuator plan, the ActuatorPlan 2102 (e.g., a steering actuator plan) is obtained if scheduled. The physical Actuator 2103, is effected according to its plan (e.g., direction, speed, feedback limits, etc.).

Figure 44:
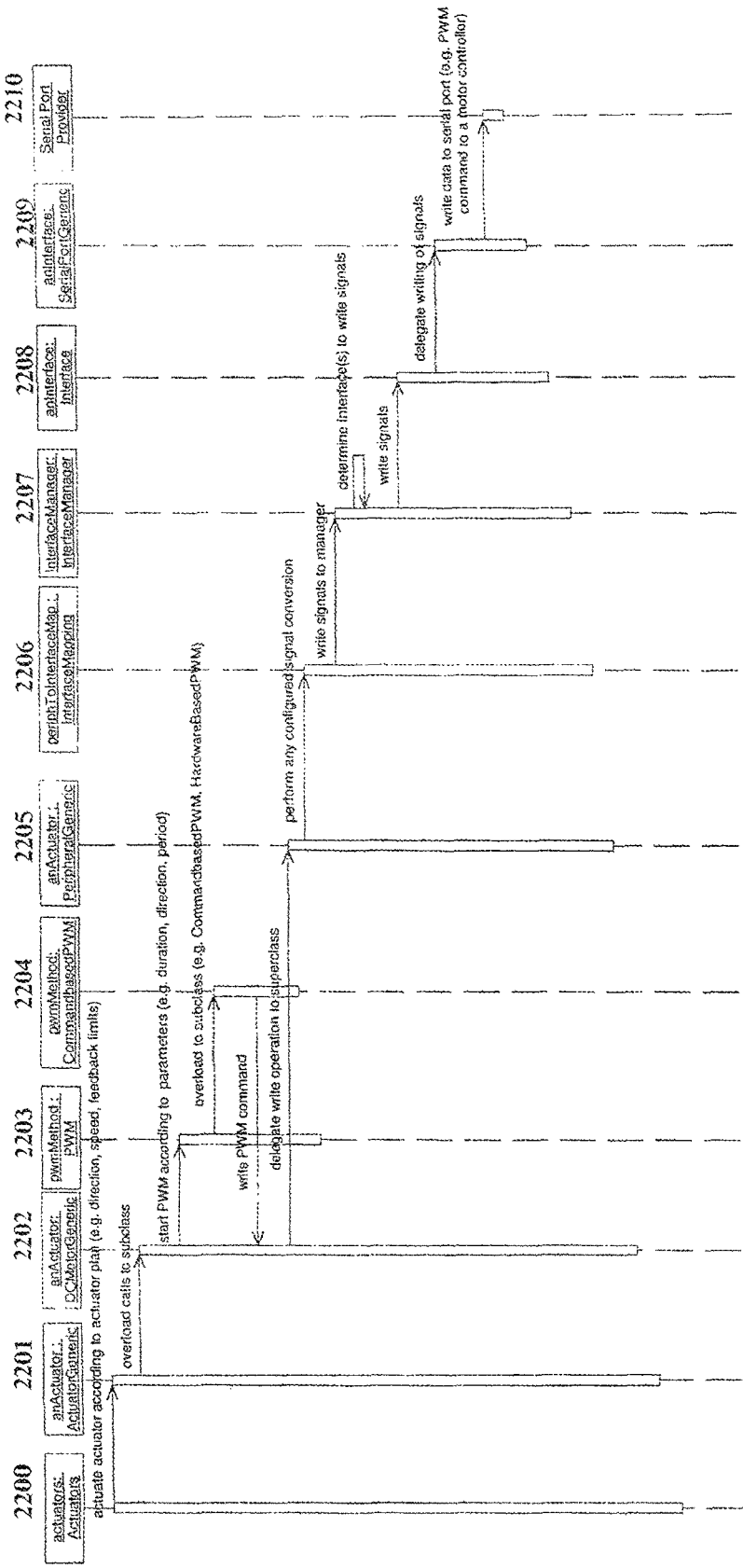

FIG. 44 illustrates an example of how a DC motor controller is commanded to perform actuation via a serial port. The Actuator 2200 is effected according to its actuator plan 2201 (e.g., direction, speed, feedback limits. etc.). Calls to the subclass, in this case DCMotorGeneric 2202 are overloaded. This in turn starts PWM 2203 according to the appropriate parameters (e.g., duration, direction, period, etc.) and overloads this to the subclass (e.g. CommandBasedPWM 2204, HardwareBasedPWM). PWM commands are written to the DCMotorGeneric 2202, which then delegates write operations to the superclass, PeripheralGeneric 2205. PeripheralGeneric 2205 performs any configured signal conversions via an InterfaceMapping abstraction 2206, which writes signals to the InterfaceManager 2207. The InterfaceManager 2207 determines the appropriate interface 2208 to write these signals, and the writing is delegated appropriately (in this case, to the SerialPortGeneric interface 2209). In this example, data is written to the Serial Port (e.g., PWM command to a motor controller) 2210.

Figure 45:
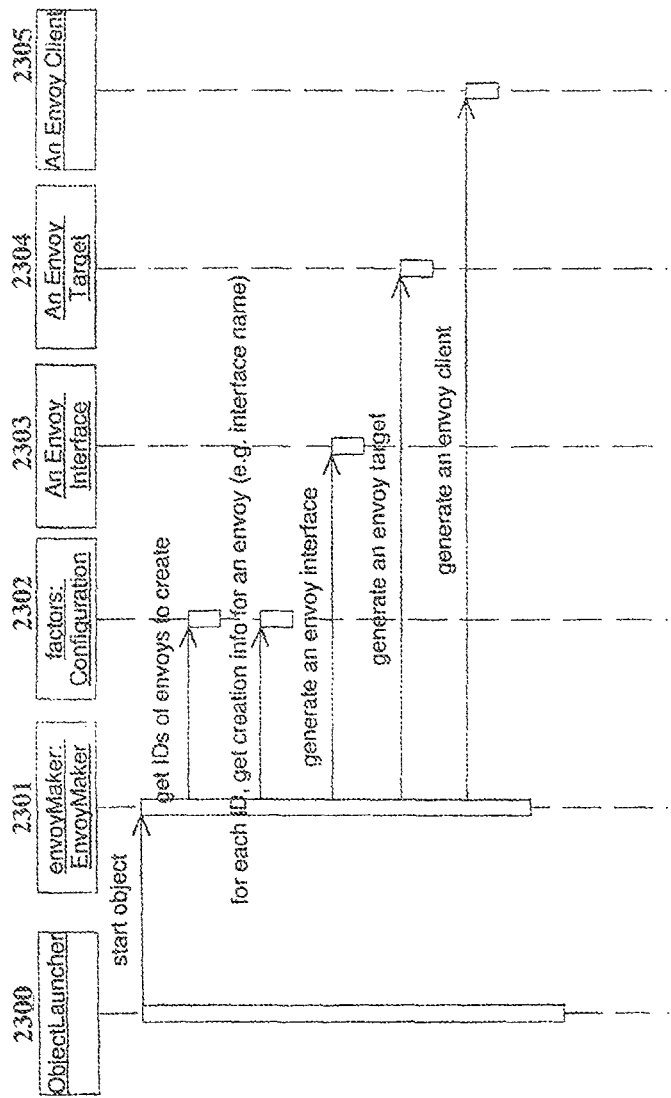
FIGS. 45-52 are UML sequence diagrams that illustrate further aspects and embodiments of the ENVOY service, as depicted in FIG. 10, according to some embodiments.

FIG. 45 illustrates how a class can be called within a program to automatically generate a specific client envoy, envoy interface, and target envoy given some configuration information. The ObjectLauncher 2300 is used to start an EnvoyMaker 2301 instance. The EnvoyMaker 2301 gets a list of IDs of envoys to create from the Configuration service 2302. For each ID, creation information is obtained for an envoy (e.g., interface name) 2303. The EnvoyMaker 2301 generates an Envoy Interface 2303, and an Envoy Target 2304. Finally, an Envoy Client 2305 is generated.

Figure 46:
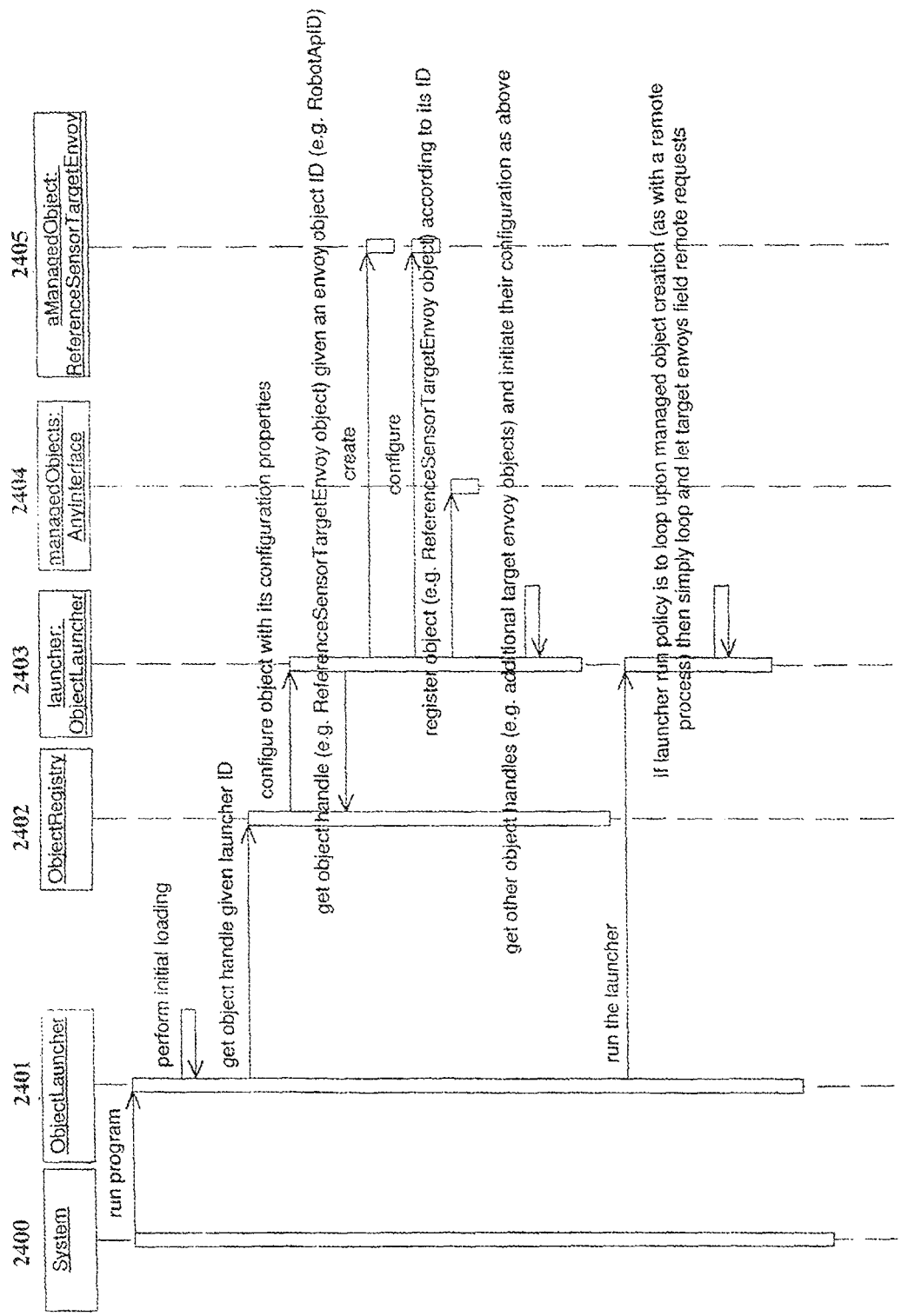

FIG. 46 illustrates how an ObjectLauncher 2401 configuration can automatically create one or more target envoys in a server process. The target envoys then listen for requests from clients. (This figure illustrates the automated configuration and initialization of an application with target envoy objects. Target envoys can also be explicitly created and configured from within an application without use of the ObjectLauncher 2401). The System 2400 launches the ObjectLauncher program 2401, which performs its initial loading. The ObjectLauncher 2401 obtains an object handle from the ObjectRegistry 2402, given a launcher ID. The object is then configured according to its configuration properties. The launcher:ObjectLauncher 2403 obtains an object handle (e.g., ReferenceSensorTargetEnvoy object) from the ObjectRegistry 2402 given an EnvoyObjectID (e.g., RobotApID). A managed object (in this case, ReferenceSensorTargetEnvoy) 2405 is created and configured. The launcher:ObjectLauncher 2403 then registers the object (i.e., ReferenceSensorTargetEnvoy) via an AnyInterface 2404 according to its ID. This process is repeated for each object handle. The ObjectLauncher 2401 is then ready to launch. If the launcher policy is to loop upon managed object creation (e.g., as with a remote object), the looping occurs and target envoys field any remote requests.

Figure 47:
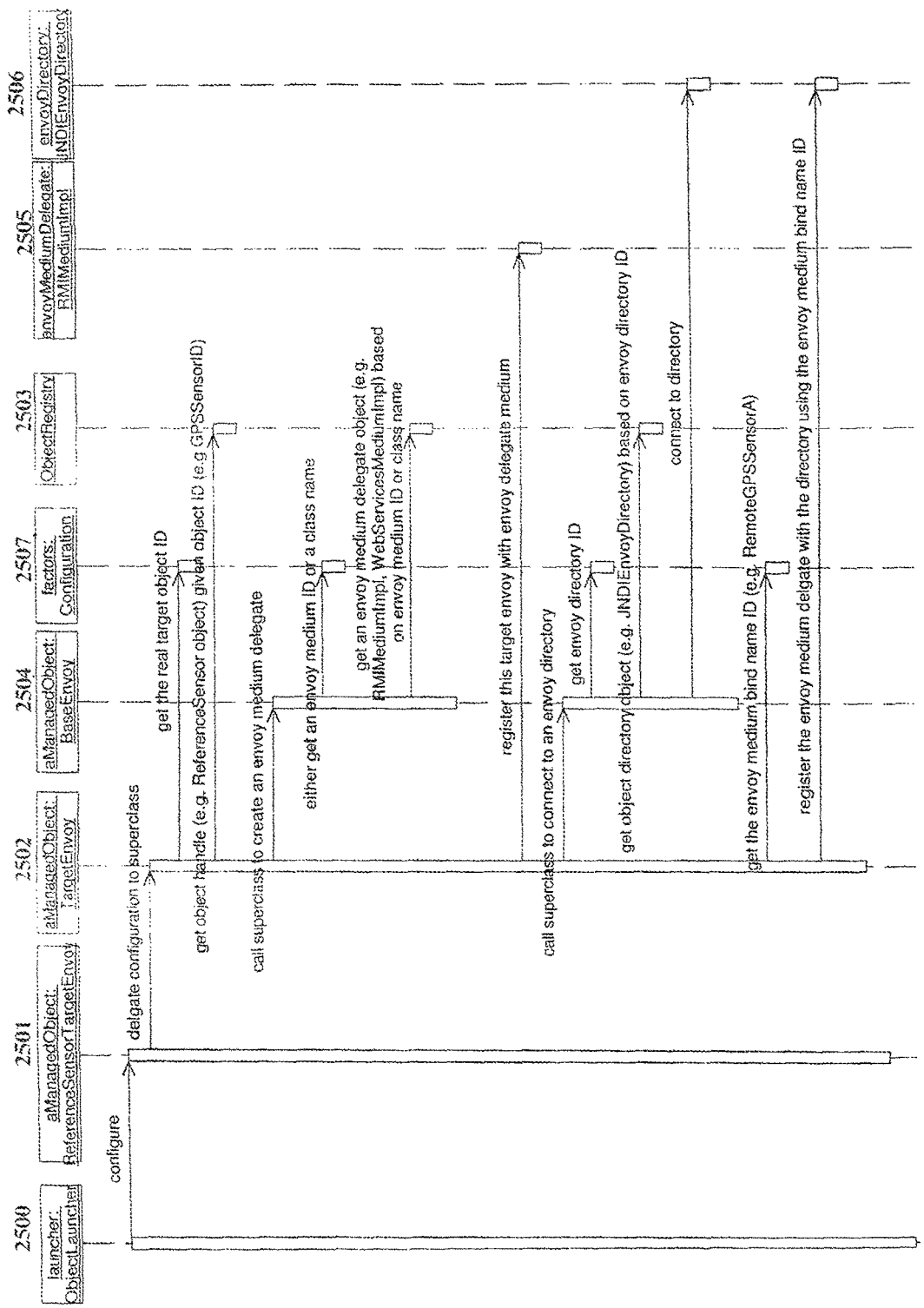

FIG. 47 illustrates background processes that occur when a target envoy is created and configured. The figure illustrates how a generic superclass (TargetEnvoy), which is part of the Envoy service, generically configures and registers a target envoy object with an envoy directory. The specific example illustrates a distributed reference sensor (e.g., a GPS Sensor) that is created as an RMI server and registered with an RMI directory server using the Java JNDI service. RMI is a type of distributed communication methodology. It will be understood that the target envoy can be created using any underlying medium, not only RMI. The target could alternatively be created as a Web service, CORBA service, TCP/IP service, serial communications service, etc., and registered with an envoy directory appropriate for that specific medium (e.g. a UDDI directory service for Web services, a CORBA Naming Service for a CORBA service). The TargetEnvoy and BaseEnvoy are generic classes in the Envoy service. The RMI and JNDI classes are generic classes provided inside GPROS as well. It will be understood by those skilled in the art that any sort of object can be created as a target envoy. For robot and automation applications, the target envoy might be a sensor, or an actuator. or a conduit object.

In the figure, the ObjectLauncher 2500 configures a managed object 2501, in this case "ReferenceSensorTargetEnvoy". This operation is delegated to the superclass, here TargetEnvoy 2502. The configuration provides the real target object ID, and an object handle (e.g., ReferenceSensor object) is obtained from the ObjectRegistry 2503 given the object ID (GPSSensorID). The superclass ("BaseEnvoy") 2504 is called to create an envoy medium delegate 2505. Either an envoy medium ID or class name is obtained from the configuration, and this information is used to obtain an envoy medium delegate (e.g., RMIMediumImpl) 2505 from the ObjectRegistry 2503. This envoy medium delegate 2505 is used to register the target envoy 2502. The TargetEnvoy 2502 calls the superclass ("BaseEnvoy") 2504 to connect with an envoy directory 2506. The envoy directory ID is obtained from the configuration 2507. Based on this envoy directory ID, an object directory object (e.g., JNDIEnvoyDirectory) is obtained from the ObjectRegistry 2503, and connection is initiated. Finally, the TargetEnvoy 2502 obtains an envoy medium bind name ID (e.g., RemoteGPS-SensorA) from the configuration 2507 and registers the envoy medium delegate with the directory using the envoy medium bind name ID.

Figure 48:
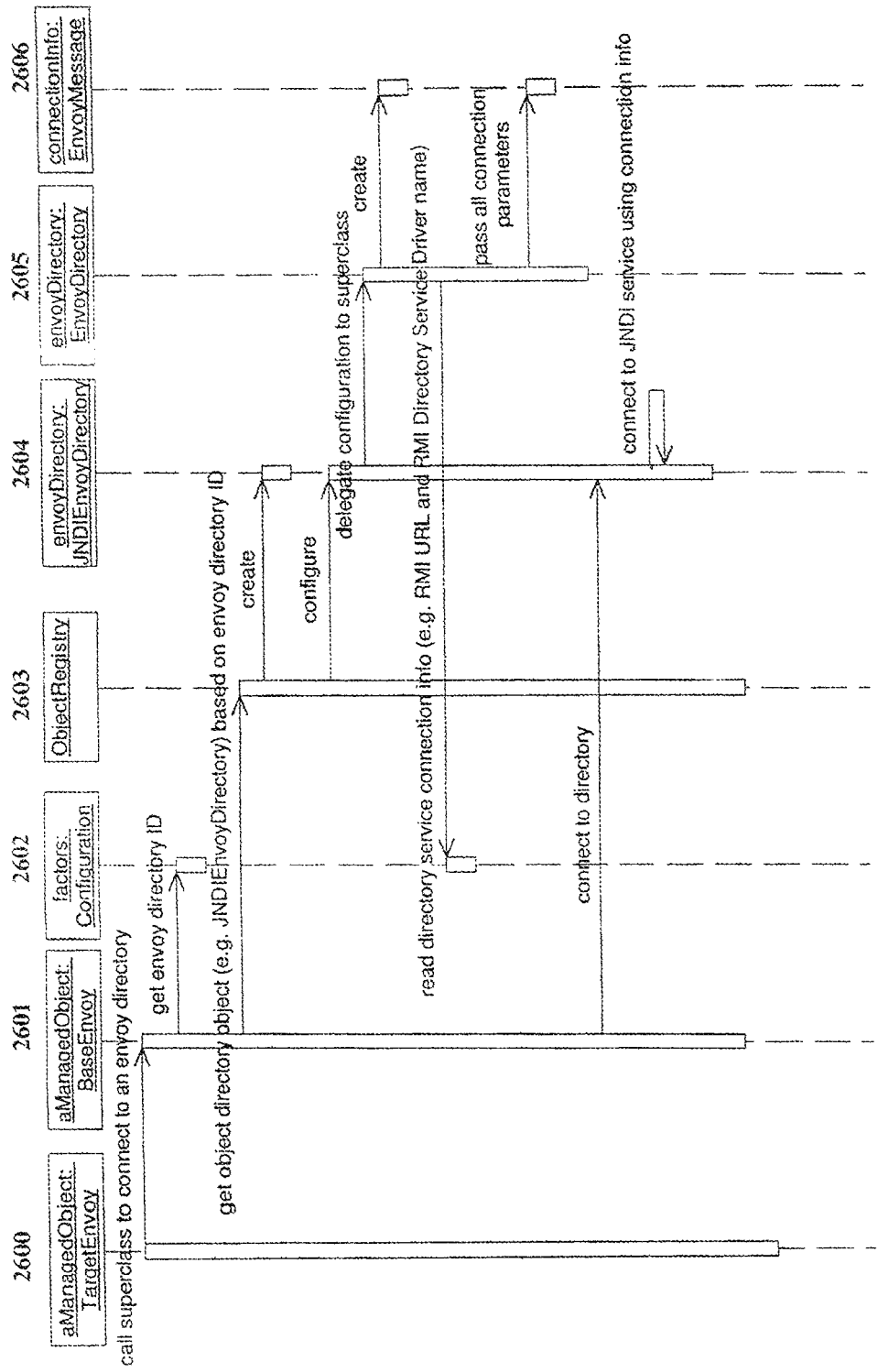

FIG. 48 illustrates a connection to an envoy directory service. In the illustrated example, a JNDI directory service is connected via an underlying mapping to an RMI directory service provider. Alternatively, for example, a UDDI directory service could have been used for a Web service envoy medium. In the figure, a TargetEnvoy managed object 2600 calls the superclass ("BaseEnvoy") 2601 to connect to an envoy directory. The superclass then obtains an envoy directory ID from the Configuration 2602 and utilizes it to obtain a directory object (e.g., JNDIEnvoyDi-rectory) 2604 from the ObjectRegistry 2603 and then create and configure the object. The JNDIEnvoyDirectory 2604 in this case delegates configuration to the superclass envoy directory 2605, which creates an EnvoyMessage 2606, reads the directory service connection info (e.g., RMI URL and RMI Directory Service Driver name) from the configuration 2602, and passes all connection parameters to the created EnvoyMessage 2606. In this example, the BaseEnvoy 2601 connects to the JNDIEnvoyDirectory 2604, which connects to JNDI service using the connection information. The original Target Envoy 2600 obtains the envoy medium bind name ID and utilizes it to register the envoy medium delegate with the directory.

Figure 49:
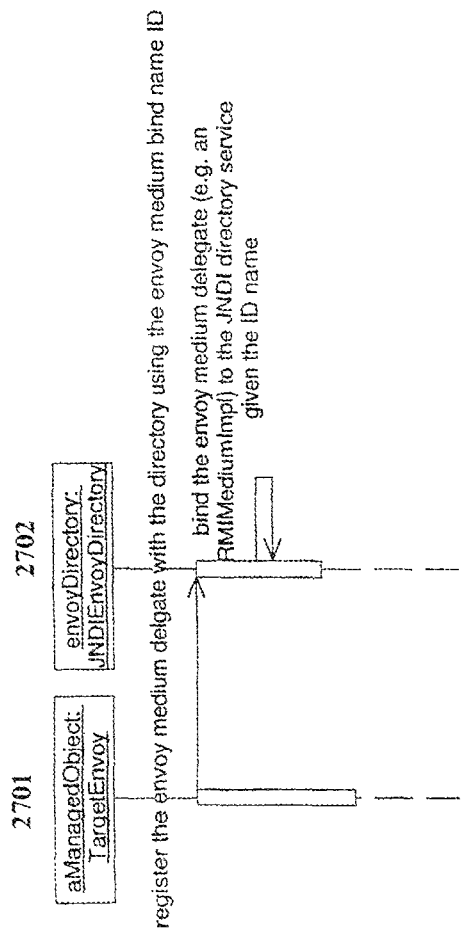

FIG. 49 illustrates a JNDI directory service binding a server object to a name for lookup by remote clients. A TargetEnvoy managed object 2701 registers the envoy medium delegate with the envoy directory (i.e., JNDIEnvoyDirectory) 2702 using the envoy medium bind name ID. The envoy directory binds the envoy medium delegate (e.g., an RMIMediumImpl) to the JNDI directory service given the ID name.

Figure 50:
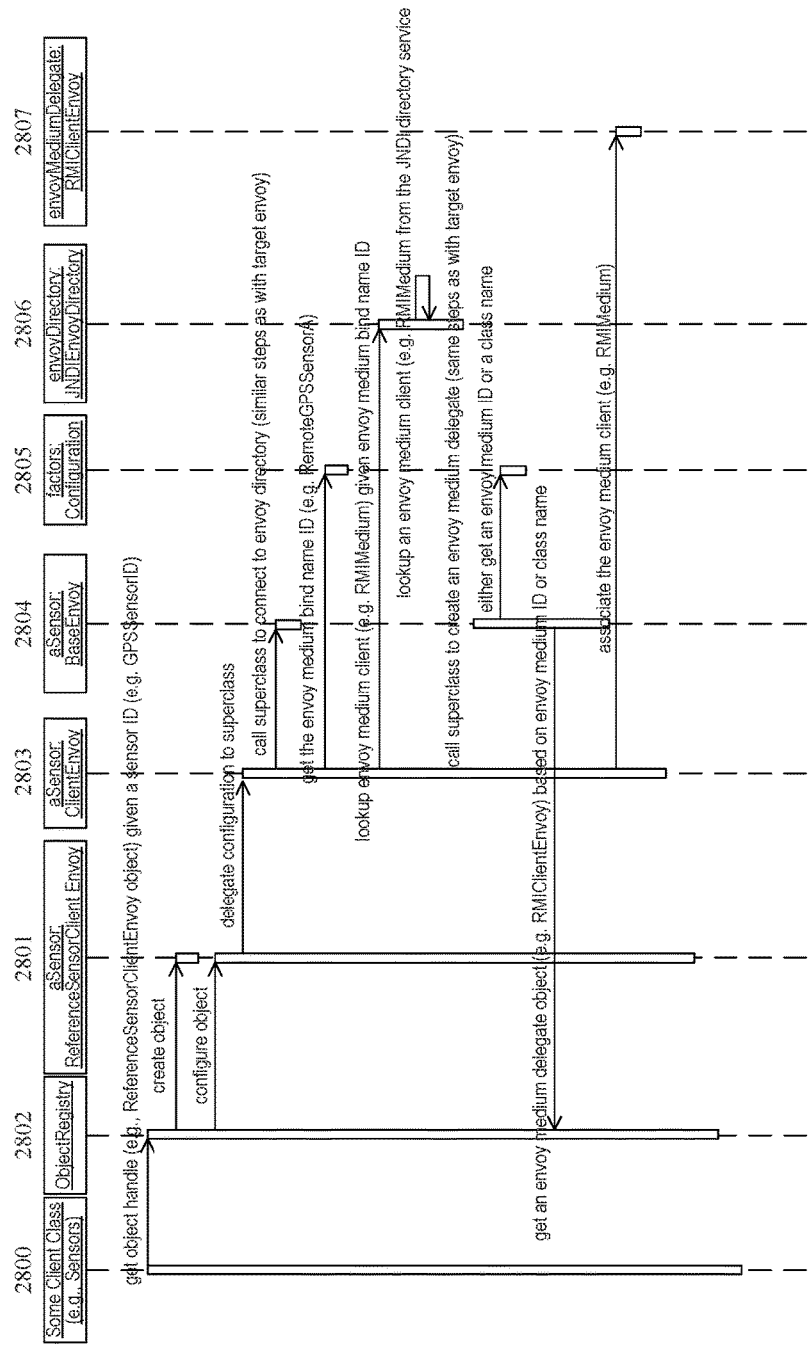

FIG. 50 illustrates how an envoy client is created, configured, and utilized to obtain a handle to an underlying envoy medium client. The figure illustrates how a distributed client creates a handle to a reference sensor (e.g., a GPS Sensor). The client code does not need to know if it is communicating with a local (in-memory) or a distributed GPS sensor. Although an RMI medium is presented in the figure, the client could also have been configured to communicate with a GPS sensor via Web services, CORBA, TCP/IP, etc. A client class, in this example Sensors 2800, obtains an object handle (e.g., ReferenceSensorClientEnvoy) 2801 from the ObjectRegistry 2802 given a Sensor ID (e.g., GPSSensorID). The ObjectRegistry 2802 creates and configures the ReferenceSensorClientEnvoy object 2801, which delegates the configuration to the superclass, ClientEnvoy 2803. This sensor ClientEnvoy 2803 calls the superclass ("BaseEnvoy") 2804 to connect to the envoy directory. The ClientEnvoy 2803 obtains the envoy medium bind ID (e.g., RemoteGPSSensorA) from the Configuration 2805, and given this information, looks up the envoy medium client (e.g., RMIMedium) via the EnvoyDirectory (here, "JNDI EnvoyDirectory") 2806. This EnvoyDirectory 2806 looks up an envoy medium client (e.g., RMIMedium) 2807 from the JNDI directory service 2806. After this is completed, the ClientEnvoy 2803 calls the superclass to create an envoy medium delegate 2807. The Base Envoy 2804 obtains either an envoy medium ID or a class name from the configuration 2805 and obtains an envoy medium delegate object (e.g., RMIClientEnvoy) 2807 from the ObjectRegistry 2802 based on the envoy medium ID or class name. Finally. the ClientEnvoy 2803 associates the envoy medium client (e.g., RMIMedium) via the envoy medium delegate 2807.

Figure 51:
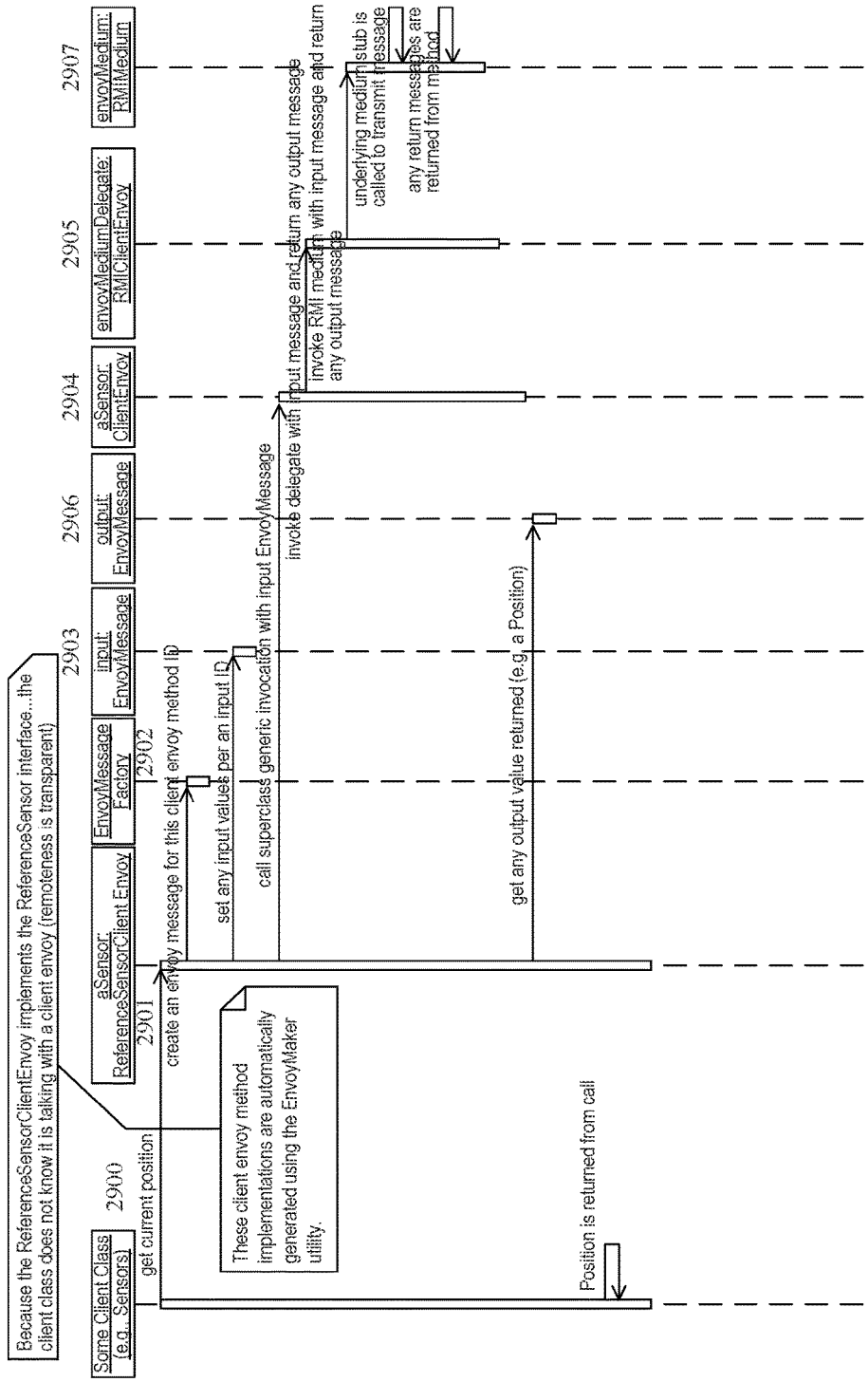

FIG. 51 illustrates the procedure of the envoy client when a client envoy is invoked. Zero or more input parameters may be sent by the client envoy and zero or more output messages may be received and returned by the client envoy. A client class, in the figure a Sensors abstraction 2900, obtains its current position from a ReferenceSensor-ClientEnvoy 2901. Because the ReferenceSensorClientEn-voy 2901 implements the ReferenceSensor interface, the client class is unaware that it is communicating with a client envoy, i.e., the remoteness is transparent. The client envoy method implementations are automatically generated using an automated software utility (e.g., EnvoyMaker). In the figure, the ReferenceSensorClientEnvoy 2901 creates an envoy message 2902 for the client envoy method ID. Any input values of an EnvoyMessage are set via an input ID 2903. Generic invocations of the superclass (ClientEnvoy) 2904 are called with this input EnvoyMessage 2903. The superclass, here a sensor ClientEnvoy 2904, invokes an envoy medium delegate (e.g., RMIClientEnvoy) 2905 with an input message and returns any output message 2906. This envoy medium delegate invokes an envoy medium (e.g., RMIMedium) 2907 with the input message and returns any output message 2906. The underlying message stub is called to transmit the message. Any return message is returned. Upon the completion of these tasks, the ReferenceSensor-ClientEnvoy 2901 obtains any output values returned via the output Envoy message (e.g., position) 2906. This information is returned to the initial client class 2900.

Figure 52:
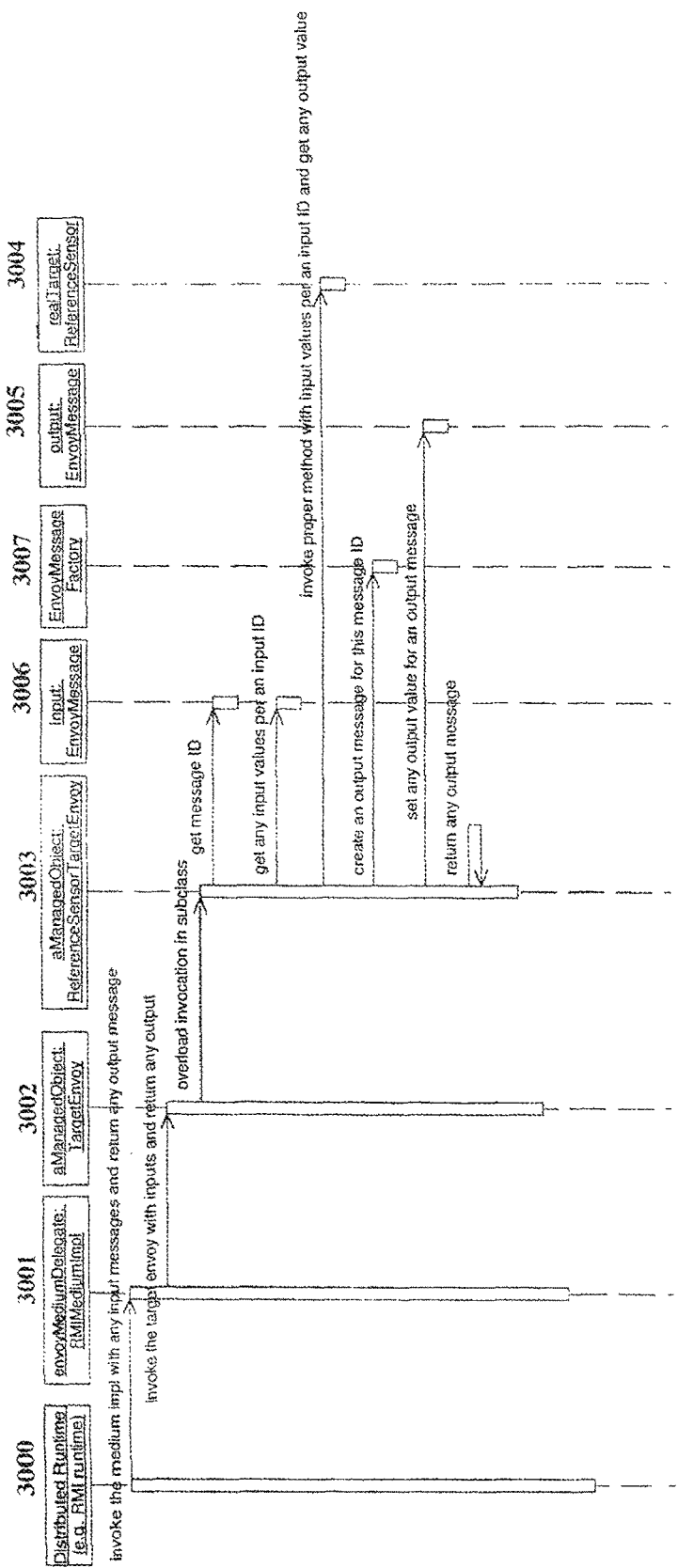

FIG. 52 illustrates the procedure of the envoy target side when a target envoy is invoked. Zero or more input parameters may be received by the target envoy and zero or more output messages may be returned and sent by the target envoy. In the figure, a distributed runtime (e.g., RMI runtime) 3000 invokes an EnvoyMediumDelegate (in this case, RMIMediumImpl) 3001 with any input messages and returns any output messages. The EnvoyMediumDelegate 3001 invokes a target envoy managed object 3002 with inputs and any outputs are returned. The target envoy methods are overloaded by a subclass, in this example a ReferenceSensorTargetEnvoy 3003, a managed object. This managed object gets a message ID and any input values. A target 3004, for example a ReferenceSensor, is invoked via a proper method with input values 3006 and any output values are obtained 3007. The ReferenceSensorTargetEnvoy 3003 creates an output message for this message ID and sets any output values for an output EnvoyMessage 3005. Any output messages are returned to the ReferenceSensorTargetEnvoy 3003.

FIG. 201 illustrates decision making logic that can be used inside of the SystemGeneric abstraction for determining what to do when triggered to handle its activity. If the SystemGeneric object is configured or has been triggered to be ignored, it will enter an ignored state. As an example, if the SystemGeneric object represents an AGV maneuver such as a ParallelParking maneuver, the Parking maneuver may be triggered to be ignored if the vehicle is traveling on a highway. If not ignored, and the SystemGeneric object has not been configured or has not been triggered to be active, it will enter an inactive state. As an example, if the SystemGeneric object represents an AGV maneuver such as a Stopping maneuver, and the vehicle is traveling and operating at highway speeds and there is no reason to stop, the Stopping maneuver is considered inactive. If however the SystemGeneric object is configured or has been triggered to be active, then the SystemGeneric object may enter the active state if it is not paused. As an example, if the SystemGeneric object represents an AGV maneuver such as a Stopping maneuver, and the vehicle was configured or triggered by a map feature or detection of a stop sign to stop, it may begin execution of its Stopping maneuver. The Stopping maneuver may engage in a sequence of maneuver actions and steps to realize a stop. Along the way, it may evaluate parameterized conditions to determine what it should do in the sequence of events in stopping. If a SystemGeneric object is active, but has been configured or triggered to be paused, its activity enters the paused state. As an example, if the SystemGeneric object represents an AGV maneuver such as a UTurn maneuver, but another process detects an obstacle in front of the vehicle, its UTurn maneuver may be paused until the obstacle clears.

Figure 64:
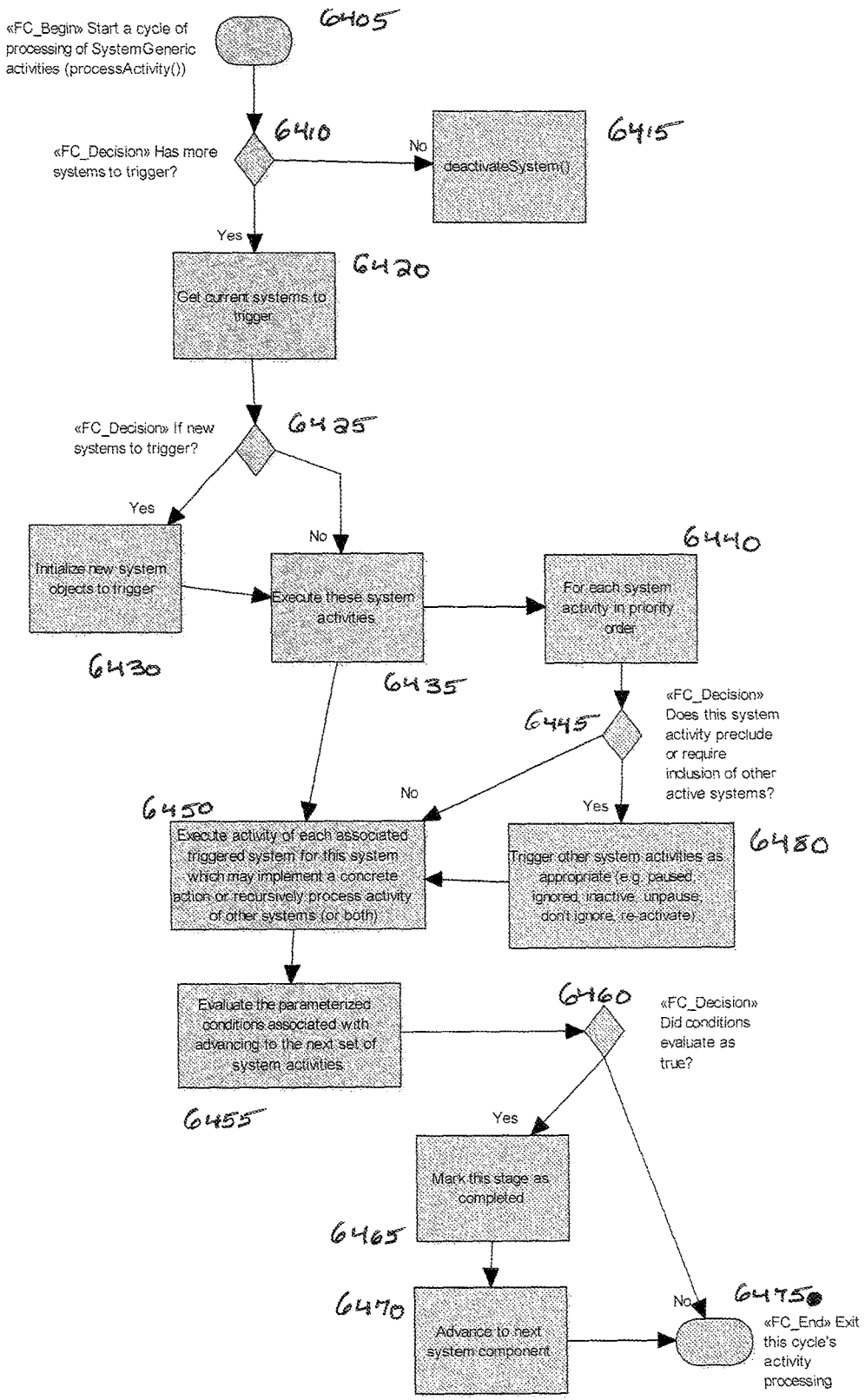
FIG. 64 is a diagram illustrating various processing once a SystemGeneric object is active, according to some embodiments.

FIG. 64 illustrates the SystemGeneric abstraction's processing of activities behavior once a SystemGeneric object is active. When an invocation for processing of an activity is triggered, the system object first assesses whether or not it has any other associated systems to trigger. If not, this system activity is deactivated. If there are other systems to trigger, then the SystemGeneric object obtains a handle to a collection of one or more other System objects to trigger. Note also that each of these other System objects can be further subclassed as singular or collections of other System objects.

Figure 63:
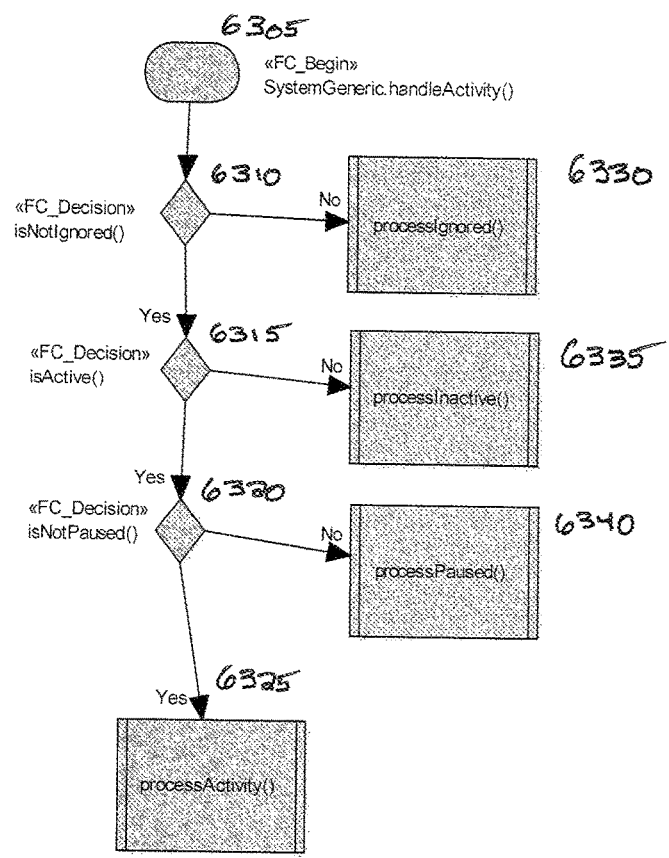
FIG. 63 is a diagram illustrating decision making logic that can be associated with a SystemGeneric abstraction, according to some embodiments.

If the System objects to trigger are new to this current activity, an initialization method is invoked on each System object. Subsequently or otherwise, the System object is triggered to be executed and processing of activity. Note that each System object's processing of activity may itself go through the determination of which state it is in as illustrated in FIG. 63. Furthermore, note that each System object may itself trigger the processing of activities of other System objects with which it is associated. This nesting and hierarchy of System object triggering allows for a rich network of System objects to trigger. Note also, that at any nested level of processing, a particular SystemGeneric object's concrete sub-class or an implementation of the System interface, may forgo further subprocessing of other System objects, and override the processing of activities with concrete application-specific logic. For example, a concrete sub-class of SystemGeneric, or class that implements the System interface, may override the processActivity( ) method and implement the simple unitary action of setting the speed of a speed controls system.

When a SystemGeneric object is executing its system activities, it can optionally and configurably arbitrate over which of its associated System objects should be executed and in what priority order. It asks each System object, in priority order, if it should preclude, include, or re-include other systems. Those System objects are marked appropriately such that when it comes their time to handle their activity, they respond appropriately (e.g. pause or not, ignore or not, inactive or active).

Each activity of the associated System objects is then handled. Whether or not they're ignored, paused, or active is a function of their triggered state. Each System may be configured to execute concrete actions, further recursively invoke other Systems for handling of activity, or both.

Figure 65:
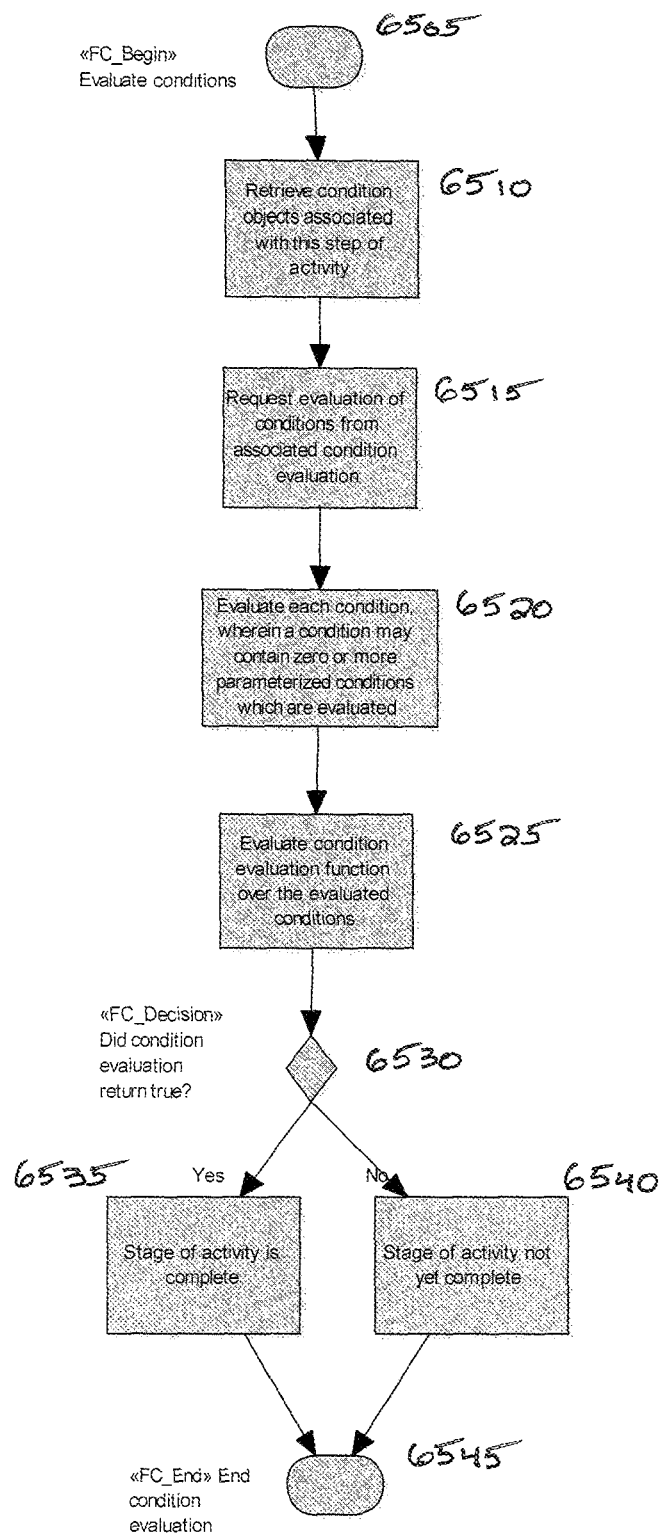
FIG. 65 is a diagram illustrating a condition evaluation process, according to some embodiments.

Each System object is thus triggered for activity itself. Whether or not the state of that System activity should be exited is evaluated based on Condition objects associated with this stage of activity of the current SystemGeneric object. FIG. 65 outlines the condition evaluation process and is further described here:

The Condition objects associated with this current stage of activity are retrieved.

Each Condition is evaluated as true or false.

A ConditionEvaluation is performed over the Condition objects which returns a final true or false based on an evaluation of the individual Condition objects.

For example, if this ConditionEvaluation is a Boolean AND, then all Condition objects must return true for the ConditionEvaluation to return true.

If the ConditionEvaluation returns true, the current stage of activity is considered complete.

Note that each Condition can be a parameterized condition. A concrete implementation of a Condition may, as an example, look at the current speed of a vehicle, and if it is above a certain threshold, return true. If the parameterized and evaluated conditions evaluate as true, then the current stage of execution is complete and the next System object(s) in the list of system activities to trigger is readied for execution. Thus ends one cycle of activity until the System-Generic parent object is again scheduled for processing of an activity cycle.

Figure 66:
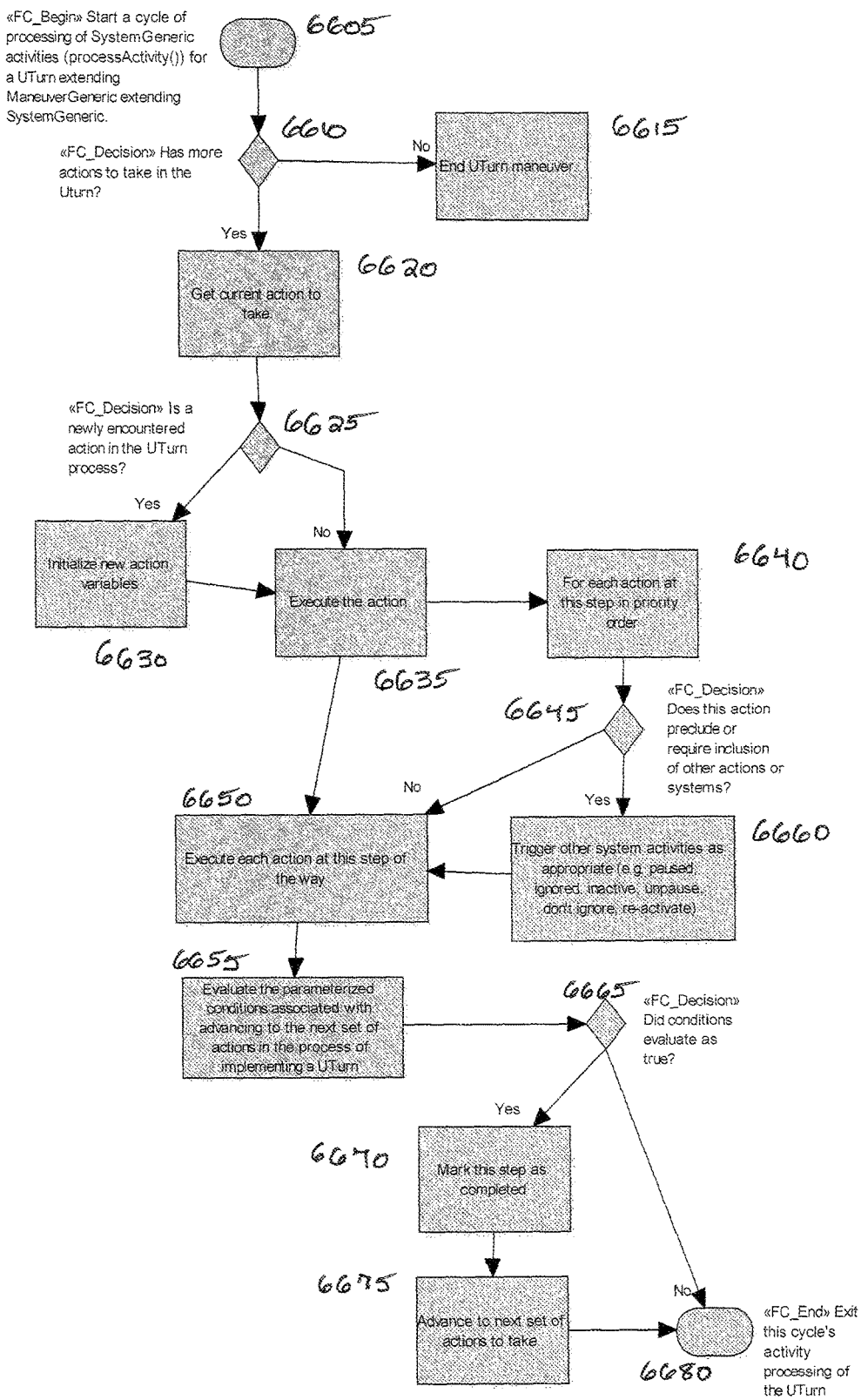
FIG. 66 is a diagram illustrating various processing that may be used to execute a u-turn maneuver, according to some embodiments.

To illustrate the power of extending GPROS' System service for guiding the movement of a robot, UGV, and AGV, an explanation of utilization of these services is described here. As an illustration, consider FIG. 66 which casts the more general flow of System service activity processing in terms of how a three-point U-turn maneuver may be realized. FIG. 66 illustrates the UTurn maneuver processing of activities behavior once a UTurn maneuver is active. When an invocation for processing of an activity is triggered, the UTurn maneuver first assesses whether or not it has any other UTurn maneuver actions to trigger. If not, this system activity is deactivated. If there are other maneuver actions to trigger, then the UTurn maneuver obtains a handle to a movement action to trigger.

If the UTurn movement action to trigger is new to this current activity, an initialization method is invoked the action object. Subsequently or otherwise, the movement action object is triggered to be executed. Each movement action object is thus triggered for activity itself. Whether or not the state of that movement action activity should be exited and an advancement to the next action warranted is evaluated based on parameterized conditions associated with this movement action. If the conditions indicate that the current movement action is completed, then the next movement action is teed up for execution at the start of the next cycle.

To further illustrate the power of extending GPROS' System service for guiding the movement of a robot, UGV, and AGV, consider that one or more parameterized conditions are evaluated by a movement plan to determine which maneuvers should be executed. For example, with an AGV in mind, consider detection of whether or not a three-point U-turn maneuver should be triggered or if a collision avoidance maneuver must be executed. If there are one or more maneuvers active or activated, arbitration, based on configurable priority, is used to determine which of the maneuvers may actually remain active, and which must be paused or stopped in favor of a higher priority maneuver. For example, if a three-point U-turn maneuver is being executed, and a collision avoidance maneuver is triggered due to the presence of an obstacle in front of the vehicle, then the U-turn will be paused and the collision avoidance maneuver will engage and become active, superseding the U-turn maneuver.

Figure 67:
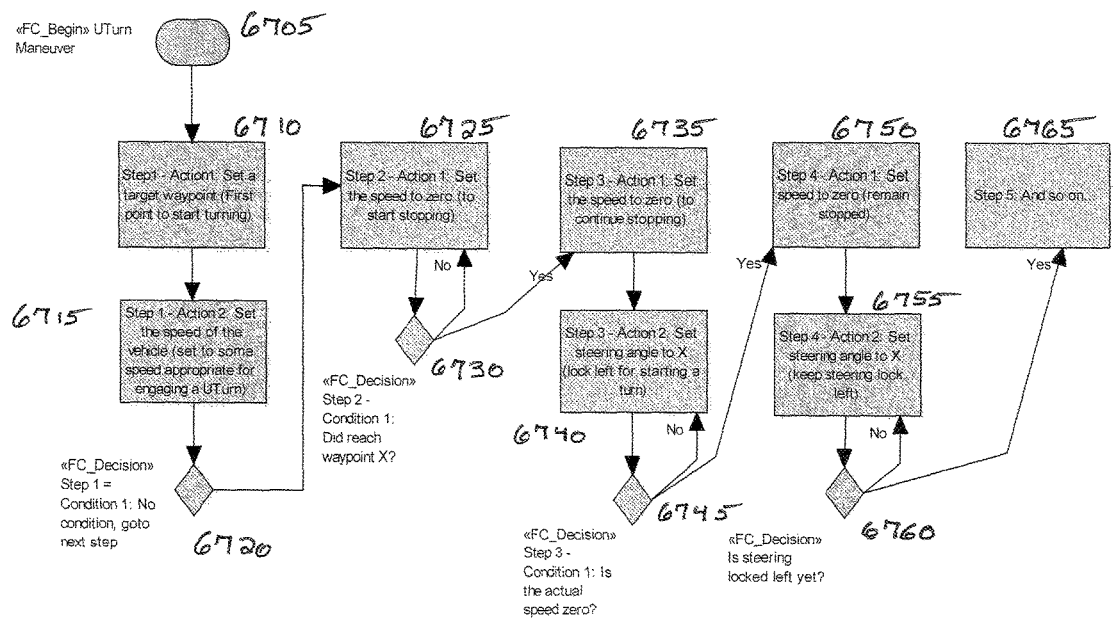
FIG. 67 is a diagram illustrating a sequence of events that may take place during a u-turn maneuver, according to some embodiments.

During the course of a maneuver, one or more parameterized conditions are evaluated to determine whether or not one or more movement actions (or steps of the maneuver) are executed. For example, as illustrated in FIG. 67, during the course of a three-point U-turn, the sequence of events may be configured to start out as follows once the robotic vehicle is already engaging in a U-turn:

Step 1:
a. Action: setTargetWaypoint(X).//Set first target turn point
b. Action: setSpeed(X).//Set to some configurable slow down speed
Step 2:
a. Action: setSpeed(0).//Now start stopping
b. Condition: reachedWaypoint(X)?→Step 3 Actions
Step 3:
a. Action: setSpeed(0).//Continue stopping
b. Action: setSteering(X).//Now start steering to X, such as lock left for a turn
c. Condition: isActualSpeed(0)?→Step 4 Actions
Step 4:
a. Action: setSpeed(0).//Remain stopped
b. Action: setSteering(X).//Keep steering to X
c. Condition: isSteering(X)?→Step 5 Actions
Step 5: And so on . . . .

Here it can be seen that one or more conditions can be evaluated to dictate whether or not one or more actions in a maneuver are executed. Furthermore, evaluation functions over one or more conditions may be configured. For example, the Boolean AND or Boolean OR of such conditions can be evaluated to assess whether or not the associated set of actions should be triggered. Condition evaluation functions are expressible in a configurable format to evaluate conditions. A concrete implementation of a conditional evaluation function is regular expressions. But the user may also define other evaluation functions in concrete subclasses of the conditional evaluation abstraction.

Furthermore, because of the higher-level arbitration function, arbitration over which actions within a maneuver can occur.

Figure 68:
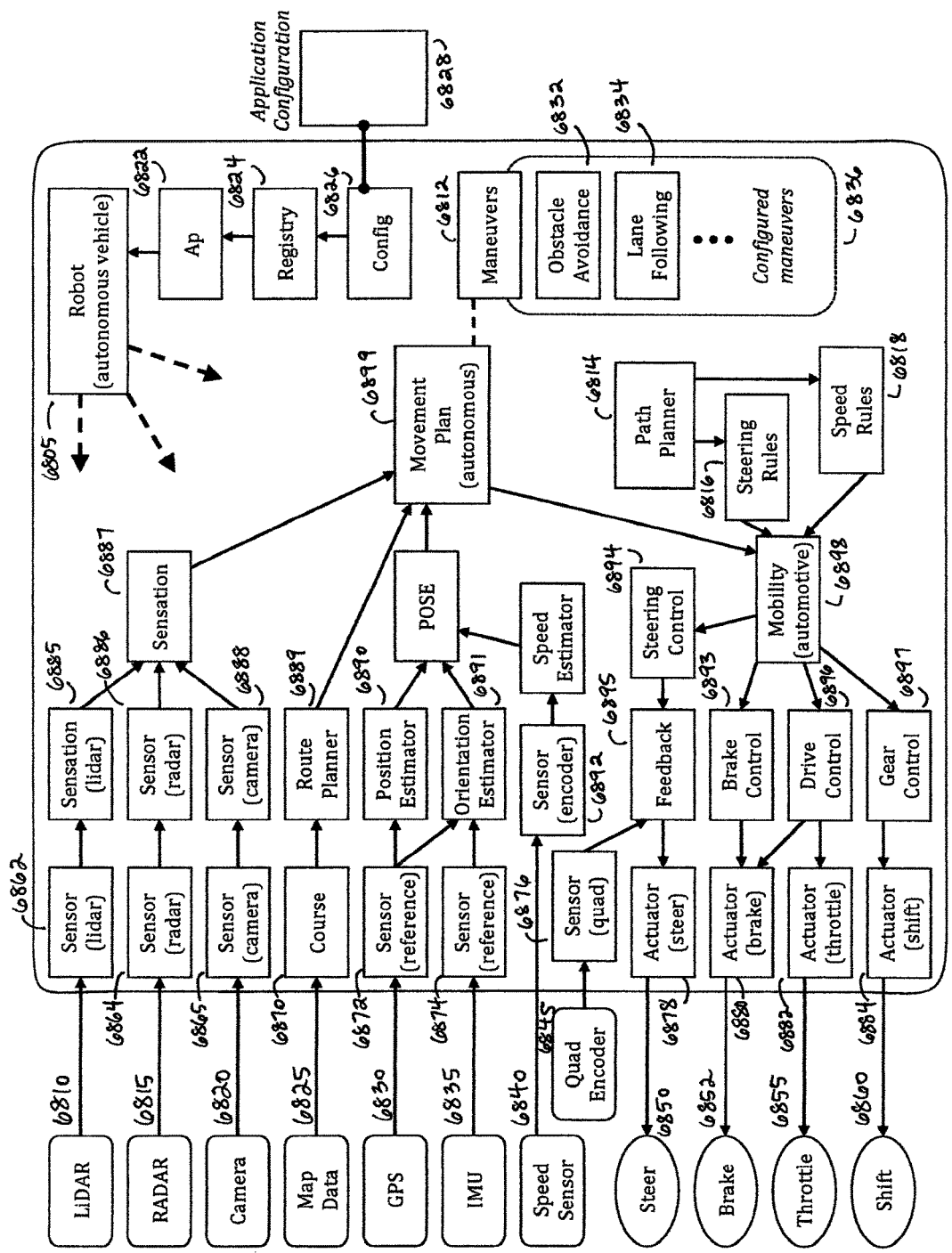
FIG. 68 is a diagram illustrating a configuration of GPROS services that can be used for various autonomous vehicle applications, according to some embodiments.

Speaking now in more cohesive terms to show how GPROS can be used to realize autonomous navigation with a self-driving vehicle, FIG. 68 illustrates a configuration of GPROS services, as configured via the Config service, for an autonomous vehicle application.

Speaking now in terms of how GPROS can be illustratively used to realize autonomous navigation with a self-driving vehicle, FIG. 68 illustrates a configuration and object instantiation of GPROS services for an autonomous vehicle application. Key GPROS services participating in this realization are shown as rectangular boxes. The flow of information between these services are depicted by arrows from the source to the destination service. The structural and operational aspects of these services already described, FIG. 68 ties some of these services together to illustrate the ability of GPROS to realize a fully autonomous robotics application such as a driverless car.

The Ap services drives loading of configuration data via the Config service. A root robot object, provided by the Robot service, is constructed. Object instantiation and registration occurs via the Registry service. Core components related to the robot, including sensors, actuators, and planning objects, are automatically created as configured by the Config service, instantiated via the Registry service, and coordinated by the Robot service. The Ap service associates these objects with threads as defined in configuration files. The Robot, here configured as an autonomous vehicle, coordinates the instantiation of all sensors, actuators, and plan objects (illustrated as dashed arrows in the diagram).

The actuators created are actuator objects from the Actuator service. Concrete actuators in this example include a steering servo for Ackermann steering, a brake servo for applying/releasing the brake, a throttle servo for increasing/decreasing throttle, and a linear actuator for moving the shifter in the car. Here, for simplicity, the brake, steering, and throttle actuators are assumed to be smart motors which have built in closed loop feedback control. However, as we'll see with steering, the loop can be closed on an actuator using GPROS services.

The sensors created are sensor objects from the Sensor service. Concrete sensors in this example include a LiDAR for obstacle detection with abstractions from the lidar service, RADAR for long range obstacle detection with abstractions from the radar service, Camera for lane detection and obstacle detection with abstractions from the camera service, GPS sensor for position with abstractions from the reference service, and IMU sensor for inference of heading with abstractions from the reference service. All such sub-services of the Sensor service provide more concrete abstractions for dealing with these more sophisticated sensors. However, additional sensors such as a Speed Sensor for vehicle speed, and a Quadrature Encoder for inferring the position of the steering angle can simply leverage the built in configurability and genericity of the Sensor service. As these sensors provide simple text or binary based data streams, their specific interface (e.g. Ethernet or Serial) can be achieved from the Comm service, parsing of data via the Signals service, and tying this information together to higher level data (i.e. speed and angle) via the Peripheral and Sensor services.

Alternately, for more concrete services, the EncoderSensor for the speed sensor and QuadEncoderSensor for the steering angle position can be used as abstractions used from the Feedback service. The Feedback service provides additional abstractions for closing the loop inside a GPROS process for closed loop feedback control, in the example here, of steering. Thus a QuadEncoderSensor and Actuator or combined and tied together with abstractions from the Feedback service to provide closed loop PID-based position controls of steering.

The remaining objects, outside of sensor and actuator objects, are plan objects instantiated vis-à-vis the Registry service, as configured by the Config service, as associated via the Robot service, and as coordinated by the Ap service. These plan objects embody the services of the Plan service which extends from and inherits the behaviors from the System service. These plan objects, as we'll see, are more concrete realizations of Plan service behaviors embodied by other GPROS services that have been described in the structural and operational aspects of some embodiments.

One such plan object is the object needed for encapsulation of the mobility platform as provided by the Mobility service. An AutomotiveMobilitPlatformGeneric abstraction is used in this example which drives the speed of the vehicle via a DriveControl abstraction controlling the brake and throttle, brakes the vehicle via BrakeControl abstraction with the brake, steers the vehicle via SteerControl abstraction with the steering system, and shifts the car into forward, reverse, neutral, or park via the GearControl abstraction.

Another set of plan object are the objects from the POSE service. The POSE service fuses data from PositionEstimator, OrientationEstimator, and SpeedEstimator services, which in turn respectively fuse data from position (GPS), orientation (GPS & IMU), and speed sensors. POSE then collects and offers this information of position, orientation, and speed for other plan objects within the GPROS-enabled application.

Another set of plan objects are objects from the Sensation service which handle mapping of sensor data into physical objects with abstractions from the PhysicalObject service. Concrete mapping of LiDAR data into PhysicalObject representations can occur in Sensation sub-classes while leveraging some of the common re-useable services of Sensation and the common representation formats of PhysicalObject services. In this example, LiDAR data representing obstacles around the vehicle, RADAR data representing obstacles around the vehicle, and Camera data representing lanes of travel are turned into physical objects. These physical objects represent features of the robot's environment. Different perspectives of these sensors are resolved using the ObjectSensationPerspective abstraction services from the Sensation service. Finally, with a collection of PhysicalObject objects identified, the Sensation service has provided key features to be used in self-navigation. An ObjectSensation abstraction fuses together the various PhysicalObject objects identified.

The plan objects from the Course service load and encapsulate the route network (i.e. map data) for the robot car. A mission dictates the route the car should take along the map via the RoutePlanner service.

With a route from the RoutePlanner as well as position, orientation, and speed from POSE, the MovementPlan service is able to leverage this information with parameterized conditions evaluated to dictate which maneuver(s) should be active for self-navigation. For example, if the vehicle is localized to a highway road with a speed limit of 55 mph, the movement planner may trigger the LaneFollowing maneuver with a target speed of 55 mph. With information from the Sensation service, lane features produced by a Camera sensor are used by the LaneFollowing maneuver actions to keep the vehicle within lane boundaries by generating target waypoints to hit. Additionally, the target speed of 55 mph is generated. These target waypoints along with target speed is sent to the PathPlanner service for smooth path projecting along the target waypoints. Further refinement of maximums steering angles based on speed, and most restrictive speed assessments are formulated by the SteeringRules and SpeedRules services respectively. Finally, as obstacles are detected as PhysicalObjects from the Sensation services which generated such objects from LiDAR and RADAR sensor data, these obstacles are used to trigger additional maneuvers as parameterized conditions do inside of the MovementPlan service. Obstacles may thus, for example, trigger ObstacleAvoidance maneuvers which take priority over LaneFollowing maneuvers.

As can be seen, by configuring the various application services of GPROS, a fully autonomous or automated vehicle, otherwise referred to as a driverless car or self-driving car, can be realized. Thus the individual services of GPROS, whose structural and operational aspects are described in this present disclosure, combine to yield a fully autonomous vehicle in this example. The ability to combine these services to yield mobile autonomous robots and robots of other ilk are also possible.

Speaking in general terms based on the above description, certain embodiments discussed thus far illustrated how the GPROS can be realized and used to implement a robotics application. That is, for example, an unmanned ground vehicle (UGV) application can use a standard GPROS profile on a main processor platform, running Linux, and using a Java Platform, Standard Edition to specify the configuration of sensors for GPS. inertial navigation and orientation, multiple laser range finders, RADAR; configuration of actuators with command based PWM configurations for brake, steering, shifting, and throttle actuation; conduct planning for synchronous way-point navigation and asynchronous obstacle avoidance. A micro GPROS profile can also be used in multiple microprocessors running a Java Platform, Micro Edition to specify the configuration of sensors for receiving actuation commands, motor feedback, and vehicle state sensors; configuration of actuators with hardware based PWM configurations directly driving brake, steering, shifting, and throttle motors; and conduct planning for asynchronous motor command handling and real time synchronous feedback control of motors.

The same GPROS profiles may be used for Unmanned Air Vehicle (UAV) helicopter, drone, and/or other platforms by defining a configuration largely similar to the UGV application, but instead loads a configuration with longer range laser range sensors, uses actuators for controlling helicopter rotors and blades. and implements conduct planning for UAV navigation and low-level feedback controls.

Similarly. for an automation application requiring only distributed sensing and no actuation, the GPROS may be configured to load only sensors that have distributed envoys, each with their own underlying communications standard, and to load conduct analysis behavior which takes the distributed sensor information, analyzes it, and presents it in a unified fashion via a graphical user interface.

Likewise. for applications that are not robotics or automation related, the generic application services can be used. For example, in a business-to-business (B2B) application, a means using GPROS for reading information from a mobile phone interface peripheral may be configured, a conduct planning behavior for rendering a user interface may be configured, and a client envoy to a distributed Web service may be configured. GPROS on the server side may also be used and configured with a target envoy to receive invocations from client envoys, a conduct planning behavior triggered by pooled asynchronous application threads may be configured to handle such requests. and the any service used to transparently record requests to a database.

Thus, one embodiment is a method for building vertical robotics application framework (VRAF) instances which extend the GPROS for specific vertical robotics applications. One embodiment is to provide a general purpose robotics hardware interface (GPRHI) for connecting robotics hardware to standard computing platforms. A feature of the technology that includes vertical robotics applications is mine analysis and detection. Robot mobilization and mine detection are two important examples of the actuation and sensing functionality that form the core part of a mobile autonomous robotics platform applied to mine analysis and detection. An example application of some embodiments is an autonomous unmanned ground vehicle (UGV) application for traversing a long distance within a route corridor while avoiding obstacles. Similarly, the same common GPROS robotics software services may also be leveraged by an autonomous unmanned air vehicle (UAV) application.

It should thus be evident that an embodiment provides an operating system that provides individual services and the combination and interconnections of such services using built-in service extensions, built-in completely configurable generic services, and a way to plug in additional service extensions to yield a comprehensive and cohesive framework for developing, configuring, assembling, constructing. deploying, and managing robotics and/or automation applications. An embodiment provides services that are common to any robotics or automation application, and encapsulates them separately, while providing them as a complete package to enable programmers to write programs in any language for any device or peripheral and plug those programs into the system to achieve a goal. One advantage provided by an embodiment is that it provides a software engine for programmers, allowing them to focus on minimal business logic specifications and letting the software of an embodiment integrate each programmer's product into a functional end-product. In one configuration, the software and system of an embodiment includes one or both of a general robot service and an automation service, which extend and use the general application services to provide powerful and useful software and software/hard-ware solutions. The ability of an embodiment to use object-oriented schemes to allow peripheral services to link external peripherals and applications advances the art of robotics and automation. It also allows for cohesive and comprehensive integration of different and disparate third party, proprietary, open source, and other modules (software and hardware, such as third-party rules engines, third-party neural networks, different interface protocols, different distributed communication protocols, different sensor types, different actuator types, different styles of motor control, different robotics application logic. different configuration data sources, different logging mechanisms, and the like), to enable extensibility and other advantages.

In addition, because the peripheral service provides a way for applications to communicate with external peripherals in an object-oriented way, it permits decoupling of the communication from the underlying physical communication interface, and complete configurability.

Figure 69:
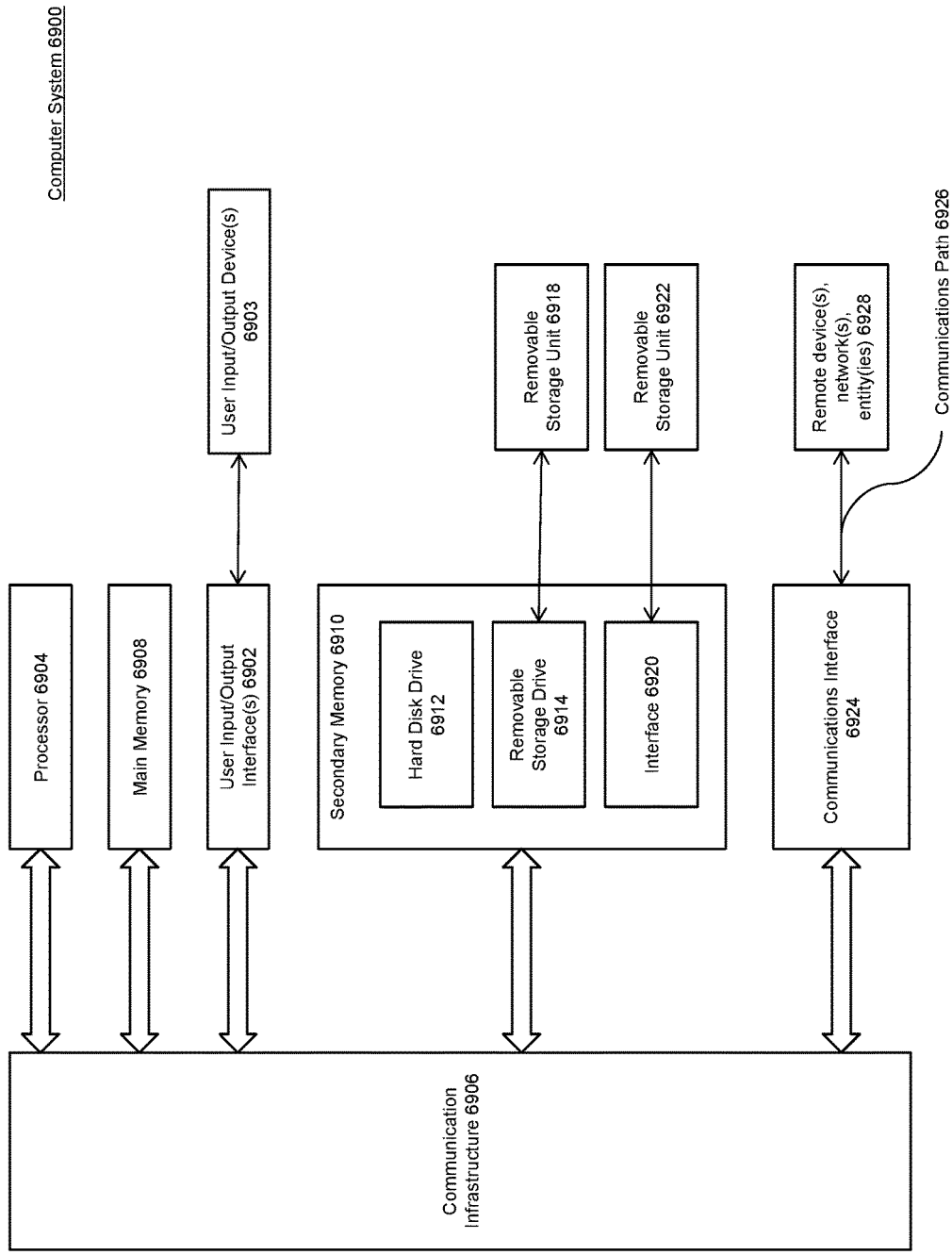
FIG. 69 is an example computer system useful for implementing various embodiments.

Various embodiments may be implemented, for example, using one or more well-known computer systems, such as computer system 6900 shown in FIG. 69. One or more computer systems 6900 may be used, for example, to implement any of the embodiments discussed herein, as well as combinations and sub-combinations thereof.

Computer system 6900 may include one or more processors (also called central processing units, or CPUs), such as a processor 6904. Processor 6904 may be connected to a communication infrastructure or bus 6906.

Computer system 6900 may also include user input/output device(s) 6903, such as monitors, keyboards, pointing devices, etc., which may communicate with communication infrastructure 6906 through user input/output interface(s) 6902.

One or more of processors 6904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 6900 may also include a main or primary memory 6908, such as random access memory (RAM). Main memory 6908 may include one or more levels of cache. Main memory 6908 may have stored therein control logic (i.e., computer software) and/or data.

Computer system 6900 may also include one or more secondary storage devices or memory 6910. Secondary memory 6910 may include, for example, a hard disk drive 6912 and/or a removable storage device or drive 6914. Removable storage drive 6914 may be a floppy disk drive, a magnetic tape drive, a compact disk drive, an optical storage device, tape backup device, and/or any other storage device/drive.

Removable storage drive 6914 may interact with a removable storage unit 6918. Removable storage unit 6918 may include a computer usable or readable storage device having stored thereon computer software (control logic) and/or data. Removable storage unit 6918 may be a floppy disk, magnetic tape, compact disk, DVD, optical storage disk, and/any other computer data storage device. Removable storage drive 6914 may read from and/or write to removable storage unit 6918.

Secondary memory 6910 may include other means, devices, components, instrumentalities or other approaches for allowing computer programs and/or other instructions and/or data to be accessed by computer system 6900. Such means, devices, components, instrumentalities or other approaches may include, for example, a removable storage unit 6922 and an interface 6920. Examples of the removable storage unit 6922 and the interface 6920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 6900 may further include a communication or network interface 6924. Communication interface 6924 may enable computer system 6900 to communicate and interact with any combination of external devices, external networks, external entities, etc. (individually and collectively referenced by reference number 6928). For example, communication interface 6924 may allow computer system 6900 to communicate with external or remote devices 6928 over communications path 6926, which may be wired and/or wireless (or a combination thereof), and which may include any combination of LANs, WANs, the Internet, etc. Control logic and/or data may be transmitted to and from computer system 6900 via communication path 6926.

Computer system 6900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 6900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 6900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 6900, main memory 6908, secondary memory 6910, and removable storage units 6918 and 6922, as well as tangible articles of manufacture embodying any combination of the foregoing. Such control logic, when executed by one or more data processing devices (such as computer system 6900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 69. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method in a general purpose robotics operating system (GPROS) comprising a set of application services, executed using a computing device comprising a processor, the method, comprising:
 managing synchronous, asynchronous, and real time application threads using at least one of the application services; and
 managing at least one of a watchdog service, a watchdog checking service, a watchdog signature service, a watchdog reaction service, a watchdog specification service, a publish-subscribe comm service, a publish-subscribe envoy service, a traffic sign handling service, a platooning service, a sudden obstacle avoidance service, a curb avoidance service, a speed bump handling service, a floating obstacle avoidance service, a gated obstacle avoidance service, and a negative obstacle avoidance service,
 wherein the set of application services:
  (i) is configurable using a configuration service,
  (ii) is configurable to be adapted both statically and dynamically, and
  (iii) is configurable to access configuration data using a generic abstraction, and
 wherein the application services are independent of an underlying hardware platform and are configurable to perform at least one of communication tasks and operational tasks.

2. A control system, comprising:
 memory; and
 a computer comprising a processor, operating under programmed control, to provide a general purpose robotics operating system (GPROS) comprising a set of application services, executed using a computing device comprising a processor, wherein the set of application services:
  (i) is configurable using a configuration service,
  (ii) is configurable to be adapted both statically and dynamically, and
  (iii) is configurable to access configuration data using a generic abstraction,
 wherein the application services are independent of an underlying hardware platform and are configurable to perform at least one of communication tasks and operational tasks, and
 wherein the set of application services comprises:
  a service to manage synchronous, asynchronous, and real time application threads, and
  a service to manage at least one of a watchdog service, a watchdog checking service, a watchdog signature service, a watchdog reaction service, a watchdog specification service, a publish-subscribe comm service, a publish-subscribe envoy service, a traffic sign handling service, a platooning service, a sudden obstacle avoidance service, a curb avoidance service, a speed bump handling service, a floating obstacle avoidance service, a gated obstacle avoidance service, and a negative obstacle avoidance service.

3. A non-transitory computer readable medium having instructions stored thereon that, when executed by at least one computing device, causes the at least one computing device to perform operations comprising:
 providing a set of application services, wherein the set of application services:
  (i) is configurable using a configuration service,
  (ii) is configurable to be adapted both statically and dynamically, and
  (iii) is configurable to access configuration data using a generic abstraction;
 using the set of application services to manage synchronous, asynchronous, and real time application threads; and
 using the set of application services to manage at least one of a watchdog service, a watchdog checking service, a watchdog signature service, a watchdog reaction service, a watchdog specification service, a publish-subscribe comm service, a publish-subscribe envoy service, a traffic sign handling service, a platooning service, a sudden obstacle avoidance service, a curb avoidance service, a speed bump handling service, a floating obstacle avoidance service, a gated obstacle avoidance service, and a negative obstacle avoidance service,
 wherein the application services are independent of an underlying hardware platform and are configurable to perform at least one of communication tasks and operational tasks.

4. The method of claim 1, wherein the set of application services comprises a system service which allows one system to execute or trigger one or more other systems, based on at least one of:
 a trigger, and
 one or more parameterized conditions based on condition evaluations.

5. The method of claim 1, wherein the set of application services comprises at least one of: a ground based mobility service, a skid steer platform service, a 4WD platform service, a NWD platform service, an omni-directional platform service, a mecanum platform service, an automotive mobility platform service, an hmm service, an hhmm service, a genetic learning service, a maneuver service, a maneuver action service, a conditions service, a movement plan service, a path planner service, a speed rules service, and a steering rules service.

6. The method of claim 1, wherein the set of application services comprises at least one of: a camera service, a camera mobileye service, a camera pointgrey service, a sensor estimator service, a position estimator service, an orientation estimator service, a speed estimator service, an acceleration estimator service, a physical object service, a world boundary service, a sensation service, a route planning service, a course service, a stopping service, a roaming service, an obstacle avoidance service, a cliff avoidance service, an object following service, a vehicle following service, a lane following service, a line following service, a uturn service, a stop sign handling service, a stop light handling service, an intersection handling service, a merging handling service, a pass on impasse handling service, a re-routing service, a self-park handling service, an open zone handling service, and a rendezvous handling service.

7. The method of claim 1, further comprising managing an autonomous vehicle service controlling an autonomous vehicle.

8. The method of claim 7, wherein the autonomous vehicle comprises at least one of:
 an unmanned ground vehicle (UGV),
 an unmanned sea vehicle,
 an unmanned vehicle,
 an unmanned aerial vehicle (UAV), and
 an unmanned underwater vehicle (UUV).

9. The method of claim 1, wherein the set of application services comprises a configurable fusion service to combine inputs from a plurality of sensors installed in an autonomous vehicle.

10. The control system of claim 2, wherein the set of application services comprises a system service which allows one system to execute or trigger one or more other systems, based on at least one of:
  a trigger, and
  one or more parameterized conditions based on condition evaluations.

11. The control system of claim 2, wherein the set of application services comprises at least one of: a ground based mobility service, a skid steer platform service, a 4WD platform service, a NWD platform service, an omni-directional platform service, a mecanum platform service, an automotive mobility platform service, an hmm service, an hhmm service, a genetic learning service, a maneuver service, a maneuver action service, a conditions service, a movement plan service, a path planner service, a speed rules service, and a steering rules service.

12. The control system of claim 2, wherein the set of application services comprises at least one of: a camera service, a camera mobileye service, a camera pointgrey service, a sensor estimator service, a position estimator service, an orientation estimator service, a speed estimator service, an acceleration estimator service, a physical object service, a world boundary service, a sensation service, a route planning service, a course service, a stopping service, a roaming service, an obstacle avoidance service, a cliff avoidance service, an object following service, a vehicle following service, a lane following service, a line following service, a uturn service, a stop sign handling service, a stop light handling service, an intersection handling service, a merging handling service, a pass on impasse handling service, a re-routing service, a self-park handling service, an open zone handling service, and a rendezvous handling service.

13. The control system of claim 2, wherein the set of application services comprises a service to manage an autonomous vehicle service controlling an autonomous vehicle.

14. The control system of claim 13, wherein the autonomous vehicle comprises at least one of:
  an unmanned ground vehicle (UGV),
  an unmanned sea vehicle,
  an unmanned vehicle,
  an unmanned aerial vehicle (UAV), and
  an unmanned underwater vehicle (UUV).

15. The control system of claim 2, wherein the set of application services comprises a configurable fusion service to combine inputs from a plurality of sensors installed in an autonomous vehicle.

16. The non-transitory computer readable medium of claim 3, wherein the set of application services comprises a system service which allows one system to execute or trigger one or more other systems, based on at least one of:
  a trigger, and
  one or more parameterized conditions based on condition evaluations.

17. The non-transitory computer readable medium of claim 16, wherein the set of application services comprises at least one of: a ground based mobility service, a skid steer platform service, a 4WD platform service, a NWD platform service, an omni-directional platform service, a mecanum platform service, an automotive mobility platform service, an hmm service, an hhmm service, a genetic learning service, a maneuver service, a maneuver action service, a conditions service, a movement plan service, a path planner service, a speed rules service, and a steering rules service.

18. The non-transitory computer readable medium of claim 16, wherein the set of application services comprises at least one of: a camera service, a camera mobileye service, a camera pointgrey service, a sensor estimator service, a position estimator service, an orientation estimator service, a speed estimator service, an acceleration estimator service, a physical object service, a world boundary service, a sensation service, a route planning service, a course service, a stopping service, a roaming service, an obstacle avoidance service, a cliff avoidance service, an object following service, a vehicle following service, a lane following service, a line following service, a uturn service, a stop sign handling service, a stop light handling service, an intersection handling service, a merging handling service, a pass on impasse handling service, a re-routing service, a self-park handling service, an open zone handling service, and a rendezvous handling service.

19. The non-transitory computer readable medium of claim 16, the operations further comprising using the set of application services to manage an autonomous vehicle service controlling an autonomous vehicle.

20. The non-transitory computer readable medium of claim 19, wherein the autonomous vehicle comprises at least one of:
  an unmanned ground vehicle (UGV),
  an unmanned sea vehicle,
  an unmanned vehicle,
  an unmanned aerial vehicle (UAV), and
  an unmanned underwater vehicle (UUV).

* * * * *